United States Patent [19]
Brauch et al.

[11] Patent Number: 6,010,013
[45] Date of Patent: Jan. 4, 2000

[54] UNIVERSAL METHOD OF AND APPARATUS FOR SCREENING DEBRIS

[75] Inventors: Joseph Karl Brauch, Aurora; Charles Lonnie Meurer, Golden; Douglas Lee Meurer, Denver, all of Colo.

[73] Assignee: Meurer Industries, Inc., Golden, Colo.

[21] Appl. No.: 08/794,113

[22] Filed: Feb. 3, 1997

[51] Int. Cl.⁷ ................................................ B07B 1/50
[52] U.S. Cl. ........................ 209/379; 209/273; 210/159; 210/143; 210/154
[58] Field of Search .................... 209/385, 379, 209/387, 273; 210/154, 159, 162, 155, 158

[56] References Cited

U.S. PATENT DOCUMENTS

| | | | |
|---|---|---|---|
| 1,959,491 | 5/1934 | Moran | 210/159 |
| 2,379,615 | 7/1945 | Walker | 210/162 |
| 2,634,863 | 4/1953 | Hauer | 210/176 |
| 2,671,563 | 3/1954 | Benner, Jr. | 210/159 |
| 2,897,967 | 8/1959 | Arthur | 210/159 |
| 2,930,485 | 3/1960 | Nordell | 210/159 |
| 3,144,406 | 8/1964 | Crise | 210/159 |
| 3,482,698 | 12/1969 | Ostnas | 210/159 |
| 3,589,521 | 6/1971 | Richter | 210/411 |
| 3,856,678 | 12/1974 | Hagihara | 210/160 |
| 4,184,957 | 1/1980 | Botsch | 209/385 |
| 4,188,294 | 2/1980 | Hagihara | 210/160 |
| 4,265,750 | 5/1981 | Meunier | 210/159 |
| 4,323,451 | 4/1982 | Hagihara | 210/160 |
| 4,392,952 | 7/1983 | Fechter et al. | 210/159 |
| 4,472,273 | 9/1984 | Hagihara | 210/160 |
| 4,780,199 | 10/1988 | Ezzell et al. | 210/159 |
| 4,792,394 | 12/1988 | Rudzinski | 210/159 |
| 4,857,182 | 8/1989 | Jackson | 210/159 |
| 5,098,561 | 3/1992 | Grabbe | 210/159 |
| 5,167,803 | 12/1992 | Newton et al. | 210/141 |
| 5,171,436 | 12/1992 | Botsch | 210/159 |
| 5,246,573 | 9/1993 | Lodholz et al. | 210/159 |
| 5,534,140 | 7/1996 | Brummond et al. | 210/159 |
| 5,730,862 | 3/1998 | Mahr | 210/159 X |

FOREIGN PATENT DOCUMENTS

| | | | |
|---|---|---|---|
| 2443935 | 4/1976 | Germany | 210/159 |
| 2655153 | 6/1978 | Germany | 210/159 |
| 60-175613 | 9/1985 | Japan | 210/159 |
| 1513739 | 6/1978 | United Kingdom | 210/159 |
| 2044624 | 10/1980 | United Kingdom | 210/159 |

*Primary Examiner*—David A. Bucci
*Assistant Examiner*—Thuy V. Tran
*Attorney, Agent, or Firm*—Chester E. Martine, Jr.

[57] ABSTRACT

A universal bar screen cleaner removes debris from a screen positioned in a channel guiding a flow of liquid, solids and the debris. The screen is to prevent the flow of the debris to a liquid treatment basin downstream of the screen. The screen has an upper end, a front side facing the upstream flow and a back side facing the downstream flow. A rake has tines for engaging the screen to move the debris toward and past the upper end of the screen to remove the debris from the screen. A frame supports the rake in a first rake position where the tines are engagable with the screen from the front side, or in a second rake position where the tines are engagable with the screen from the back side. The universal bar screen cleaner is adapted to be mounted over the channel in either of the front raking position or the back raking position according to which type of raking currently is desired, and to be readily movable to the other position to reverse the type of raking, or to provide simultaneous front raking and back raking in the channel. The screen facility may have one or more screens positioned transversely across the channel, or a screen extending parallel to the flow, and baffles across the flow to direct the incoming flow transversely across the channel and toward the screen.

15 Claims, 61 Drawing Sheets

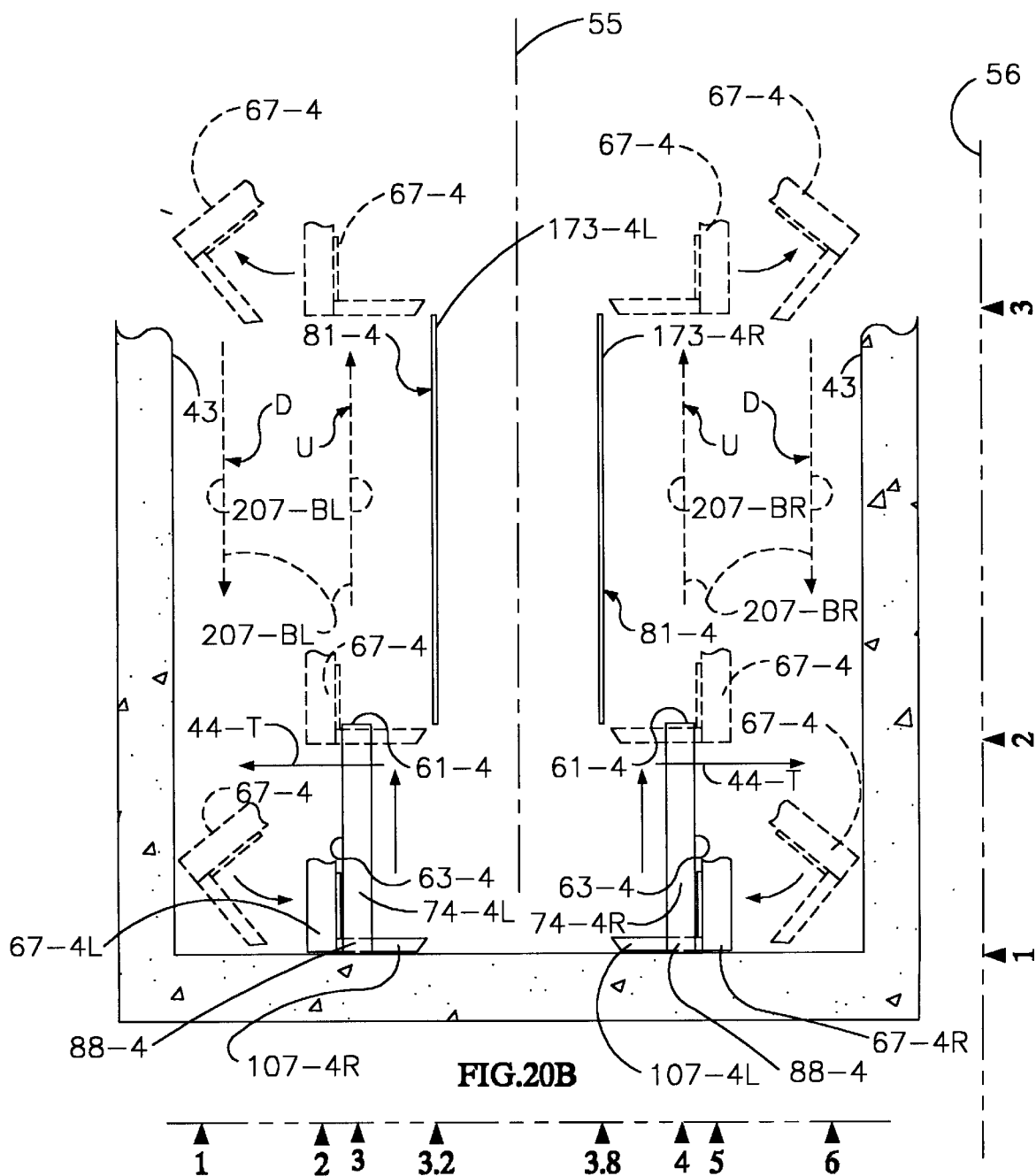

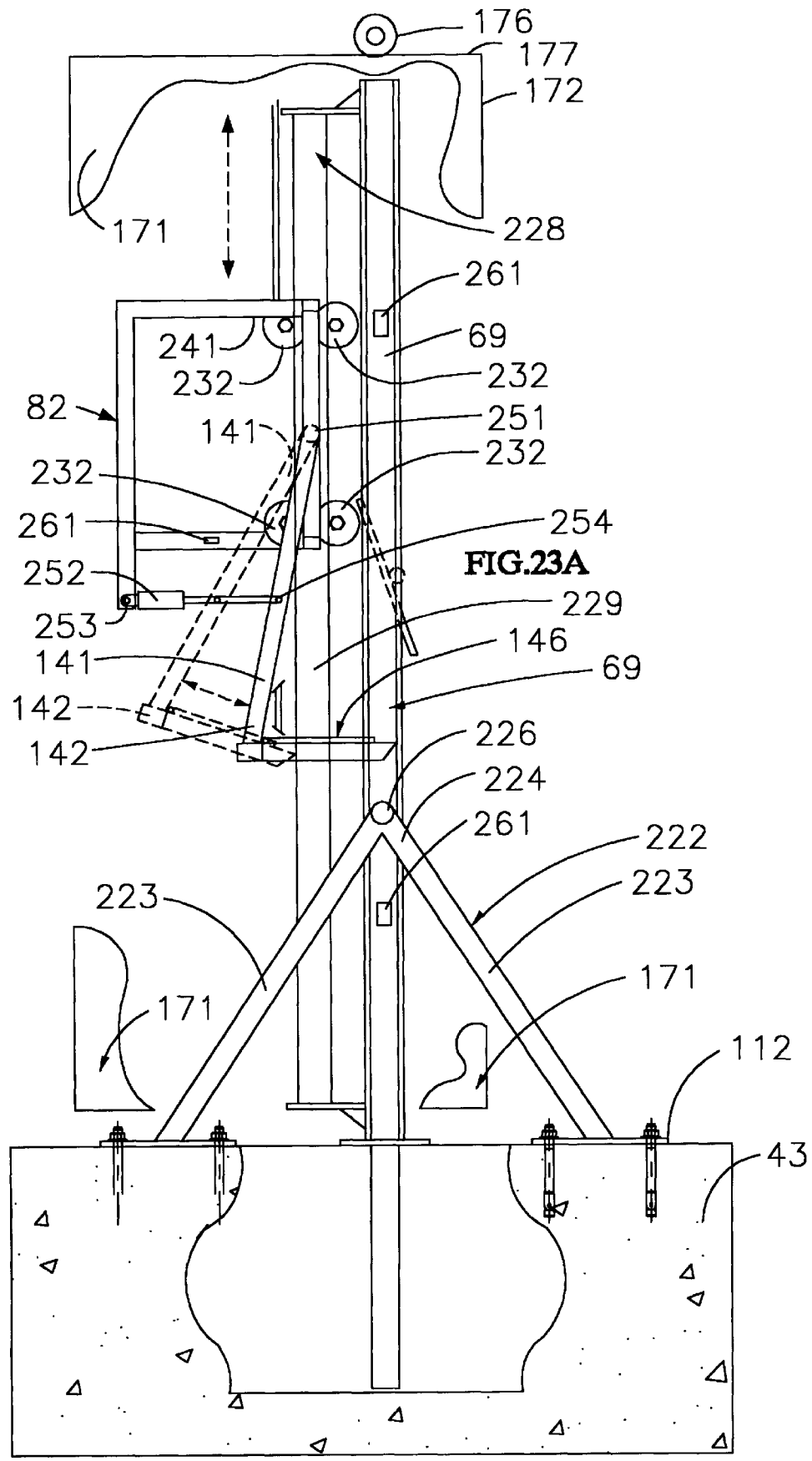

FIG. 24
BASIC OPERATIONAL CYCLE

S100. FROM INITIAL POSITION (AT STATION 4, WITH ARM OUT), TRAVERSE CARRIAGE TO BOTTOM OF SCREEN TO POSITION RAKE AT STATION 1.

S200. ENGAGE RAKE WITH SCREEN AT STATION 1.

S300. TRAVERSE CARRIAGE TOWARD TOP OF SCREEN TO MOVE RAKE ALONG SCREEN TO PERFORM RAKING (FRONT RAKING OR BACK RAKING).

S400. CONTINUE TO TRAVERSE CARRIAGE TO MOVE RAKE ALONG AND PAST PAN AND PAST CHUTE TO DOCTOR BLADE AT STATION 3.2. STOP CARRIAGE WITH RAKE AT STATION 4.

S500. MOVE ARM TO THE "OUT" POSITION TO MOVE THE RAKE PAST THE DOCTOR BLADE.

S600. STOP ARM AT THE "OUT" POSTION TO END THE CYCLE WITH THE RAKE DISENGAGED FROM THE SCREEN.

PROGRAMMED OPERATIONAL CYCLE

PROGRAMMED OPERATIONAL CYCLE (OVERRIDE BY-PASS)

PROGRAMMED OPERATIONAL CYCLE (RAKING)

PROGRAMMED OPERATIONAL CYCLE

FIG. 25 E

PROGRAMMED OPERATIONAL CYCLE (BY-PASS)

S360. ENTER IN RAKE-ENGAGE STATION REGISTER THE # OF THE STATION THAT IS 2 STEPS ABOVE STATION 1.4 ("NEW NEXT STATION").

S365. MOVE ARM TO "OUT" POSITION TO DISENGAGE RAKE FROM SCREEN.

S370. DO S110 TO START BY-PASS RAKING OPERATION.

FIG. 25 F

PROGRAMMED OPERATIONAL CYCLE (COMPLETE THE CYCLE)

S410. CONTINUE TO TRAVERSE CARRIAGE TO MOVE RAKE ALONG AND PAST PAN AND PAST CHUTE TO THE DOCTOR BLADE AT STATION 4. STOP CARRIAGE WITH RAKE AT STATION 4.

↓

S510. MOVE ARM TO THE "OUT" POSITION TO MOVE THE RAKE PAST THE DOCTOR BLADE.

↓

S610. STOP ARM AT THE "OUT" POSITION TO END THE CYCLE WITH THE RAKE DISENGAGED FROM THE SCREEN AND THE CARRIAGE STOPPED WITH THE RAKE AT STATION 4.

↓

S710. IF S370 WAS PERFORMED, INCREMENT THE BY-PASS COUNTER.

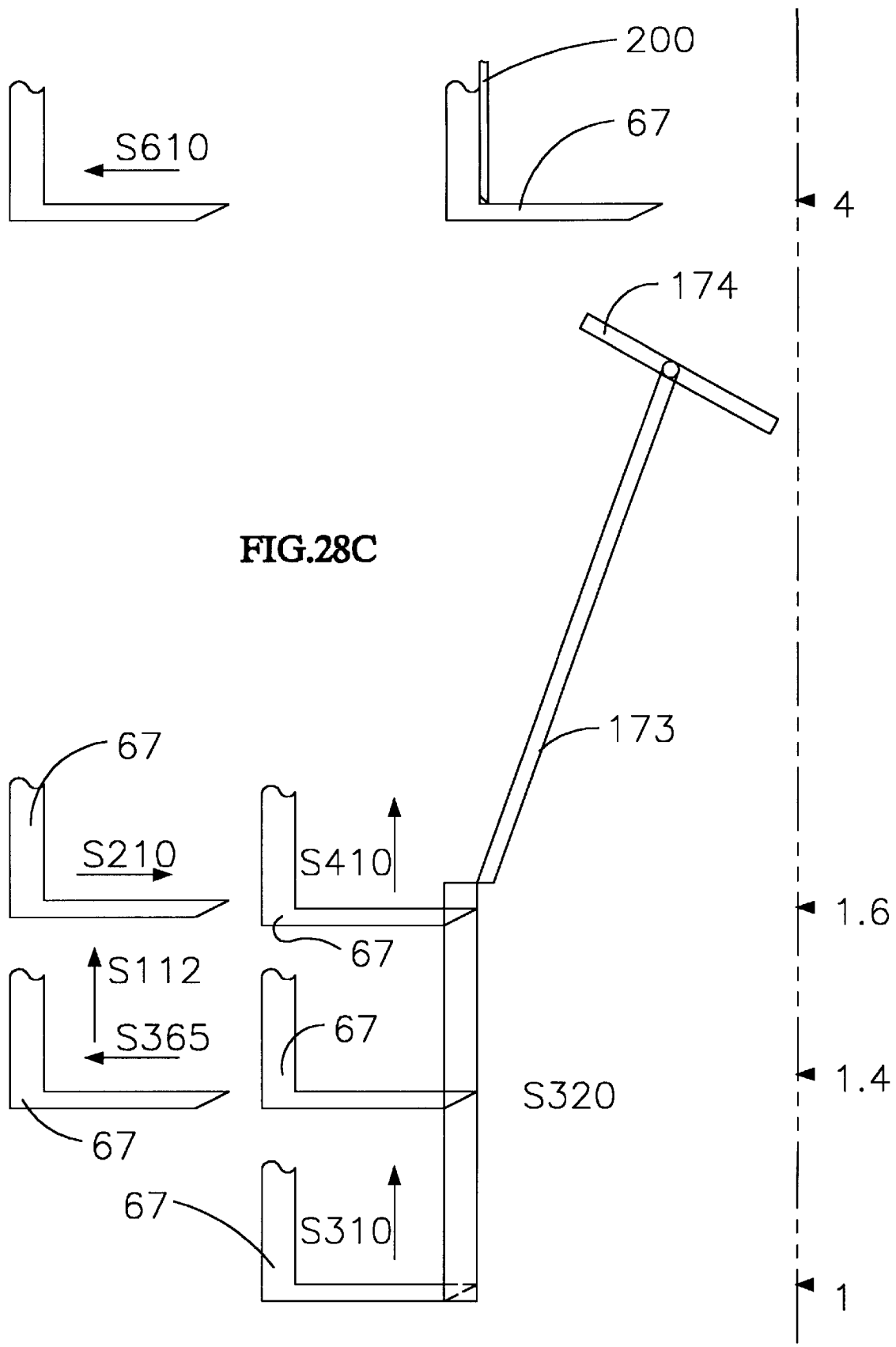

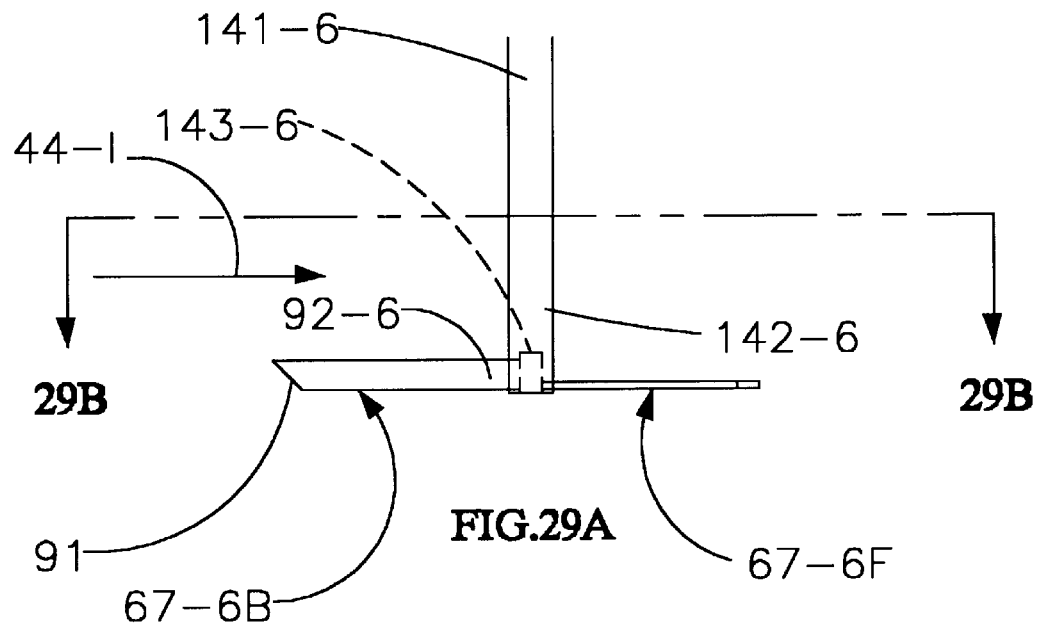
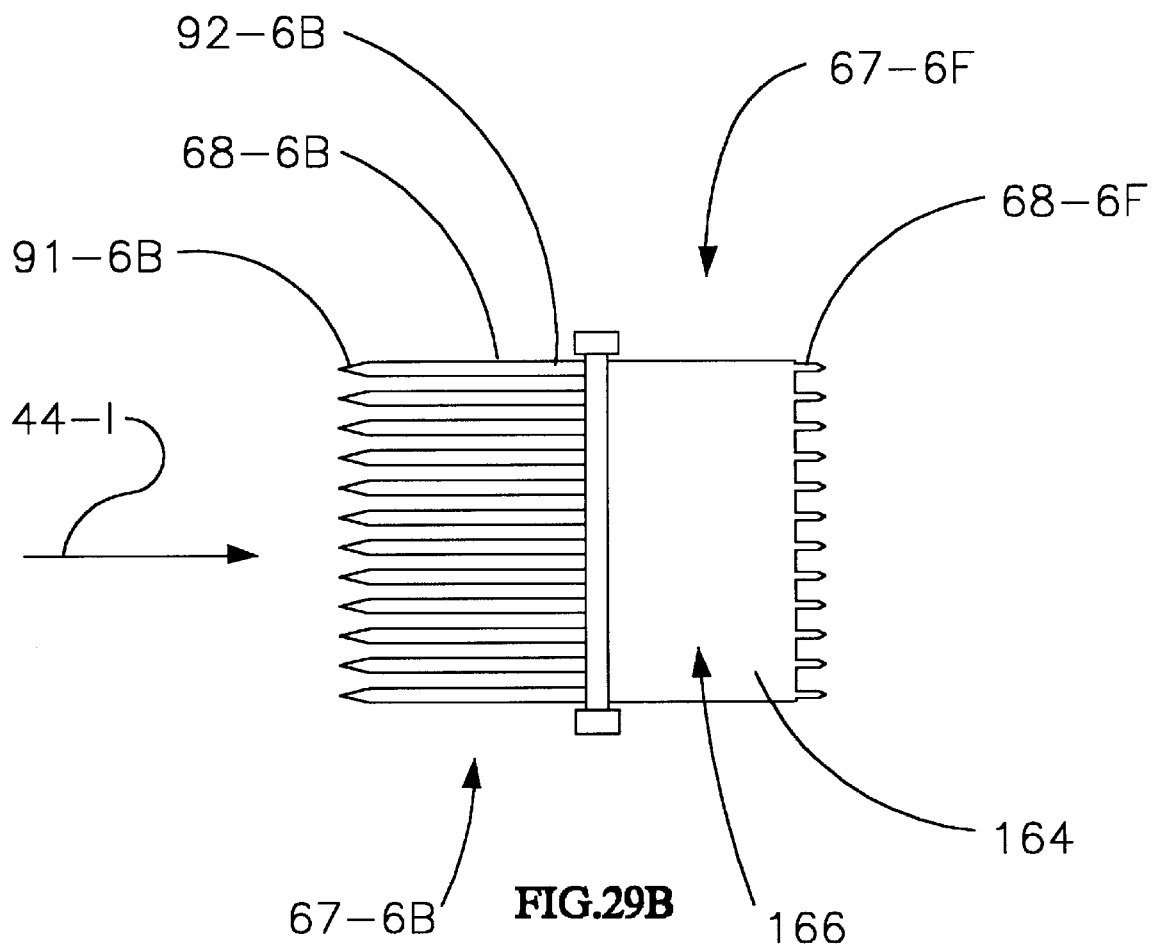

FIG. 31

Method of removing debris 41 from a flow channel 43 which carries liquid 46, solids 47 and debris 41:

S1000: mount a screen 74 across the flow channel 43 to intercept the debris 41 and allow the liquid 46 and the solids 47 to flow past the screen 74

(the screen 74 has an upper end 61, a bottom 88, a front face 62, and a back face 63).

S1010: provide a rake 67 having tines 68 to engage the screen 74.

S1020: reversibly mount the rake 67 to position the tines 68 either to engage the front face 62 of the screen 74 or the back face 63 of the screen 74, wherein one of the tine positions is for front raking and the other of the positions is for back raking the screen 74.

S1030: in either of the positions of the tines 68 (engaged with the screen 74), moving the rake 67 from the bottom 88 to the upper end 61 of the screen 74 to remove the debris 41 from the screen 74.

FIG. 32A

Method of removing debris 41 from a flow channel 43 which carries liquid 46, solids 47 and debris 41:

S2000: mount a screen 74-2 across the flow channel 43 to intercept the debris 41 and allow the liquid 46 and the solids 47 to flow past the screen 74-2, wherein the screen 74-2 is mounted for movement along the flow channel 43 between two screen positions.

S2010: provide a rake 67-2 having tines 68 to engage the screen 74-2, wherein the tines 68-2 of the rake 67-2 are provided with distal ends 91-2 extending from proximal ends 92-2.

S2020: reversibly mount the rake 67-2 to position the tines 68-2 either to engage the front face 62-2 of the screen 74-2 or the back face 63-2 of the screen 74-2,
    wherein one of the tine positions is for front
    raking and the other of the positions is for back
    raking the screen 74-2, and (continued on FIG. 32B)

FIG. 32B

Method of removing debris 41 from a flow channel 43 which carries liquid 46, solids 47 and debris 41:

(continued)

wherein the rake 67-2 is mounted either upstream of the screen 74-2 in one of the screen positions with the distal ends 91-2 of the tines 68 engaging the screen 74-2, or downstream of the screen 74-2 in another of the screen positions with the tines 68-2 extending through the screen 74-2 and the proximal ends 92-2 engaging the screen 74-2.

S2030: in either of the positions of the tines 68-2 (engaged with the screen 74-2), moving the rake 67-2 from the bottom 88 to the upper end 61 of the screen 74-2 to remove the debris 41 from the screen 74-2.

FIG. 33A

Method of removing debris 41 from a flow channel 43 which carries liquid 46, solids 47 and debris 41:

S3000: mount the screen 74-6 across the flow channel 43 to intercept the debris 41 and allow the liquid 46 and the solids 47 to flow past the screen 74-6;
( the screen 74-6 has an upper end 61, a bottom 88, a front face 62, and a back face 63).

S3010: provide the rake 67-6 having two sets of tines 68-6, one of the sets being for engaging the front face 62-6 of the screen 74-6, the other of the sets being for engaging the back face 63-6 of the screen 74-6.

Method of removing debris 41 from a flow channel 43 which carries liquid 46, solids 47 and debris 41:

(continued)

S3020: mount the rake 67-6 for movement on both the front face 62 and the back face 63-6 of the screen 74-6 to either position the one set of tines 68-6 to engage the front face 62-6 of the screen 74-6 or to position the other set of tines 68-6 to engage the back face 63-6 of the screen 74-6 so that both back raking and front raking may be performed with the same rake 67-6.

S3030: in either of the positions of the tines 68-6 (engaged with the screen 74-6), moving the rake 67-6 from the bottom 88 to the upper end 61 of the screen 74-6 to remove the debris 41 from the screen 74-6.

FIG. 34A

Removing debris 41 from a flow channel 43
which carries liquid 46, solids 47 and debris 41:

S4000: mount two screens 74-7 across the flow channel 43 at spaced respective upstream and downstream locations to selectively intercept large pieces 96 of debris 41 and small pieces 97 of the debris 41 and allow the liquid 46 and the solids 47 to flow past the screens 74-7, > wherein the upstream screen 74-7U is for intercepting the large pieces 96 and the downstream screen 74-7D is for intercepting the small pieces 97.

S4010: provide a rake 67-7 having two sets of tines 68-7U and 68-7D, one of the sets being for engaging the upstream screen 74-7, the other of the sets being for engaging the downstream screen 74-7.

S4020: mount the rake 67-7 for movement between the two screens 74-7 to position the one set of tines 68-7U to engage the back face 63-7 of the upstream screen 74-7U and to position the other set of tines 68-7D to engage the front face 62-7 of the downstream screen 74-7D.

Removing debris 41 from a flow channel 43
which carries liquid 46, solids 47 and debris 41:

(continued)

S4030: engage the tines 68-7 of the rake 67-7U with the upstream screen 74-7U and move the rake 67-7U from the bottom 88 to the upper end 61 of the screen 74-7U to remove the debris 41 from the screen 74-7U; and S4030: engage the tines 68-7 of the rake 67-7D with the downstream screen 74-7D and move the rake 67-7D from the bottom 88 to the upper end 61 of the screen 74-7D to remove the debris 41 from the screen 74-7D.

FIG. 35A

Method of removing debris 41 from a flow channel 43 which carries liquid 46, solids 47 and debris 41:

S5000: mount two screens 74-8 across the flow channel 43 at spaced respective upstream and downstream locations to respectively intercept large pieces 96 of debris 41 and small pieces 97 of the debris 41 and allow the liquid 46 and the solids 47 to flow past the screens 74, S5010: provide two rakes 67-8C and 68-8F having respective tines 68-8C and 68-8F, the tines 68-8C being for engaging the upstream screen 74-8U, and the tines 68-8F being for engaging the downstream screen 74-8D.

S5020: mount the rakes 67-8C and 67-8F for movement between the two screens 74-8 to simultaneously position the rake 68-8C to engage the back face 63-8 of the upstream screen 74-8U and to position the rake 67-8F to engage the front face 62-8 of the downstream screen 74-8D.

Method of removing debris 41 from a flow channel 43 which carries liquid 46, solids 47 and debris 41:

(continued)

S5030: simultaneously move the rakes 67-8C and 68-8F between the two screens 74-8 respectively engaged with the back face 63-8 of the upstream screen 74-8U and engaged with the front face 62-8 of the downstream screen 74-8D.

FIG. 36A

Method of removing debris 41 from a flow channel 43 which carries liquid 46, solids 47 and debris 41:

S6000: mounting at least one screen 74-3 in the flow channel 43 parallel to the longitudinal axis 51 (along the incoming flow 44-I);

S6010: mounting baffles 106 in the flow channel 43 parallel to the transverse axis 52 to divert the incoming flow 44-I into transverse flow 44-T through the screen 74-3;

S6020: providing a rake 67-3 having two sets 107 of tines 68-3, a first set of the tines 68-3 being for engaging the front face 62-3 of the screen 74-3 and a second set of the tines 68-3 being for engaging the back face 63-3 of the screen 74-3.

S6030: mounting the rake 74-3 to position the respective sets 107A or 107B of tines 68-3 to either engage the front face 62-3 of the screen 74-3 or the back face 63-3 of the screen 74-3.

Method of removing debris 41 from a flow channel 43 which carries liquid 46, solids 47 and debris 41:

S6040: in either of the positions of the sets of tines 68-3 (engaged with the screen 74-3), moving the rake 67-3 from the bottom 88-3 of the screen 74-3 to the upper end 61-3 of the screen 74-3 to remove the debris 41 from the screen 74-3.

FIG. 37A

Method of removing debris 41 from a flow channel 43 which carries liquid 46, solids 47 and debris 41:

S7000: provide two screens 40-4L and 40-4R parallel to the incoming flow 44-I;

S7010: mount the baffles 106-4 in the flow channel 43 parallel to the transverse axis 52 to divert the incoming flow 44-I from a center 108 of the channel 43 into two opposed transverse flows 44-T transversely through the respective screens 74-4L and 74-4R;

S7020: provide the rotary reversible rake 67-4 having two sets 107 of tines 68-4;

S7030: adjust the rotary position of the rake 67-4 so that either the first set 107A or the second set 107B of tines 68-4 engage the front face 62-4 of the left screen 74-4L or of the right screen 74-4R; or either the first set 107A or the second set 107B of tines 68-4 engage the back face 62-4 of the left screen 74-4L or of the right screen 74-4R;

Method of removing debris 41 from a flow channel 43 which carries liquid 46, solids 47 and debris 41:

S7040: in either of the positions of the sets 107A or 107B of tines 68-4 (engaged with the screen 74-4), move the rake 67-4 from the bottom 88-4 of the selected one of the screens 74-4L or 74-4R to the upper end 61-4 of that screen to remove the debris 41 from that screen.

FIG. 38A

Method of removing debris 41 from a flow channel 43 which carries liquid 46, solids 47 and debris 41:

S8000: provide two screens 74-5L and 74-5R parallel to the incoming flow 44-I;

S8010: mount the baffles 106-5 in the flow channel 43 parallel to the transverse axis 52 to divert the incoming flow 44-I from each side 111 of the channel 43 into two opposed transverse flows 44-T transversely toward the center 108 and through the respective screens 74-5L and 74-5R to enable each screen 74-5L and 74-5R to intercept the debris 41;

S8020: provide the rotary reversible rake 67-5 having two sets 107 of tines 68-5;

Method of removing debris 41 from a flow channel 43 which carries liquid 46, solids 47 and debris 41:

S8030: adjust the rotary position of the rake 67-5 so that either the first set 107A or the second set 107B of tines 68-5 engage the front face 62-5 of the respective left screen 74-5L or of the right screen 74-5R; or either the first set 107-5L the second set 107-5R tines 68-5 engage the respective back face 62-5 of the left screen 74-5L or of the right screen 74-5R.;

S8040: in either of the positions of the sets 107-5L or 107-5R of tines 68-5 (engaged with one of the screens 74-5), move the rake 67-5 from the bottom 88-5 of a selected one of the screens 74-5L or 74-5R to the upper end 61-5 of that screen to remove the debris 41 from that screen.

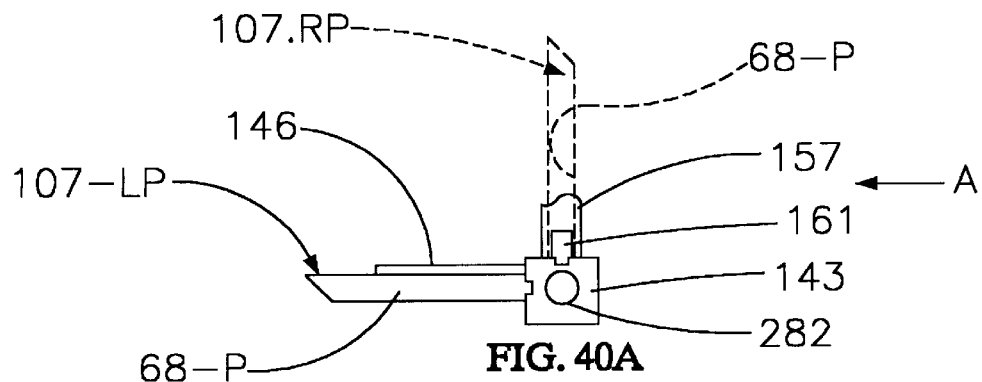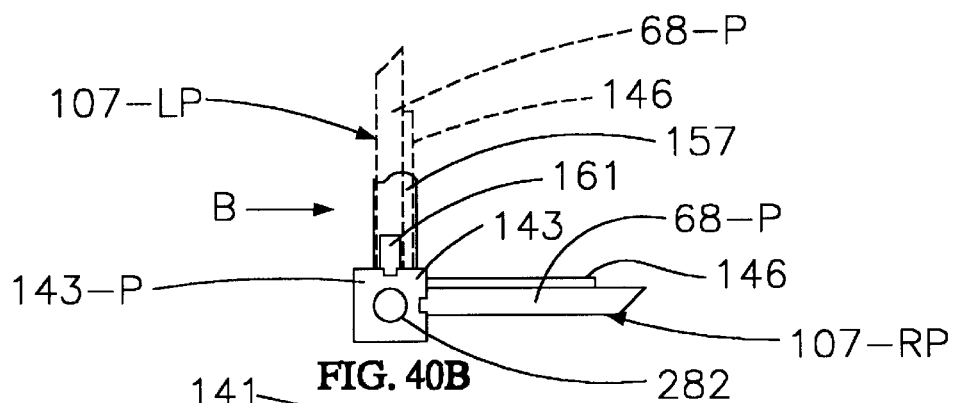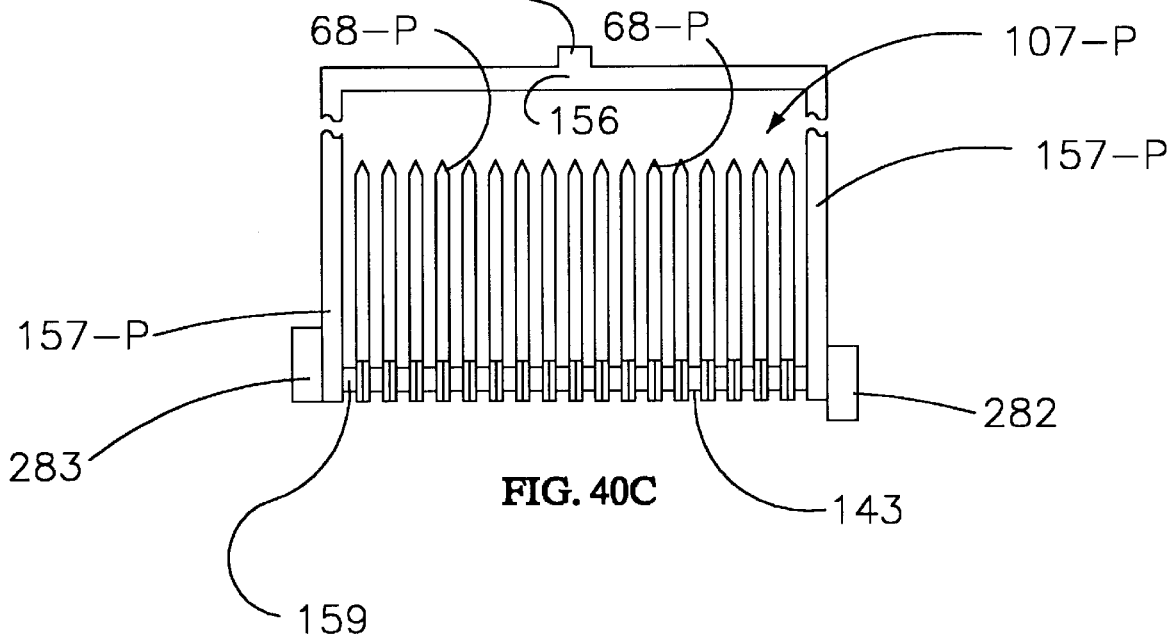

UNIVERSAL METHOD OF AND APPARATUS FOR SCREENING DEBRIS

BACKGROUND OF THE INVENTION

1. Field of the Invention

This invention relates to removal of solid materials from liquid, and more particularly, to a screen for automatically removing undesired solid materials, such as non-degradable debris, from liquid flowing into a water or waste water or liquid industrial waste treatment facility.

2. Discussion of Prior Screens

Basins are used to remove certain undesired solid materials from liquid, to clarify the liquid. Basins are used, for example, in water and waste water treatment plants, and in industrial waste treatment plants. In water treatment, the water drawn from a water supply has various undesirable solid materials therein. One type of undesired material is non-settleable colloidal solid material. When mixed with chemicals, the non-settleable colloidal solid materials and the chemicals agglomerate to form solid materials which will settle from the water. In water and waste water treatment, the undesired solid materials include organic solids. In industrial processes, the undesired solid materials may include a variety of materials, such as fibers, which are not amenable to agglomeration and settling, for example.

Water, waste water, and liquid industrial wastes are treated in basins to remove such undesired solid materials, thereby making the water clear and suitable for use, reuse, or for further treatment, such as tertiary treatment. The word "liquid" as used below to describe the present invention refers to water, waste water and liquid industrial wastes.

These undesired solid materials include particles that are suspended in the liquid. Devices for removing the suspended materials are well-known. Such devices substantially reduce the flow rate of the liquid, and the particles therein, as in a very low flow, or quiescent, zone (or flow channel) in the basin. The suspended, low flow rate particles are subjected to the force of gravity and settle to the bottom of the basin as sludge.

However, the undesired solid materials to be removed from such liquid include items that are generally much larger than such suspended, settleable materials, and that are not removable by settling. Many of these larger materials are not regulated by government waste management authorities, and include, for example, (i) man-made materials such as plastics (e.g., plastic shapes for holding six cans of soda in a six-pack); (ii) large materials such as other plastic waste, containers, construction debris, and refuse carried by, but generally not suspended in, the liquid; and (iii) many other materials (such as paper towels) which are carried by the liquid, but which generally do not degrade in the manner in which bio-degradable materials (such as food) degrade.

For purposes of differentiating the undesired, suspended, settleable solid materials from such other undesired, non-settleable larger materials, these undesired, suspended, settleable solid materials are referred to herein as "solids" or "settleable solids", whereas these undesired, non-settleable larger materials are referred to herein as "screenable solid materials", or "debris", because they are desirably removed by "screening" before the liquid and the settleable solids flow into the basin.

If such debris are not removed before the liquid and the solids flow into the basin, the (a) debris may interfere with the settling process by which the settleable solids are encouraged to settle to the bottom of the basin and form sludge, (b) debris in the sludge may interfere with removal of the sludge from the basin, and (c) the sludge collected from the bottom of the basin will include some of the debris. Such interference with the settling process is undesirable because less settleable solids are removed per gallon of liquid processed through the settler. Also, the sludge is temporarily stored ("inventoried") before use, such that any excess (i.e., non-settleable solid) material in the inventoried sludge increases the land area or other facilities needed to store the sludge. Further, because such debris (e.g., plastics) is not suitable for use in the manner in which the sludge is used (e.g., fertilizer for agricultural purposes), the commercial value of sludge which contains debris is greatly reduced, increasing the net cost of the liquid clarifying operation.

Accordingly, efforts have been made to provide ways of removing the debris from the liquid and the solids before the liquid and the solids flow into the basin. Applicants' studies indicate that the type of prior method or apparatus used to remove the screenable solids from the liquid and the solids seems to depend on the size of a channel (such as a pipe or rectangular concrete conduit) through which the debris, the liquid, and the solids flow on the way to the basin. While many types of facilities have been used for large size channels (e.g. those in the range of two to three feet wide and two to five feet deep), one type of facility, a chopper, has been predominately used for small size channels (e.g. those in the range of one to two feet wide and one to two feet deep). Moreover, such choppers are generally not effective, because in the process of chopping up the debris, non-settleable small pieces of the debris (e.g., small fibers) tend to stay in the flow stream of the liquid and solids, leading to the above-noted disadvantages.

Thus, although others have used fixed bar screens to prevent such debris from entering the basins through the large size channels, it appears that such fixed bar screens are much less often used for the small size channels. In such fixed bar screens, a rack holds closely spaced bars across the flow path of the channel in which the liquid, the suspended solids and the debris flow toward the basin. As the debris flow with the liquid and the suspended solids, the debris are to be caught on the front face of the bars, whereas the liquid and the suspended solids flow through openings between the bars.

Regardless of the size of the channel in which the fixed bar screens have been used, problems have been faced in the use of facilities in an attempt to remove the debris from the face of the bars in a reliable manner without human intervention on a 24 hour-a-day basis. The removal facilities tend to be structures of great height (e.g., twelve feet) above the channel, or of significant complexity, or which tend to block the flow of the liquid and the suspended solids through the openings between the bars, or which are very costly.

For example, some such removal facilities provide a rake-like structure (a "rake") having tines which can extend into the spaces between the bars. The rakes are guided relative to the bars by guides which generally are fixed, such as slots machined into a metal plate in which a guide roller rides. The slots are shaped to guide the roller, and hence the rake attached to the roller, into the channel so that the tines of the rake move toward and then along the face of the bars in a preset, or invariable, raking action. This invariable action pulls the tines across the bars to move the screenable solids up off the face of the bars and out of the channel. Among the problems faced using such rakes with fixed guides, the debris often becomes lodged in the bars so that the tines of the rake become jammed. When jammed, springs which bias the tines toward the bars are to be overridden and the rake is to move over the object that caused the jamming. In many, if not all, of such systems, once the rake starts moving under the action of the rollers riding in the machined slots in the preset raking action, except for the overcoming of the bias of the spring, the rake must complete the entire preset traverse of the bars. The reliance on the spring to release the rake in case jamming occurs does not allow the fixed bar screens to remove the cause of the jamming, or otherwise vary the sequence of rake motion.

There are generally two types of removal facilities for fixed bar screens. As noted above, some removal facilities for a fixed bar screen have tines which extend into the spaces between the bars. The bars generally extend upwardly in the channel, so that the openings between the bars also extend upwardly and facilitate upward motion of the rake for removal of the debris. The bars are said to have a "front" face, or side, which faces upstream, i.e., faces the incoming flow of the liquid, the settleable solids, and the debris; and a "back" face, or side, which faces downstream, i.e., faces the exiting flow of the liquid and the settleable solids.

One type of removal facility is provided with very short rake tines which extend from the front face only partially into the openings between the bars, and not past the back face. These rake tines scrape the front face to remove the debris caught on the front face. The bars have lateral supports which extend across the back face of the bars to keep the bars properly spaced without interfering with the tines. This is a "front rake" removal facility, which performs a front raking operation.

The other type of removal facility is provided with much longer rake tines which extend from the back face completely through the openings between the bars and past the front face by a distance (such as a four to five inches) to be able to support and remove the debris caught on the front face. These bars do not have such lateral supports because such supports would interfere with the longer tines extending through the openings. This is the "back rake" type of removal facility, which performs a back raking operation.

In Applicants' experience, there are no removal facilities available which are readily convertible, or easily usable, or simultaneously usable, for both front raking and back raking. Therefore, it appears that a basin design engineer must either specify a front rake-type, or a back rake-type, of removal facility for a particular channel. Each such front rake-type or back rake-type of removal facility is different. This results in problems, first for the rake manufacturer because, for example, each type of rake must be separately inventoried if fabricated before an order is received, or must be separately fabricated to fill a specific order. In some situations, the engineer will not know which of the front rake-type, or back rake-type, removal facility will be best for the particular channel. Further, the engineer or liquid treatment plant operator may not know what type of debris will be present in the liquid in the channels, or if known at a given time, there may over time, e.g., from season to season, be changes in the type of debris present in the liquid in the channels.

As a result, if the wrong type of removal facility is installed, or if there is a change in the type of debris present in the incoming liquid in the channel, either less desirable screening will take place using the originally installed removal facility, or the originally installed removal facility must be modified for the new situation. Each of these alternatives is undesirable, increases the cost of operation of the plant, and requires time consuming removal of the installed rake from service.

The problems resulting from fixed bar screens having such great height above the channel, or which are significantly complex, or which tend to block the flow of the liquid and the suspended solids through the openings between the bars, or which are very costly, or which are not suitable for the type of debris currently to be removed from the liquid, are important drawbacks when the channels are large. However, since large size channels are generally part of large liquid treatment plants, e.g., plants which treat more than nine million gallons per day (9 mgd), more money may be available for equipment to solve these fixed bar screen problems than is generally available for such small size channels which supply liquid to smaller plants, e.g., plants which treat up to three mgd, which are built on a very low budget compared to the budgets of the large plants. Although these problems are common to removal facilities for both the large and the small liquid treatment plants, and the solutions of the present invention are applicable to removal facilities for channels for any size plant, there is greater incentive to have a cost-effective solution to these problems for the small plants.

SUMMARY OF THE PRESENT INVENTION

In view of these and other problems not solved by the various types of prior fixed bar screens, there is still a need to provide: (a) a simple, lower-cost, automatic, programmed fixed bar screen cleaner; (b) a bar screen cleaner which is universally usable as either a front rake-type or a back rake-type, and which is readily convertible at a basin of a plant for either type of operation; and (c) a bar screen cleaner which is simultaneously usable for both types of raking, wherein these bar screen cleaners are applicable to basin supply channels constructed on low budgets, such as for small plants in which choppers are currently used, as well as for large plants.

Applicants' studies of these problems indicate that by combining and simplifying a drive and a guide for effecting a raking stroke, and separating the engagement/disengagement of a rake with the bars from the combined drive and guide, the overall raking action of the rake may be made substantially more effective and less subject to problems caused by jamming of the rake.

Applicants' have further determined that the need for human monitoring of the screening operations can be substantially reduced by recording the nature and extent of the raking action of the rake, including any jamming, and by controlling the raking action of the rake according to the circumstances presented by the debris to be removed, for example.

Applicants' have further determined that the need for a bar screen cleaner which is universally usable as either a front rake-type or a back rake-type and which is convertible at a basin of a treatment plant for either type of operation, may be met by a universal bar screen cleaner according to the present invention.

The universal bar screen cleaner removes debris from a screen facility positioned in a channel which guides a flow of liquid, solids and the debris from an upstream end of the channel. The screen facility is designed to prevent the flow of the debris to a liquid treatment basin downstream of the screen facility. The channel guides the flow of the liquid and the solids downstream from the screen facility to the basin. The screen facility has at least one upper end, at least one front side facing the upstream flow and at least one back side facing the downstream flow. A rake facility has tines for engaging the screen facility to move the debris toward and past the at least one upper end of the screen facility to remove the debris from the screen facility. A frame supports the rake in either of two rake positions relative to the screen facility. In a first of the rake positions the tines are engagable with at least a first portion of the screen facility from the front side, and in a second of the rake positions the tines are engagable with at least a second portion of the screen facility from the back side.

Embodiments of such universal bar screen cleaner are adapted, for example, to be mounted over a channel in either of a front raking position or a back raking position according to which type of raking currently is desired, and to be readily movable to the other position to reverse the type of raking, or to provide simultaneous front raking and back raking in the channel.

In a first group of embodiments, the screen facility has one or more screens positioned transversely across the channel. One embodiment has a reversible rake and pan which are easily adjusted to facilitate the desired front raking or back raking. Another embodiment has a reversible rake operating with a screen that is movable according to the raking position of the rake to facilitate the desired front raking or back raking. Yet another embodiment has a non-reversible rake (one that always faces in the same direction) with two-way tines selectively engagable with either the front face of a single screen or the back face of that screen to facilitate the desired respective front raking or back raking. A further embodiment has a non-reversible rake with two-way tines selectively engagable with either the front face of a downstream screen or the back face of an upstream screen to facilitate the desired respective front raking or back raking. A still further embodiment has two of the non-reversible rakes, each with tines, with one engageable with the front face of a downstream screen and the other engagable with the back face of an upstream screen to facilitate simultaneous respective front raking and back raking.

In a second group of embodiments, there is at least one screen facility extending parallel to the flow (i.e., from upstream to downstream), and baffles across the flow to direct the incoming flow transversely across the channel and toward the screen facility. In one aspect of this parallel screen facility embodiment there is a reversible rake with one set of tines. Upon reversing of the rake, the tines are selectively engagable with either the front face of a single screen or the back face of that screen to facilitate the desired respective front raking or back raking. In another aspect of this parallel screen facility embodiment, there are two parallel screens in the screen facility, a first of the two screens being first to receive the transverse incoming flow, and a second of the two screens being next to receive the transverse incoming flow. In this two screen, parallel screen facility embodiment, there is a non-reversible rake with two-way tines selectively engagable with either the front face of the second screen or the back face of the first screen to facilitate the desired respective front raking or back raking.

The present invention seeks to overcome these and other limitations of the prior fixed bar screens by providing automatic and controllable raking operations and tailoring the screen structure to such automatic and controllable raking operations. In particular, Applicants' studies have considered relating such raking operations and screen structure to the situation in which there is debris jammed in the screen. The jammed debris resists the movement of the rake along the screen causing the rake to slow significantly or stop. The drive motor for the rake becomes overloaded, indicated by motor current in excess of a limit. When the excess current exists, the rake is said to be jammed. Applicants have concluded that the existence of a jammed rake should not only cause the positive release of the rake from the face of the bars, but the further movement of the rake should be controlled according to the nature of the problem which caused the jamming. As an example, if the rake jams during a raking stroke, the jam should be sensed. In response to the sensed jam, and according to the nature of the problem, the rake may be positively removed from the face of the bars, and then either returned to an original position at the beginning of the stroke, or advanced in the direction of the original stroke and then returned to the face for completion of the stroke (by-passing the jam), or advanced in the direction of the original stroke, then returned to the face, and then moved toward the original position at the beginning of the stroke to attempt to remove the cause of the jamming from the face of the bars. As another example, having found that much debris that causes jamming tends to be at or near the bottom of the screen, Applicants provide that upon sensing jamming, the original position of the rake may be adjusted to be spaced from the bottom so as to avoid having the rake be jammed on each stroke. These control activities are intended to allow substantial screening operations to take place without emergency human intervention. Further, these activities of rake control are recorded so that at a regularly scheduled time an operator may review the screening events which have taken place, and then re-set or re-program the raking operations. Alternatively, if unusual debris is expected to be in the incoming liquid and may give rise to special problems in screening, the screening may be set for a programmed operation according to the anticipated problems.

The present invention further seeks to overcome these and other limitations of the prior fixed bar screens, which are not easily convertible to either front or back raking, by providing a universal debris removal facility that is readily adaptable at the site of a basin to either front or back raking, and a universal debris removal facility that readily and simultaneously performs both front and back raking operations.

The present invention further seeks to overcome these and other limitations of the prior fixed bar screens by providing a method of removing debris from the flow channel which carries liquid, solids and debris. One embodiment of the method contemplates steps including mounting a screen across the flow channel to intercept the debris and allow the liquid and the solids to flow past the screen. The screen has a top, a bottom, a front side and a back side. There is a step of providing a rake having tines to engage the screen, and reversibly mounting the rake to position the tines to either engage the front of the screen or the back of the screen. In either of the positions of the tines engaged with the screen, there is a step of moving the rake from the bottom to the top of the screen to remove the debris from the screen, wherein one of the tine positions is for front raking and the other of the positions is for back raking the screen.

The present invention further seeks to overcome these and other limitations of the prior fixed bar screens by providing another embodiment of a method in which the mounting step mounts the screen for movement along the flow channel between two screen positions. The providing step provides the tines of the rake with distal ends extending from proximal ends. The step of reversibly mounting the rake mounts the rake either upstream of the screen in one of the screen positions with the distal ends of the tines engaging the screen, or downstream of the screen in another of the screen positions with the tines extending through the screen and the proximal ends engaging the screen.

The present invention further seeks to overcome these and other limitations of the prior fixed bar screens by providing yet another embodiment of a method for removing debris from the flow channel which carries liquid, solids and debris, wherein the debris includes large and small pieces. The method contemplates steps including mounting a pair of the screens across the flow channel at spaced respective upstream and downstream locations to selectively intercept the large and the small pieces of the debris and allow the liquid and the solids to flow past the screens. The screens each have a top, a bottom, a front side and a back side, wherein the upstream one of the screens is for intercepting the large pieces of the debris; and the downstream one of the screens is for intercepting the small pieces of the debris. In a further step, a rake is provided having two sets of tines, one of the sets being for engaging the upstream screen, the other of the sets being for engaging the downstream screen. In a still further step, the rake is mounted for movement between the two screens, the one set of tines being positioned to engage the back of the upstream screen and the other set of tines being positioned to engage the front of the downstream screen so that both back raking and front raking may be performed with the same rake.

The present invention further seeks to overcome these and other limitations of the prior fixed bar screens by providing a further embodiment of a method for removing debris from the flow channel which carries liquid, solids and debris. The method contemplates steps including mounting a screen across the flow channel in position to intercept the debris and allow the liquid and the solids to flow past the screen. The screen has a top, a bottom, a front side and a back side. Another step provides a rake having two sets of tines, one of the sets being for engaging the front side of the screen, the other of the sets being for engaging the back side of the screen. A final step is mounting the rake for movement on both the front side and the back side of the screen to either position the one set of tines to engage the front of the screen or to position the other set of tines to engage the back side of the screen so that both back raking and front raking may be performed with the same rake and screen.

BRIEF DESCRIPTION OF THE DRAWINGS

Other features and advantages of the present invention will be apparent from an examination of the following detailed description, which includes the attached drawings in which:

FIG. 20B is a schematic view taken along line 20B—20B in FIG. 20A showing the motion of the reversible rake (reversed from FIG. 19B) for simultaneously back raking the two parallel screens;

FIGS. 23A and 23B are elevational views of a programmed drive, wherein the bar screen cleaner is shown positioned in the channel in FIG. 23A, and positioned out of the channel in FIG. 23B;

FIG. 24 is a flow chart of steps in a basic operational cycle for raking one of the screens of the present invention;

FIGS. 25A through 25F are flow charts of steps of a program for controlling operational cycles of the rakes of the present invention, showing automatic and controlled raking operations in which movement of the rake is controlled according to the nature of the problem which causes jamming of debris in the screen, in which:

FIG. 25A describes programming steps to by-pass the initial position at which the rake engages the screen according to the number of cycles in which a jam on a screen may be by-passed;

FIG. 25B describes programming steps to cause the rake to engage the screen at a programmed rake-engage station for raking and the jam is sensed during raking;

FIG. 25C describes programming steps to record the location of a jam and if the jam is new, to start a cycle in an attempt to clear the jam;

FIG. 25D describes programming steps to interrupt an attempt to clear a jam if an old jam cannot be cleared;

FIG. 25E describes programming steps to by-pass the jam if the jam was not cleared; and FIG. 25F describes programming steps to complete a cycle;

FIGS. 28A, 28B, and 28C are diagrams relating the steps of the program to motion of the rake for cleaning the bar screen;

FIGS. 29A and 29B are diagrams of the tines of a two-way rake;

FIGS. 31, 32A, 32B, 33A, 33B, 34A, 34B, 35A, 35B, 36A, 36B, 37A, 37B, 38A, and 38B are diagrams showing the steps of methods of the present invention;

FIGS. 40A, 40B, and 40C are detailed views of the rotary rake shown in FIGS. 18A through 22B.

DETAILED DESCRIPTION OF THE PREFERRED EMBODIMENTS

Figure 1:
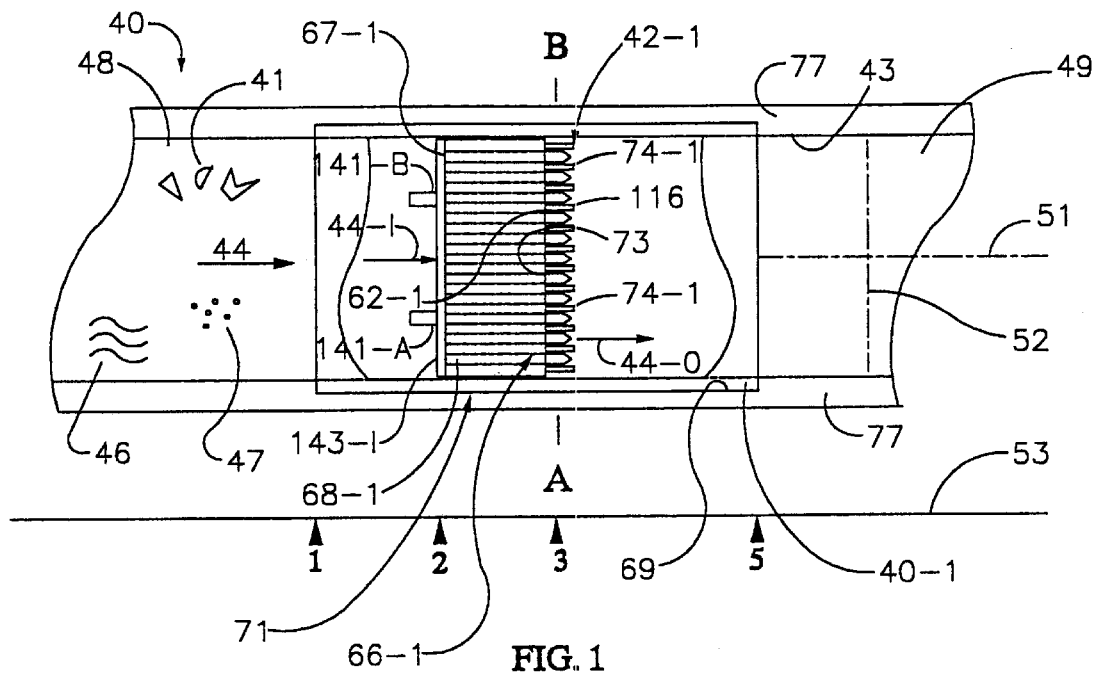
FIG. 1 is a plan view of the first embodiment of the present invention showing a reversible rake shown in a front raking position with tines facing downstream and engaging a front side of a screen, and with rake position indicated by A and B along an orientation line.

Overview of Embodiments of Bar Screen Cleaner 40

Referring now to the drawings, reference numbers designate the various elements. Reference numbers followed by a "dash" and a "number" ("-#") denote an element of one of the embodiments of the present invention, where the embodiment is identified by the "number" following the "dash".

A bar screen cleaner 40 according to the present invention removes debris 41 from a screen facility 42 positioned in a channel 43 for guiding a flow (shown by arrows 44) of liquid 46, solids 47 and the debris 41 from an upstream end 48 of the channel 43 to a downstream end 49 of the channel 43. The flow 44 is generally along a longitudinal axis 51 of the channel 43. The channel 43 is also shown having a transverse axis 52 that is perpendicular to, or across, the longitudinal axis 51. The flow 44 is shown in FIGS. 18A, 18B, 18C, 19A, 19B, 20A, 20B, 21A, 21B, 22A, and 22B, for example, as being transverse to the longitudinal axis 51 and is referred to as the flow 44-T.

Figure 2:
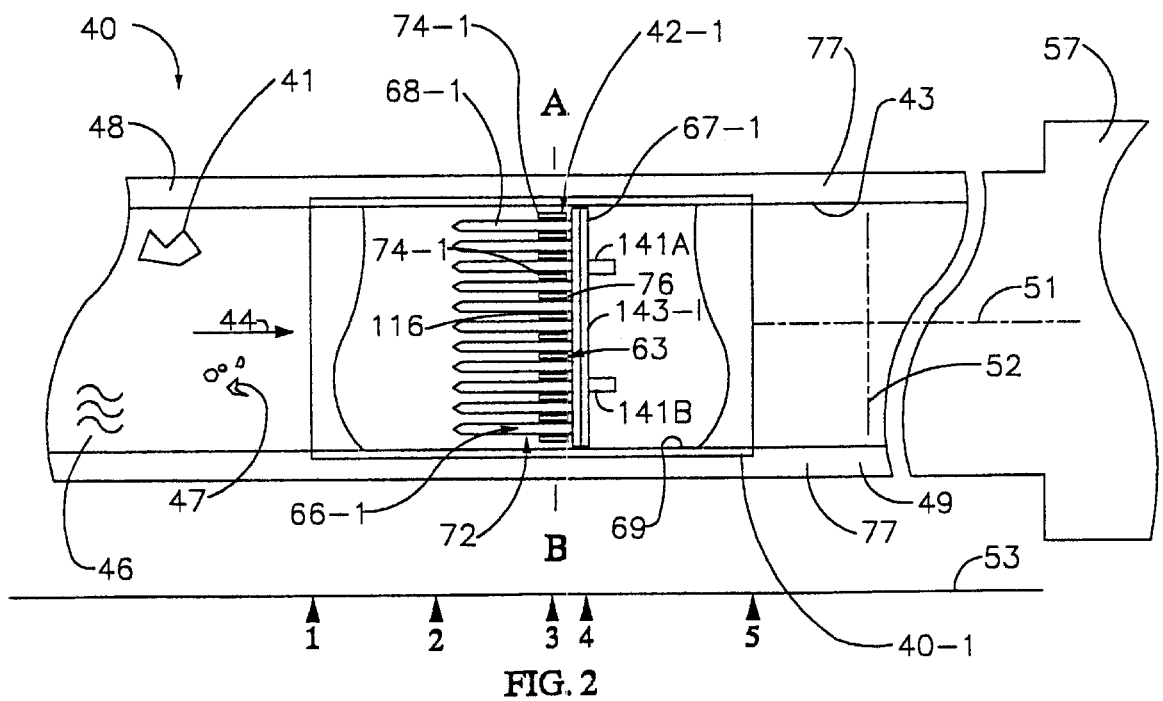
FIG. 2 is a plan view of the reversible rake shown in FIG. 1, wherein the rake is now in a back raking position with the tines facing upstream and engaging a back side of the screen and with the rake position indicated by reversed B and A along the orientation line.
Figure 7:
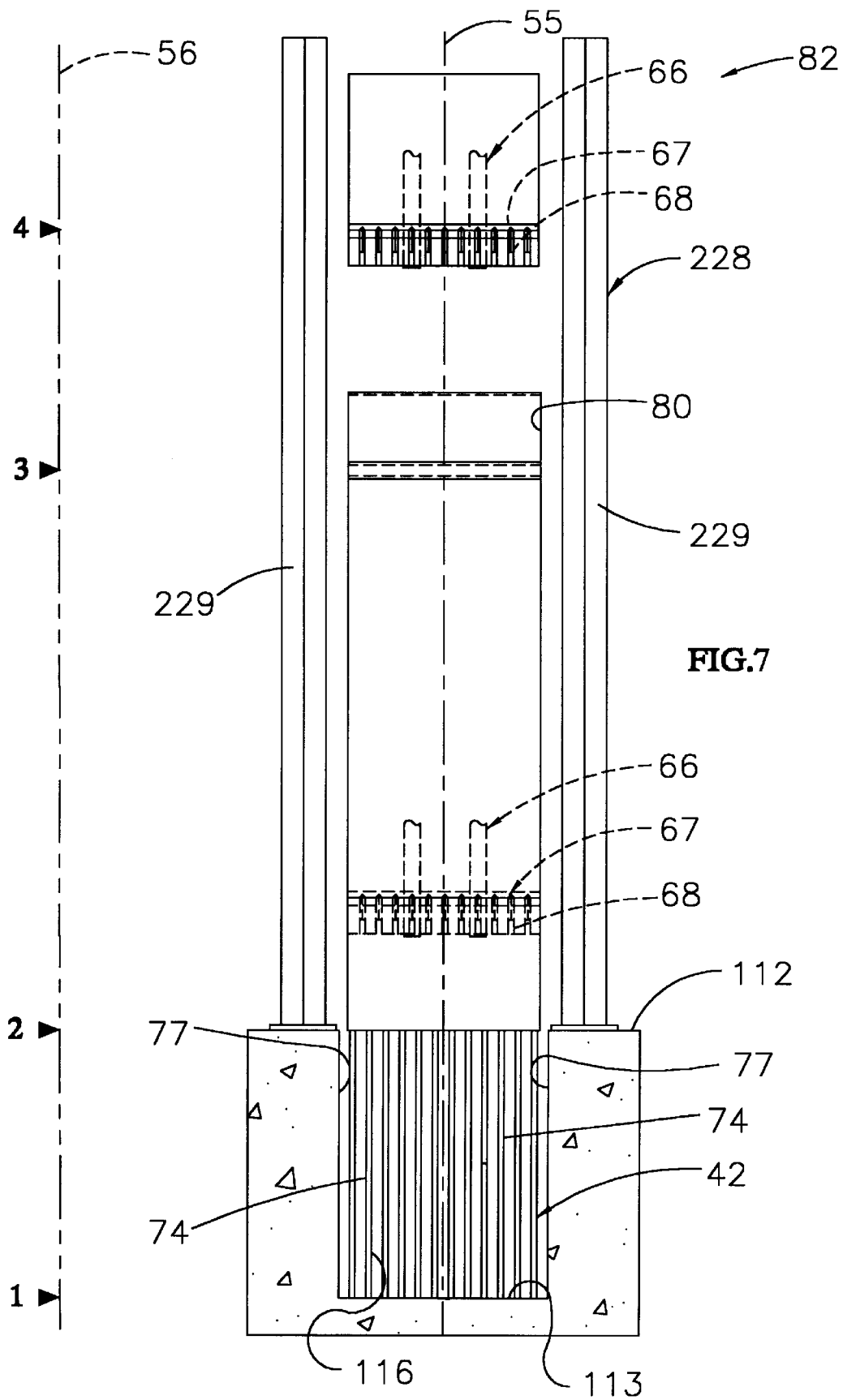
FIG. 7 is an elevational view taken along line 7—7 in FIG. 3B showing the widths of the channel, the screen in the channel, and the pan above the screen, with bars of the screen being shown spaced to receive the tines.
Figure 9:
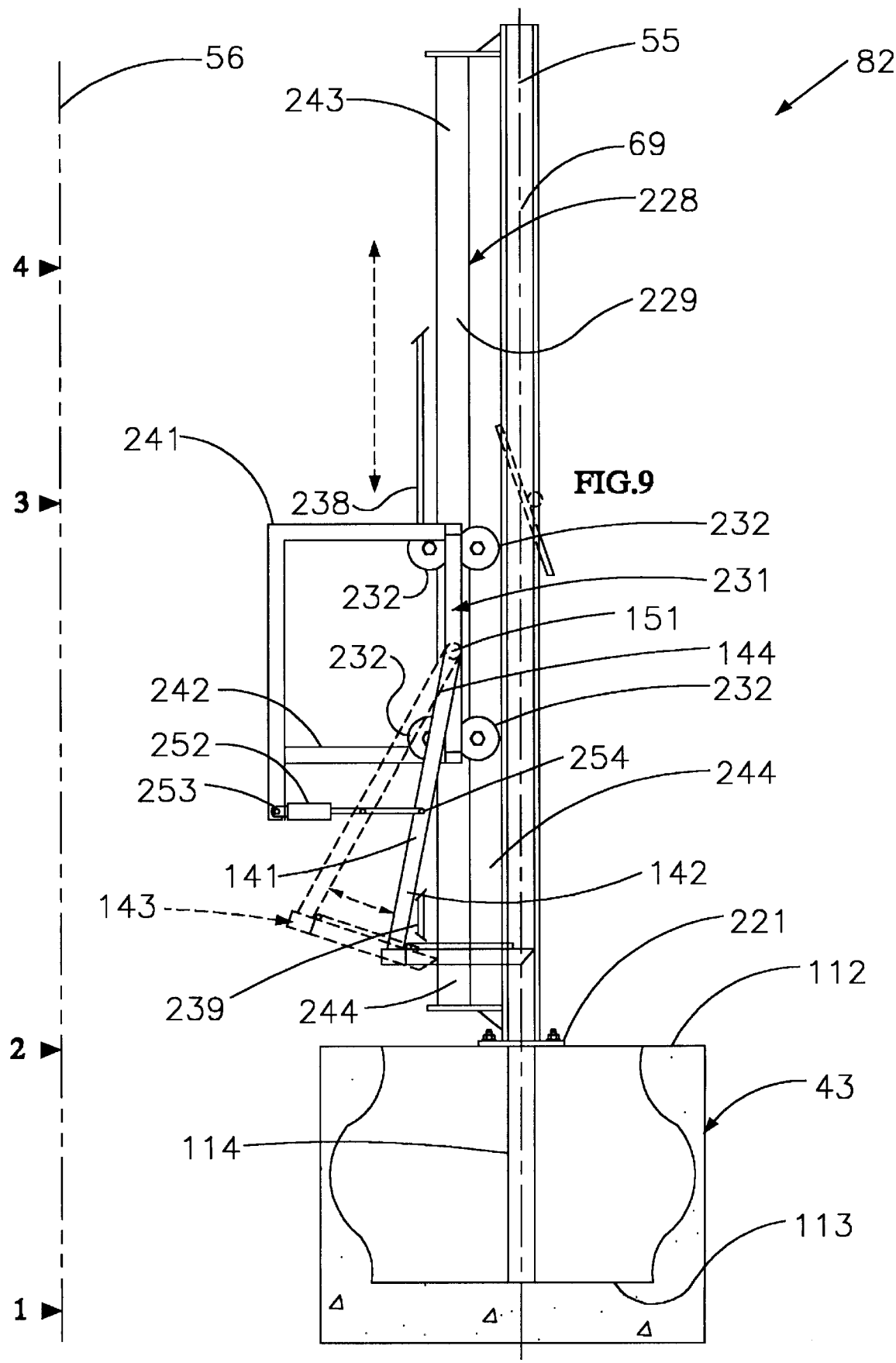
FIG. 9 is a side elevational view of the drive shown in FIG. 8, illustrating the arm positioning the rake either engaged with the pan (solid lines) or disengaged from the pan (dashed lines)

For clarity of illustration and description, various stations, or positions, along the longitudinal axis 51 are indicated by numbers, e.g., 1–5, along a longitudinal reference line 53 in FIGS. 1 and 2, for example. Various stations, or positions, along the transverse axis 52 are indicated by similar numbers along a transverse reference line 54 (e.g., FIG. 19A). In a similar manner, stations or positions along a vertical axis 55 are indicated by numbers along a vertical reference line 56 (FIGS. 3B, 7 and 9). The numbers along the various reference lines 53, 54, or 56 indicate the relative positions along the respective axis 51, 52 or 55 of elements of the bar screen cleaner 40, and permit comparisons among the various embodiments shown in the Figures.

The screen facility 42 is designed to prevent the debris 41 from flowing to a liquid treatment basin 57 (FIG. 2) downstream of the screen facility 42. The channel 43 guides the flow 44 of the liquid 46 and the solids 47 downstream from the screen facility 42 to the basin 57. The screen facility 42 has at least one upper end 61 (FIGS. 3A and 4A), at least one front side (or front face) 62 facing the upstream (incoming) flow 44-I, and at least one back side (or back face) 63 facing the downstream (outgoing) flow 44-O. A rake facility 66 has a rake 67 with tines 68 for engaging the screen facility 42 to move the debris 41 toward and past the at least one upper end 61 of the screen facility 42 to remove the debris 41 from the screen facility 42.

In each embodiment of the present invention, a frame 69 supports the rake facility 66 in either of two rake positions relative to the screen facility 42 to provide universal, front or back, raking operations. In a first rake position 71, e.g., the position shown in FIG. 1 for front raking, the tines 68 are engagable with at least a first portion 73 of the screen facility 42. For example, as to the first embodiment of the bar screen cleaner 40-1 shown in FIG. 1, the first portion 73 is the front face 62 of a screen 74 of the screen facility 42. In a second rake position 72, e.g., the position shown in FIG. 2 for back raking, the tines 68 are engagable with at least a second portion 76 of the screen facility 42. For example, in FIG. 2 the second portion 76 is the back face 63 of the screen 74 of the screen facility 42.

Reversible Rake Embodiments 40-1, 40-2, 40-3, 40-4 and 40-5

The first embodiment 40-1 of such universal bar screen cleaner 40 is adapted, for example, to mount the rake facility 66 relative to the channel 43 in either of the front raking position 71 (FIG. 1) or the back raking position 72 (FIG. 2) according to which type of raking is desired, and to be readily movable to the other position to reverse the type of raking. The first embodiment 40-1, referred to as a reversible rake/fixed screen embodiment (shown in FIGS. 1–6), has the rake facility 66 with a reversible rake 67-1 and a pan facility 81 (FIGS. 3B, 4B, 5 and 6), which are easily adjusted to facilitate the desired front raking (FIG. 3B) or back raking (FIG. 4B).

A second embodiment 40-2 of the universal bar screen cleaner 40, referred to as a reversible rake/movable screen embodiment shown in FIGS. 10–14A) has the rake facility 66 with a reversible rake 67-2 operating with a screen 74-2 of the screen facility 42. The screen 74-2 is movable from a station 2.2 (FIG. 11) according to the raking position of the rake 67-2 (front raking, FIG. 10; or back raking, FIG. 11) to facilitate the desired front raking or back raking.

Figure 18A:
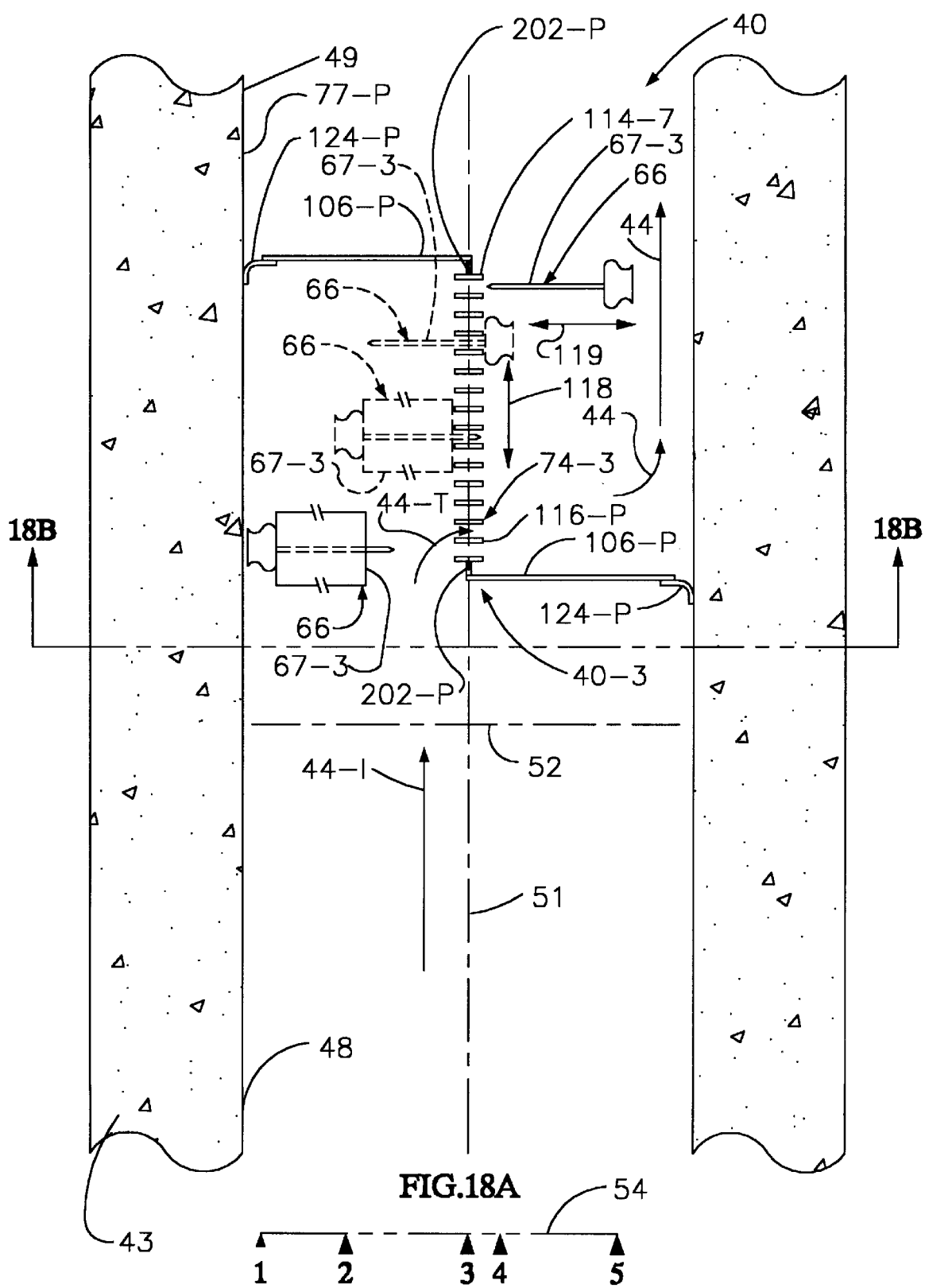
FIG. 18A is a plan view of the third embodiment of the present invention showing one screen facility extending parallel to the incoming flow (i.e., from upstream to downstream), and baffles to direct the incoming flow transversely across the channel and through the screen facility.
Figure 18B:
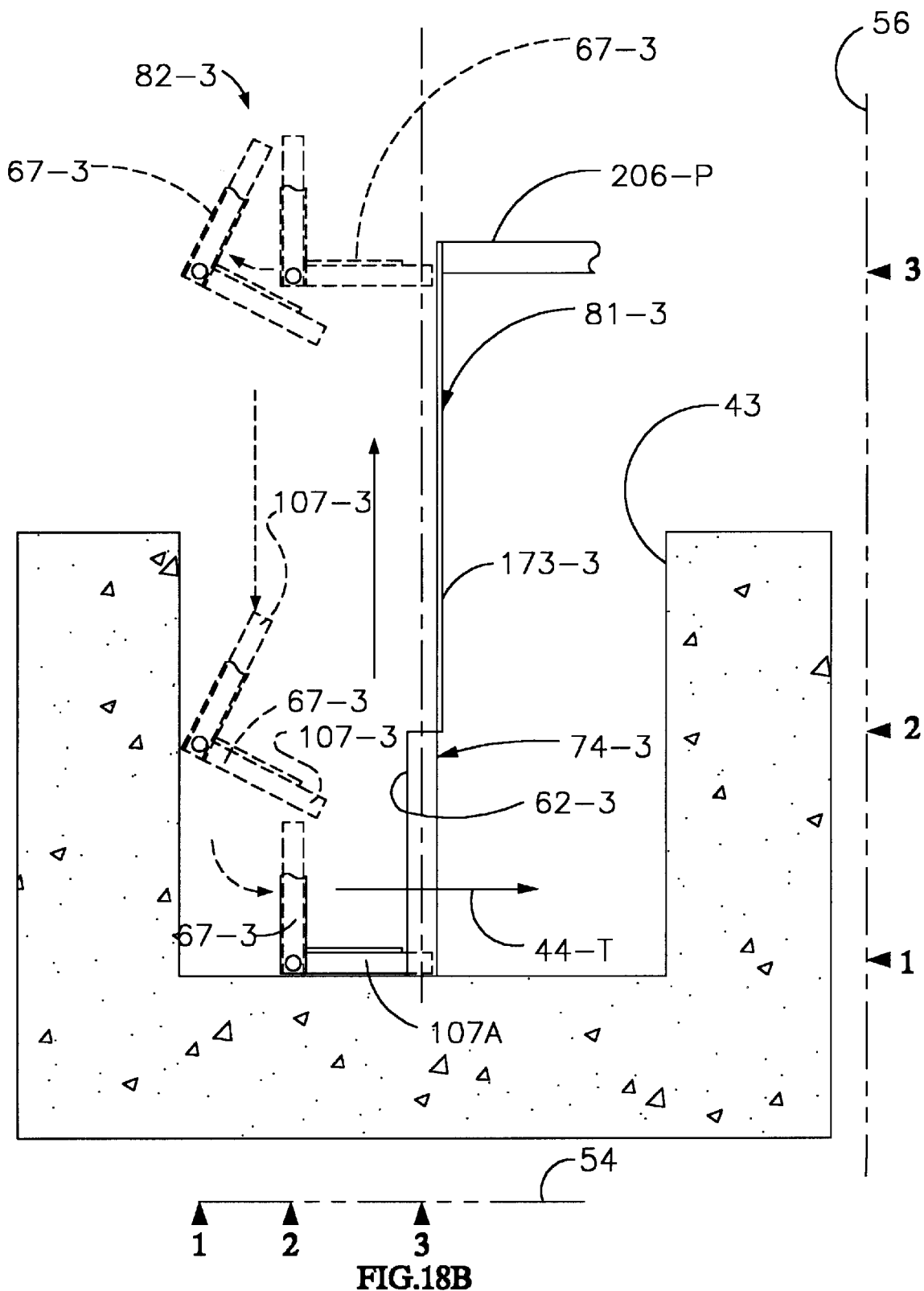
FIG. 18B is an elevational view taken on line 18B—18B in FIG. 18A, showing the motion of one reversible rake for front raking the parallel screen.
Figure 18C:
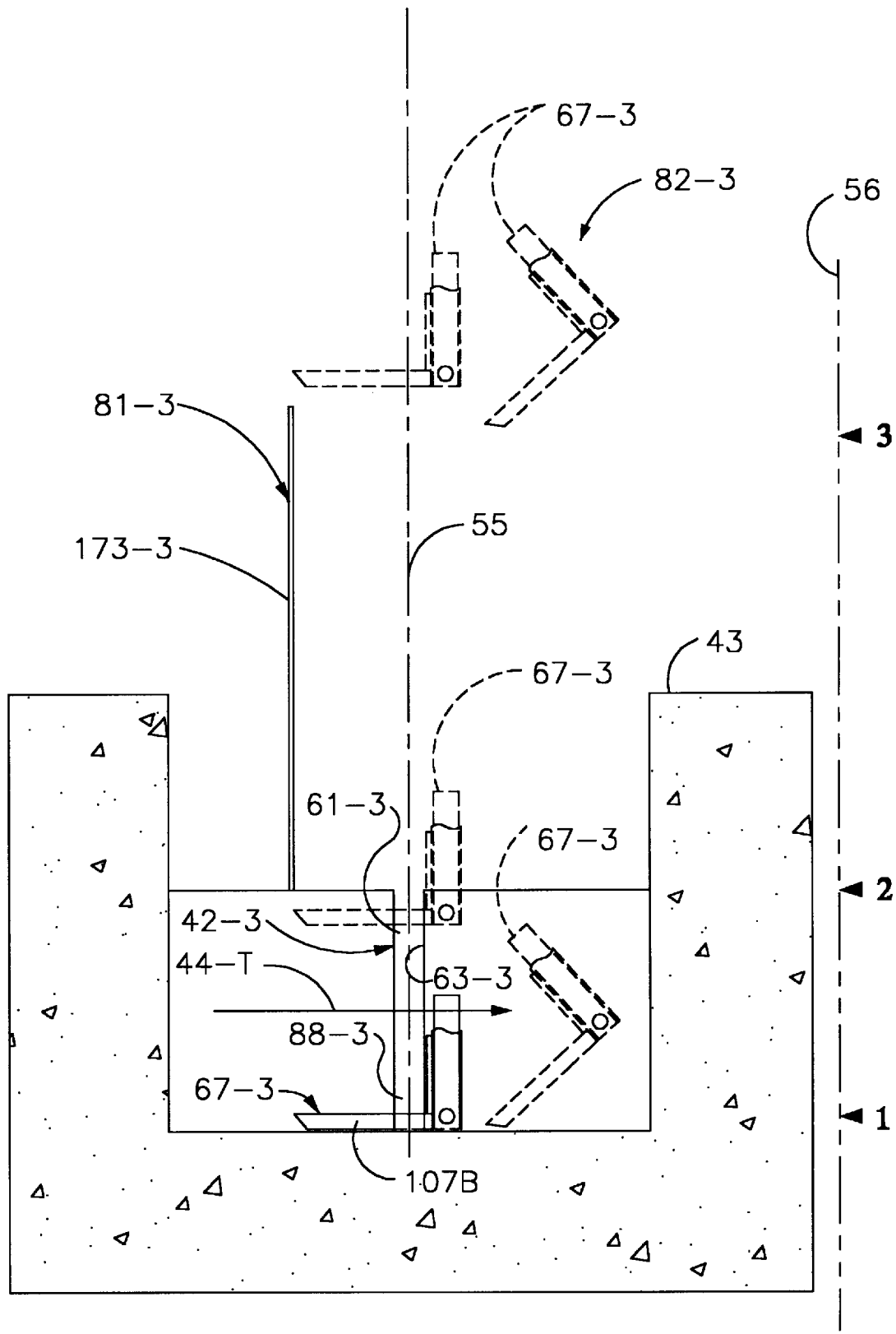
FIG. 18C is an elevational view similar to FIG. 18B, showing the reversible rake reversed for back raking the parallel screen.

A third embodiment 40-3 of the universal bar screen cleaner 40, referred to as a parallel screen embodiment (shown in FIGS. 18A–18C), has the rake facility 66 with a reversible rake 67-3 operating with one or more screens 74-3 of the screen facility 42. The screens 74-3 are positioned parallel to the incoming flow 44-I, and the flow 44-T through the screen 74-3 is transverse. The rake 67-3 may be reversed to facilitate the desired front raking (FIG. 18B) or back raking (FIG. 18C).

Figure 19A:
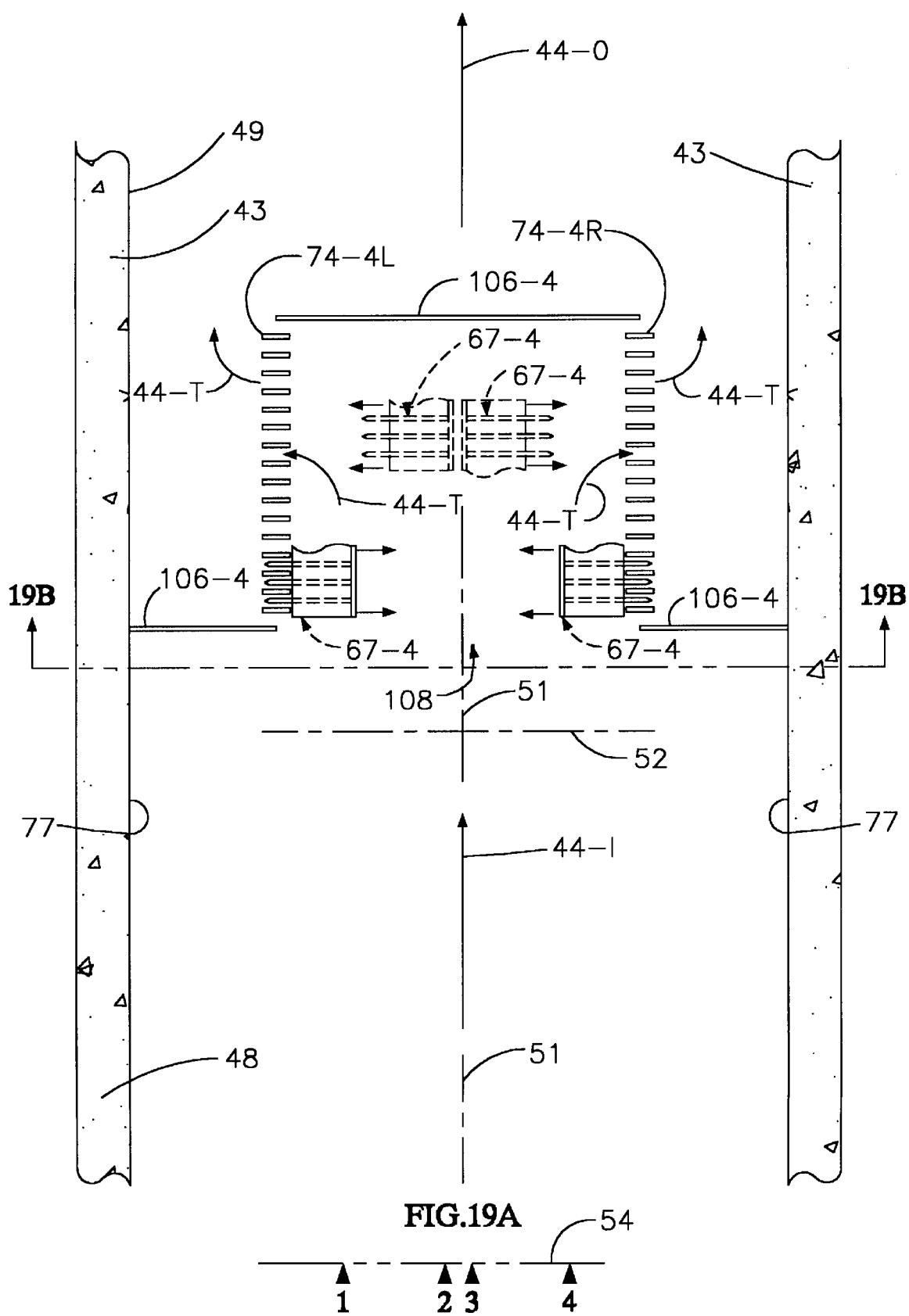
FIG. 19A is a plan view of the fourth embodiment of the present invention showing a screen facility having two screens extending parallel to the flow, and baffles to direct the incoming flow transversely across the channel inside to outside and through each of the screen, wherein a rake is shown for front raking each of the screens.
Figure 19B:
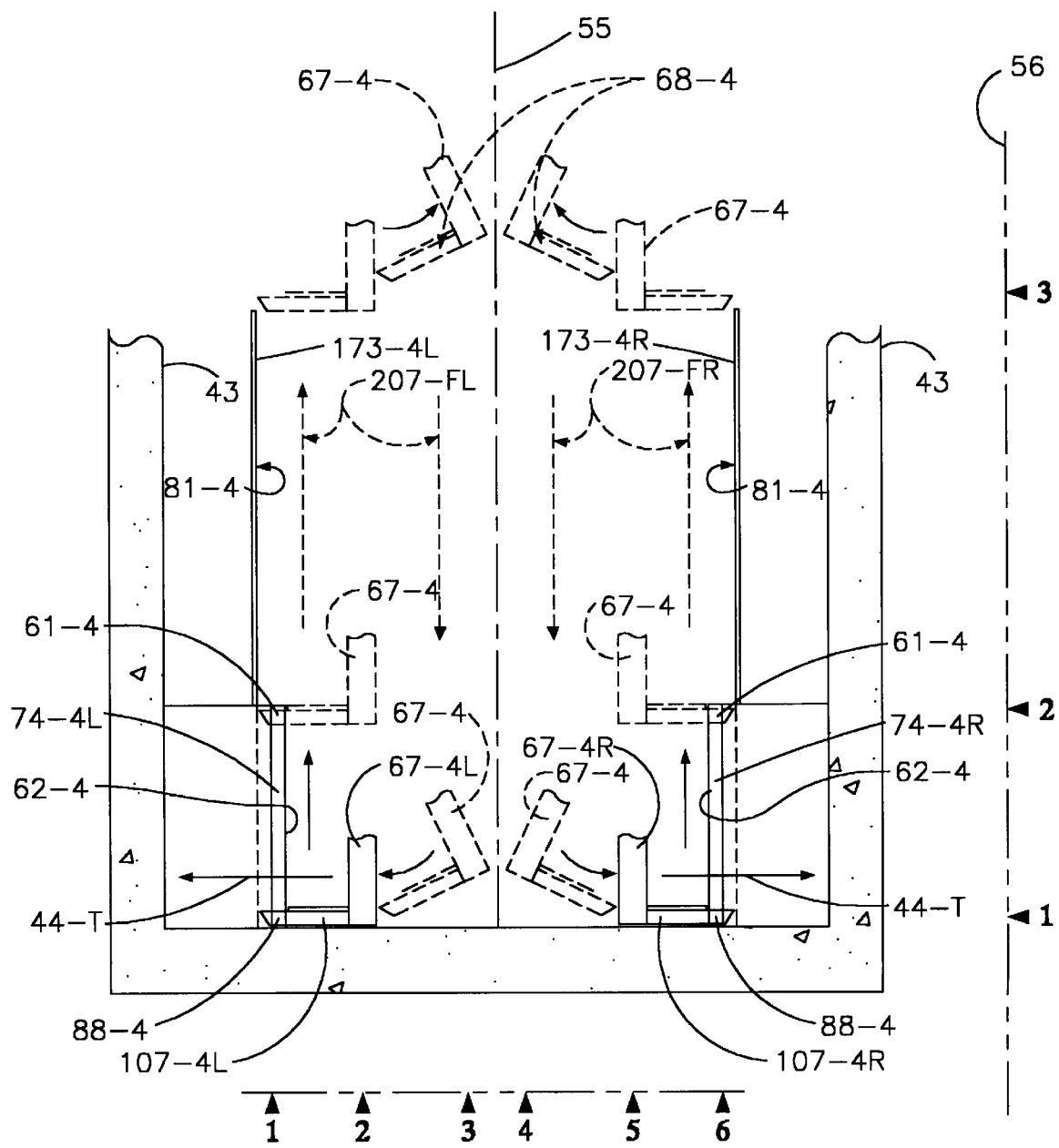
FIG. 19B is an elevational view taken on line 19B—19B in FIG. 19A, showing the motion of the two reversible rakes for simultaneously front raking the two parallel screens.
Figure 20A:
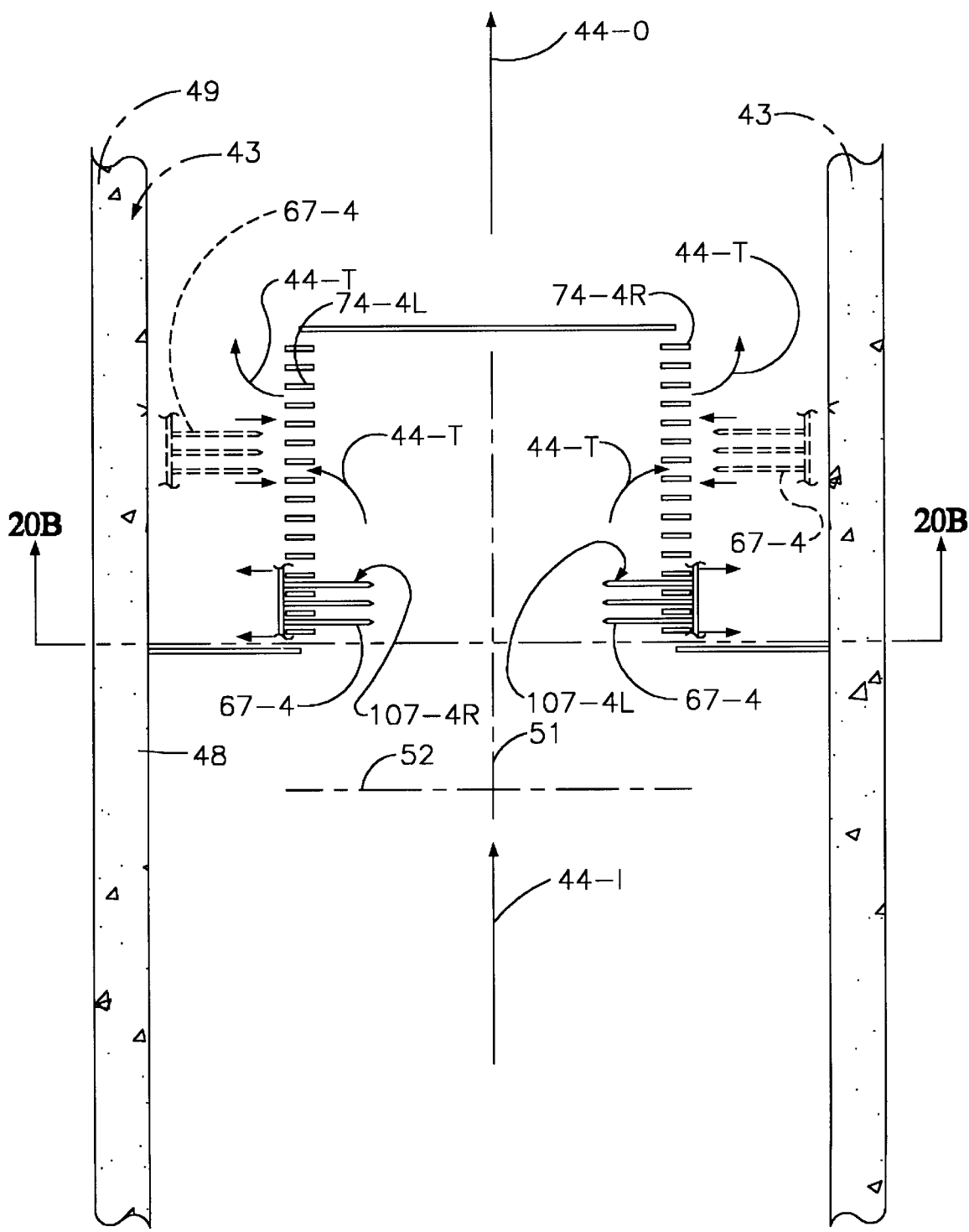
FIG. 20A is a plan view of the embodiment shown in FIG. 19A with the rake reversed for back raking.

A fourth embodiment 40-4 of the universal bar screen cleaner 40 has two parallel screens 74-4 positioned parallel to the incoming flow 44-I, and the flow 44-T through the screens 74-4 is transverse from inside, or central in the channel 43, toward outer walls 77 of the channel 43. The rake 67-4 may be reversed to facilitate the desired front raking (FIGS. 19A and 19B) or back raking (FIGS. 20A and 20B).

Figure 21A:
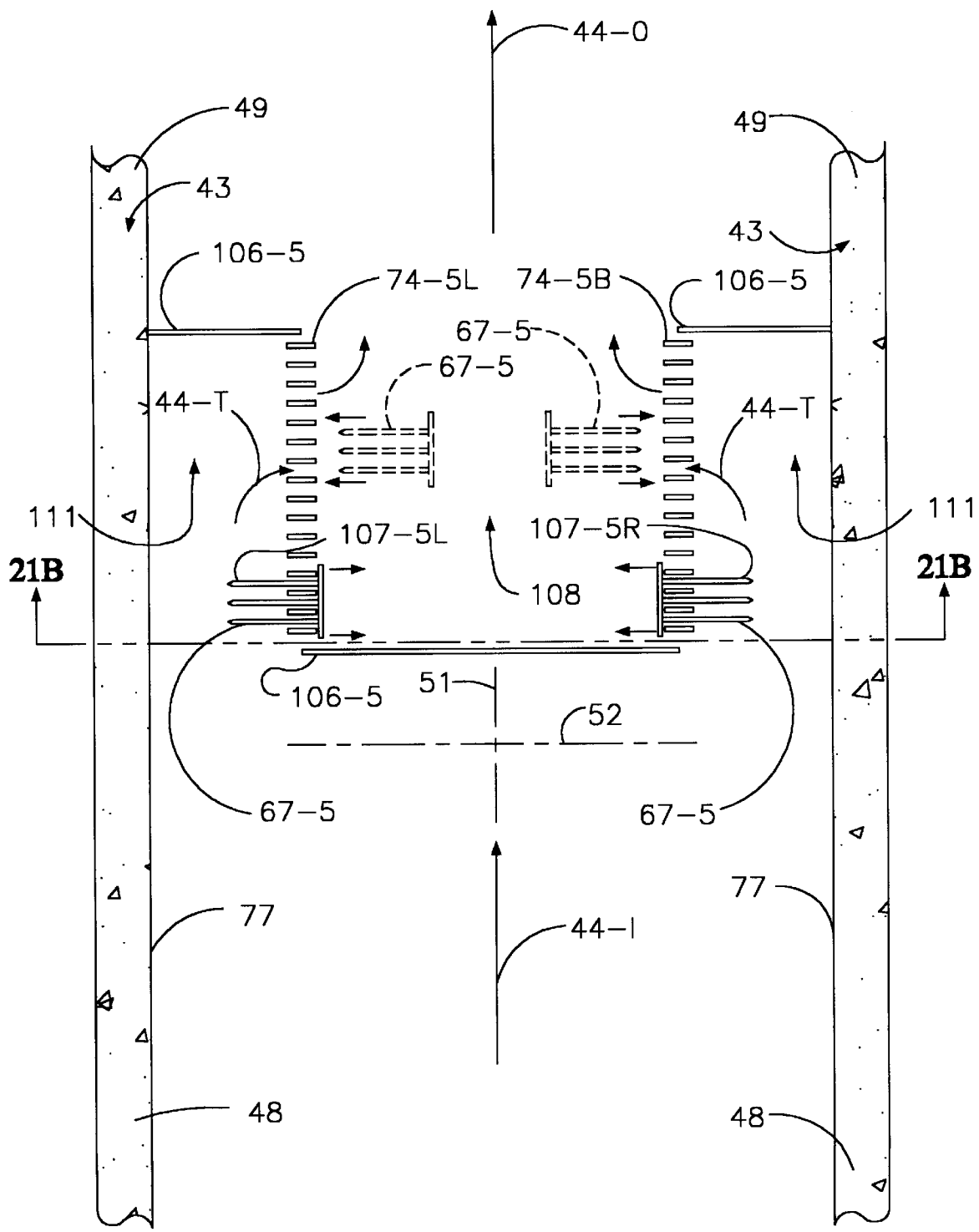
FIG. 21A is a plan view of the fifth embodiment of the present invention showing the parallel screen facility having two screens extending parallel to the flow, and baffles to direct the incoming flow transversely across the channel outside to inside and toward each of the screens, wherein a reversible rake is shown positioned for back raking.
Figure 21B:
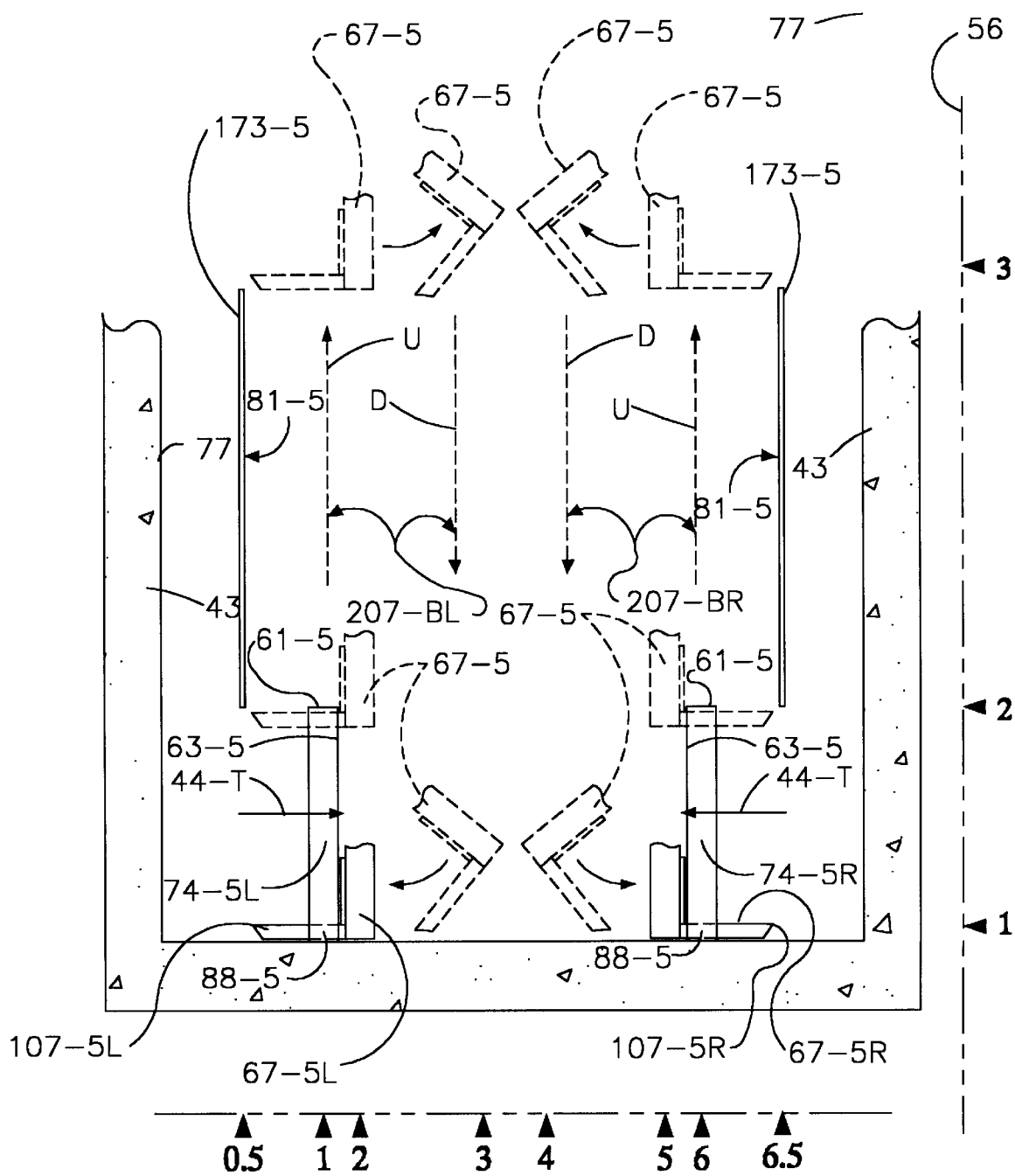
FIG. 21B is an elevational view taken on line 21B—21B in FIG. 21A, showing the motion of the reversible rake for back raking the two parallel screens.

A fifth embodiment 40-5 of the universal bar screen cleaner 40, has two parallel screens 74-5 positioned parallel to the incoming flow 44-I, and the flow 44-T through the screens 74-5 is transverse from outside, or near the walls 77 of the channel 43, toward the longitudinal axis 51 of the channel 43. The rake 67-5 may be reversed to facilitate the desired front raking (FIGS. 22A and 22B) or back raking (FIGS. 21A and 21B).

Non-Reversible Rake Embodiments 40-6 Through 40-8

A sixth embodiment 40-6 of the universal bar screen cleaner 40, referred to as a non-reversible rake/fixed screen embodiment (shown in FIGS. 16A and 16B) has the rake facility 66 with a non-reversible rake 67-6. The non-reversible rake 67-6 is one that always faces in the same direction(s) along the longitudinal axis 51. The non-reversible rake 67-6 has two-way tines 68-6 selectively engagable with either the front face 62-6 (FIG. 16A) of a single screen 74-6 of the screen facility 42 or the back face 63-6 (FIG. 16B) of the screen 74-6 to facilitate the desired respective front raking or back raking.

A seventh embodiment 40-7 of the universal bar screen cleaner 40, referred to as a non-reversible rake/dual screen embodiment (shown in FIG. 17A) has the rake facility 66 with a non-reversible rake 67-7 with two-way tines 68-7 selectively engagable with either the front face 62-7D of a downstream screen 74-7D or the back face 63-7U of an upstream screen 74-7U of the screen facility 42 to facilitate the desired respective front raking or back raking.

An eighth embodiment 40-8 of the universal bar screen cleaner 40, referred to as a simultaneous front/back raking embodiment (shown in FIG. 17B) has the rake facility 66 with two of the non-reversible rakes 67-8, each with tines 68-8. One rake 67-8F is engagable with the front face 62-8 of a downstream screen 74-8D and the other rake 67-8C is engagable with the back face 63-8 of an upstream screen 74-8U of the screen facility 42 to facilitate simultaneous respective front raking and back raking.

Programmed Drive 82

Figure 8:
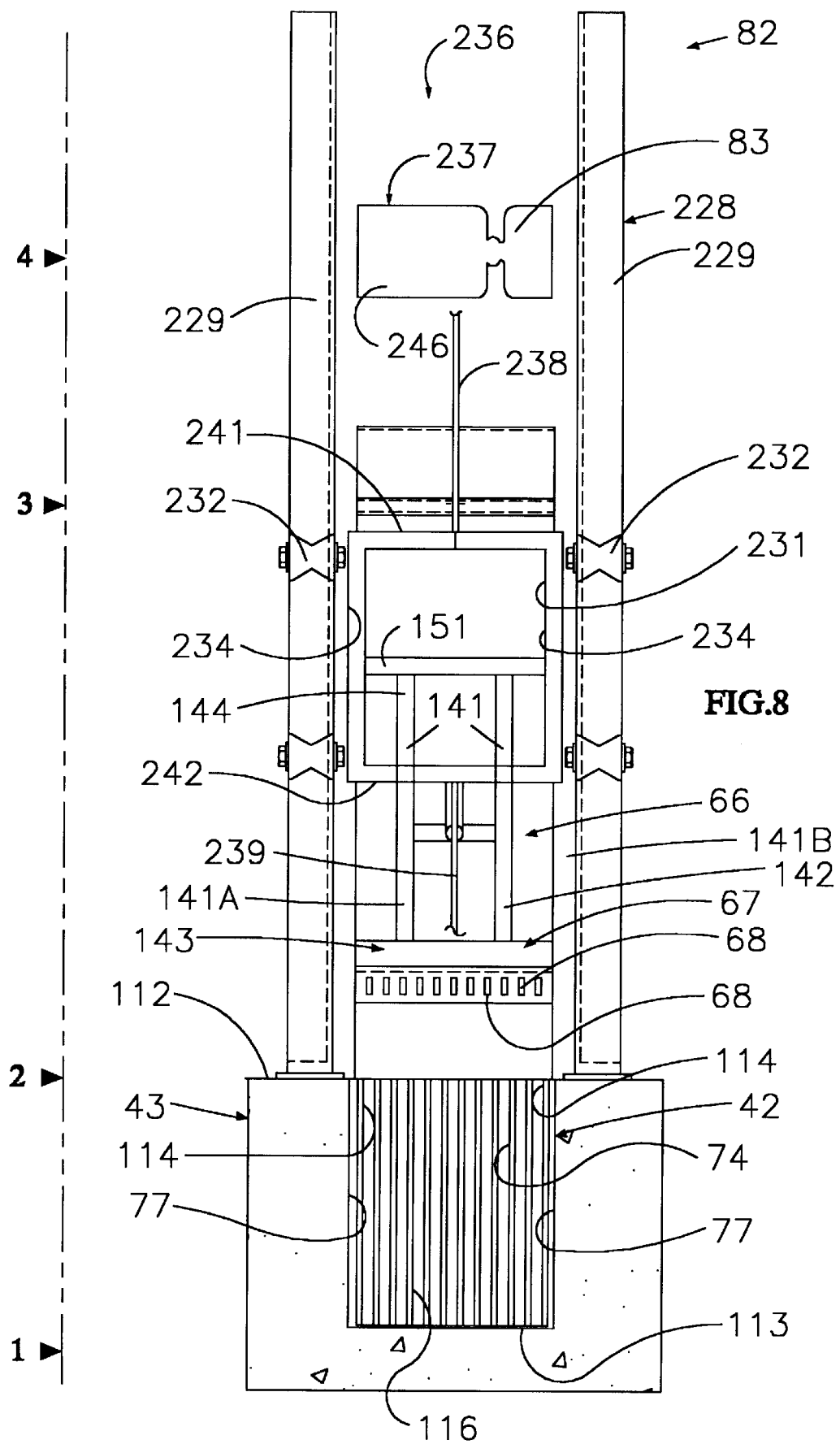
FIG. 8 is an elevational view looking along the channel at a drive for the rake, showing a pair of guide rods supporting a carriage on which an arm is movably mounted to position the rake relative to the screen.
Figure 15:
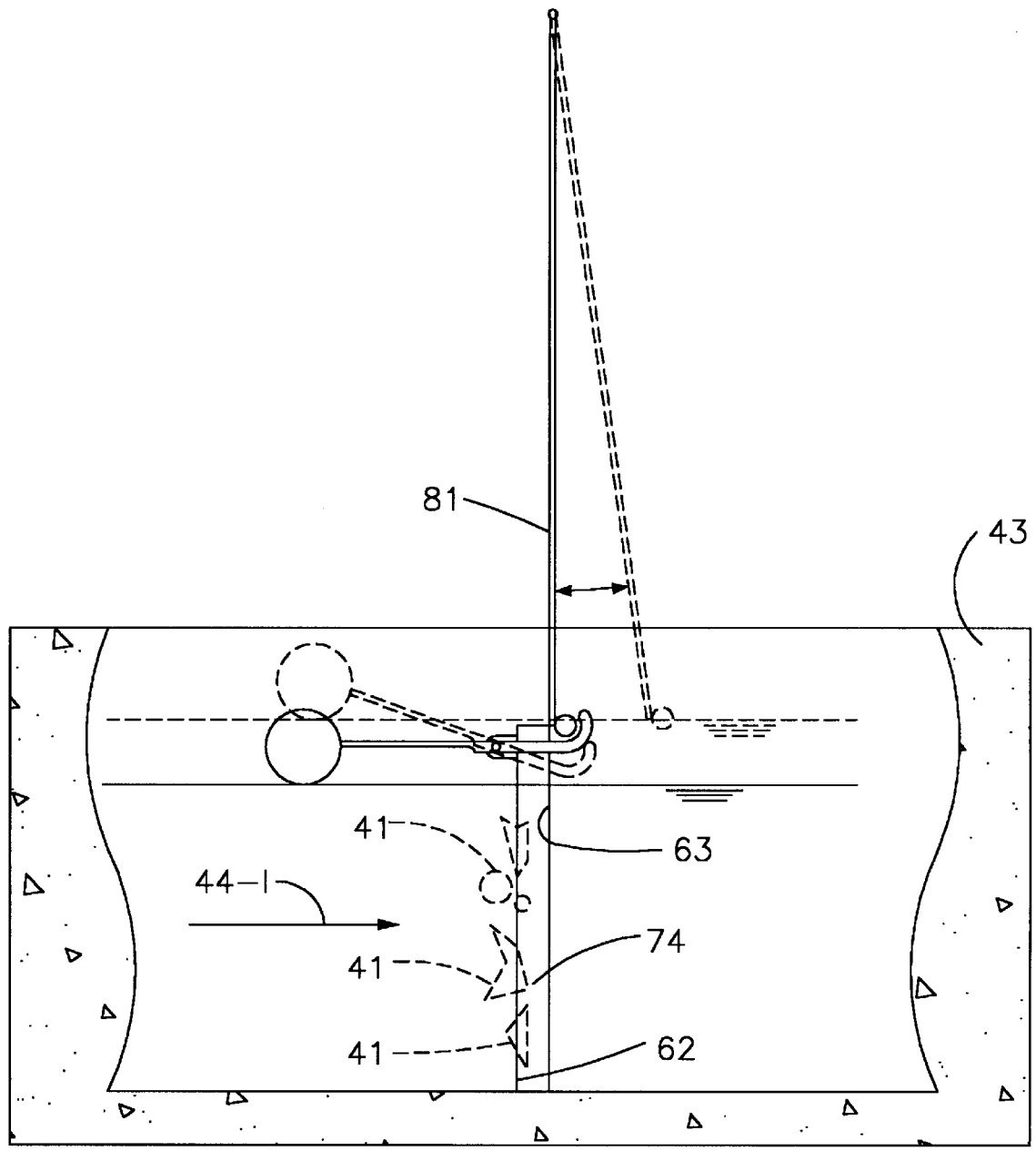
FIG. 15 is a cross-sectional view of the screen and pan shown in FIG. 12, further showing a sensor for response to the level of the liquid, the solids and the debris in the channel, wherein dashed lines show the sensor moved by high liquid level to release the pan for movement into the dashed line position of the pan to permit the liquid to flow over the top of the screen and past the pan when the debris shown in dashed lines has blocked the front face of the screen.
Figure 27:
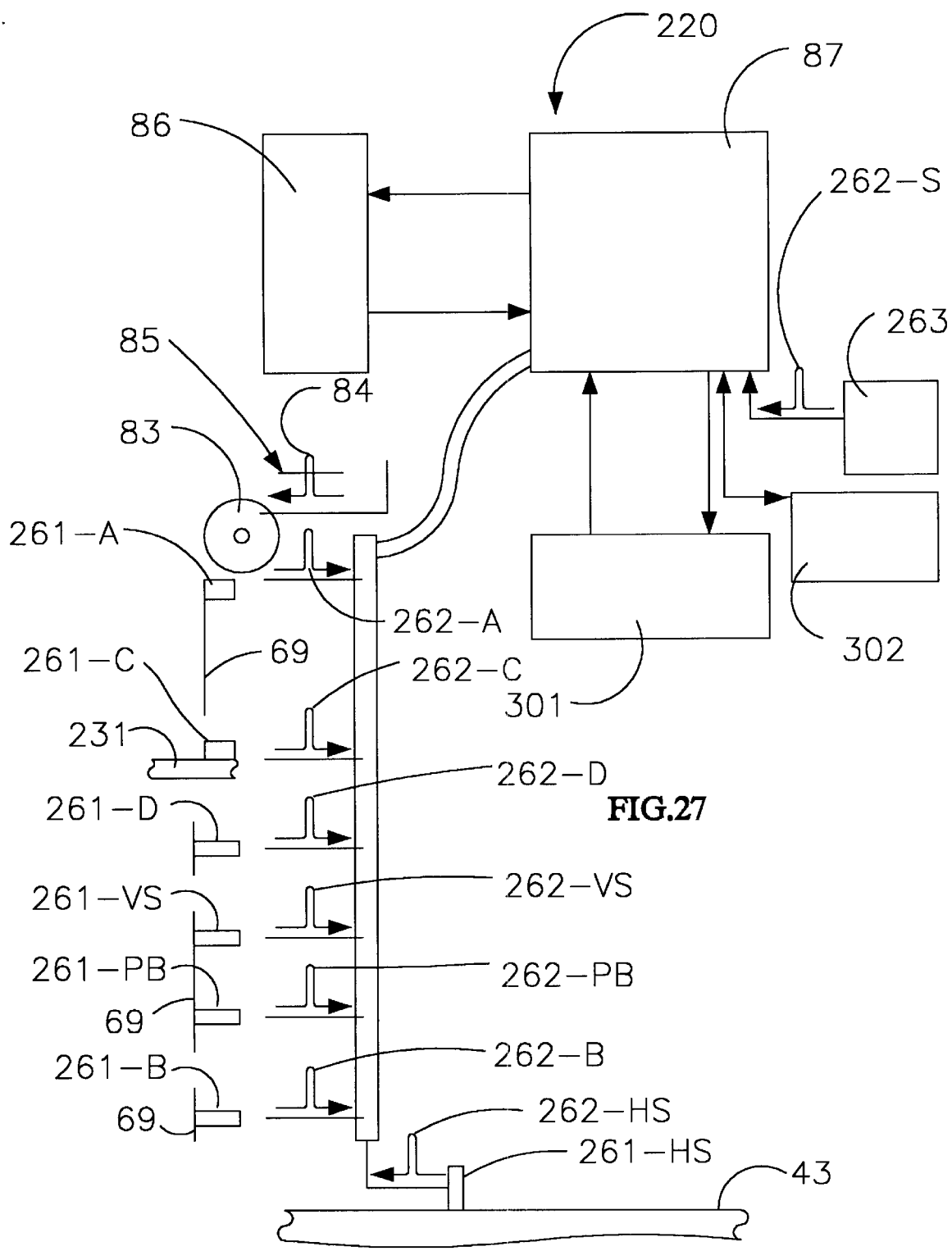
FIG. 27 is a diagram of a computer for controlling the operational cycles of the programmed bar screen cleaner, illustrating registers for storing data relating to events in such cycles, the by-pass counter, and a bus for carrying data to and from the bar screen cleaner.

Referring to FIGS. 7–9, automatic and programmed raking operations are provided by a programmed drive 82 for all of the embodiments 40-1 through 40-8 of the present invention. An important example of the use of the programmed drive 82 is in the situation in which the debris 41 becomes jammed in the screen 74 (FIG. 15). The jammed debris 41 resists movement of the rake 67 (not shown in FIG. 15) along the screen 74, causing the rake 67 to slow significantly or stop. A drive motor 83 (FIGS. 8 and 27) of the drive 82 for the rake 67 becomes overloaded, which is indicated by motor current 84 (FIG. 27) in excess of a limit 85. When the excess current 84 exists, the rake 67 is said to be jammed. In response to the sensed jam (i.e., excess current 84), the drive 82 causes the rake 67 to be positively released, or disengaged, from the appropriate face 62 or 63 of the screen 74. Further movement of the rake 67 is controlled according to the nature of the problem which caused the jamming of the debris 41 in the screen 74. A program 86 (FIGS. 27 and 25A–25F) is provided for operating a computer 87 which controls operation of the drive 82. Steps of the program 86 are referred to as "S" plus a number. As an example shown in the portion of the program 86 depicted in FIG. 25B, if the rake 67 becomes jammed during a raking stroke (upward in FIG. 3B), the jam is sensed (S320). In response to the sensed jam, and according to the nature of the problem, the rake 67 may be positively removed from the face 62 or 63 of the screen 74 (S345, FIG. 25D, or S365, FIG. 25E). Alternates for further movement of the rake 67 include:

S370, FIG. 25E: rake 67 is moved to by-pass the jam by performing S110–S112, S210 and S310; or S345, FIG. 25D: rake 67 is advanced in the direction of the original stroke, then returned to the face 62 or 63, and then moved toward the original position at the beginning of the stroke in an attempt to remove the jammed debris 41 from the face 62 or 63 of the screen 74.

As another example, having found that much debris 41 that causes jamming tends to be at or near a lower end, or bottom, 88 of the screen 74 (FIG. 3B), upon sensing jamming of the rake 67 (S320, FIG. 25B), the original position at which the rake 67 engages the screen 74 may be adjusted (S360, FIG. 25E) to be spaced from the bottom 88 so as to avoid having the rake 67 be jammed on each stroke of the rake 67.

These programmed controls of the rake 67 are intended to allow substantial numbers of screening operations, or cycles, to take place without emergency (human) intervention. Further, these raking events (e.g., jamming) are recorded (S325, S335 and S340, FIG. 25C; S349 and S355, FIG. 25D) so that at a regularly scheduled time a plant operator may review the screening events (see Table 3 below) which have taken place, and then set or re-program the raking operations. Alternatively, if unusual debris 41 is expected to be in the incoming liquid 46, and may give rise to special problems in screening, the programmed operation may be set according to the anticipated problems.

Methods of Removing Debris 41 From Screen Facilities 42

Methods of the present invention are provided for removing debris 41 from the flow channel 43 which carries the liquid 46, the solids 47 and the debris 41. The first reversible rake/fixed screen embodiment 40-1 operates according to the method shown in FIGS. 1–6, and 31. The method includes the step S1000 of mounting the screen 74 across the flow channel 43 to intercept the debris 41 and allow the liquid 46 and the solids 47 to flow past the screen 74. The screen 74 has the upper end 61, the bottom 88, the front face 62 and the back face 63. A step S1010 provides the rake 67 having the tines 68 to engage the screen 74. A step S1020 reversibly mounts the rake 67 to position the tines 68 either to engage the front face 62 of the screen 74 (front rake position 71) or the back face 63 of the screen 74 (back rake position 72). In either of the rake positions 71 or 72, there is a step S1030 of moving the rake 67 from the bottom 88 to the upper end 61 of the screen 74 to remove the debris 41 from the screen 74.

Figure 10:
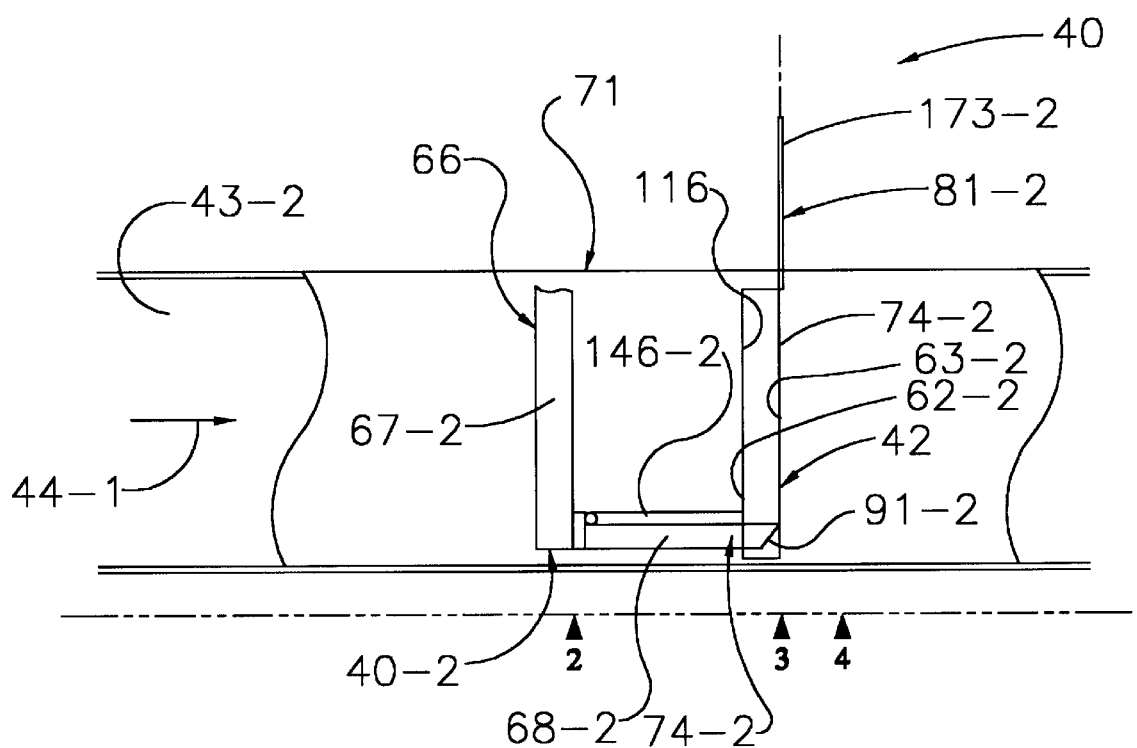
FIG. 10 is a schematic view of the second embodiment of the present invention having the reversible rake operating with a screen that is movable in the direction of the flow into one of two positions according to the raking position of the rake, showing a rake head carried by the arm to support the tines and the limiter, where the limiter is shown pivoted on the head in the down position for front raking with the screen in an upstream position aligned with the pan.

The second reversible rake/movable screen embodiment 40-2 operates according to another method of the present invention shown in FIGS. 10 through 13, 32A and 32B. The method includes the mounting step S2000 which mounts the screen 74-2 for movement along the flow channel 43 between two screen positions, one at station 2.2 (FIG. 11) and the other at station 3 (FIG. 10). Step 2010 provides the tines 68-2 of the rake 67-2 with the distal ends 91-2 extending from proximal ends 92-2. Step 2020 reversibly mounts the rake 67-2 either (i) upstream of the screen 74-2 (which is at station 3) with the distal ends 91-2 of the tines 68-2 engaging the front face 62-2 of the screen 74-2 (FIG. 10), or (ii) downstream of the screen 74-2 in the other of the screen positions (station 2.2) with the tines 68-2 extending through the screen 74-2 and the proximal ends 92-2 engaging the back face 63-2 of the screen 74.

The sixth non-reversible rake/fixed screen embodiment 40-6 (FIGS. 16B, 33A and 33B) operates according to another method of the present invention and includes a step S3000 of mounting the screen 74-6 across the flow channel 43 to intercept the debris 41 and allow the liquid 46 and the solids 47 to flow past the screen 74-6. A step S3010 provides the rake 67 having two sets 93 of tines 68. One of the sets 93A is for engaging the front face 62-6 of the screen 74. The other of the sets 93B is for engaging the back face 63-6 of the screen 74-6. A step S3020 mounts the rake 67-6 for movement on both the front face 62-6 and the back face 63-6 of the screen 74-6 to either position the one set 93A of tines 68-6 to engage the front face 62-6 of the screen 74-6 or to position the other set 93B of tines 68-6 to engage the back face 63-6 of the screen 74-6 so that both back raking and front raking may be performed with the same rake 67-6.

Figure 17A:
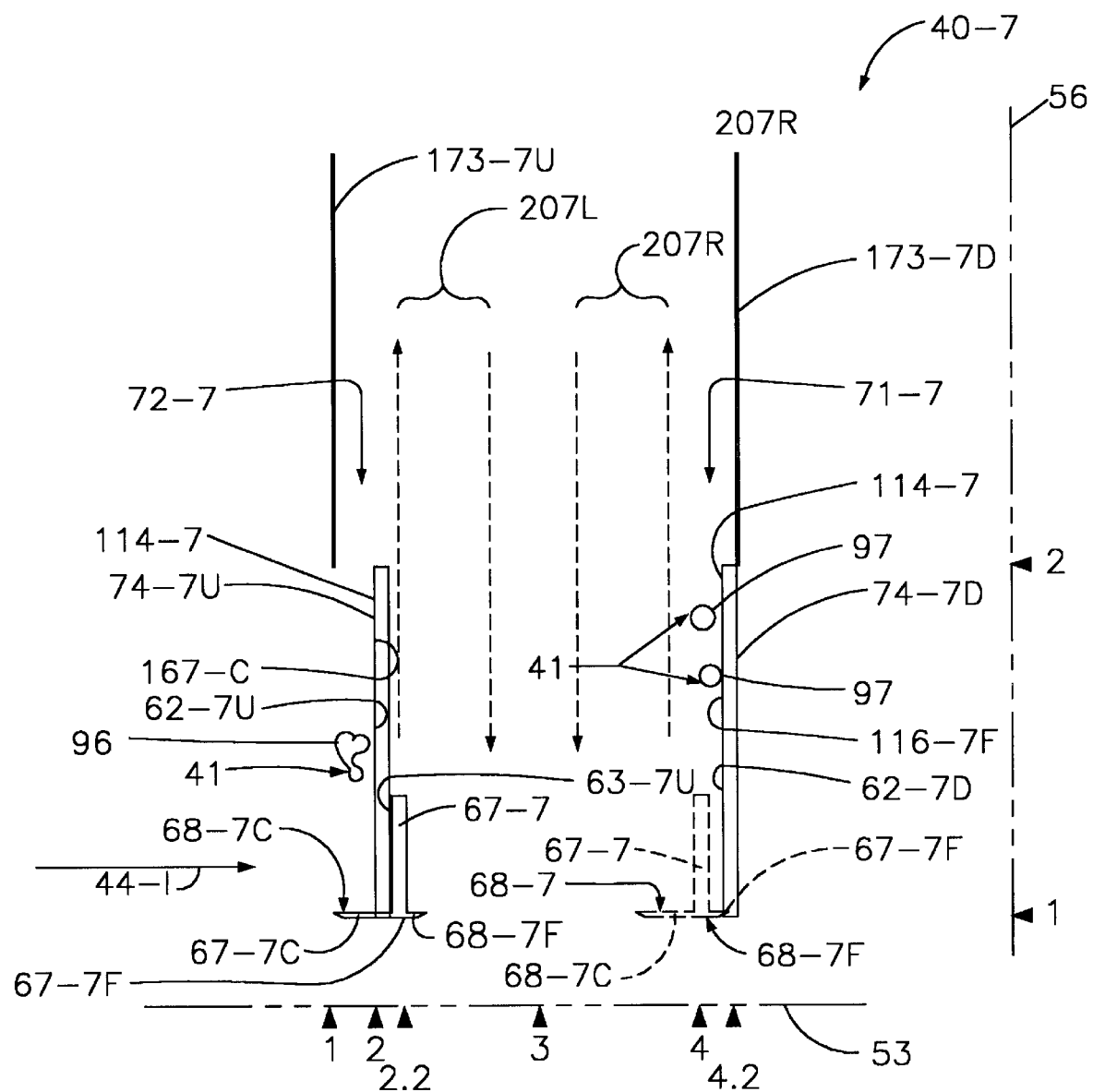
FIG. 17A is an elevational view of the seventh embodiment of the present invention illustrating two screens, one at an upstream location for back raking, and the other at a downstream location for front raking, wherein a two-way rake performs the raking.

The seventh non-reversible rake/dual screen embodiment 40-7 operates according to another method of the present invention as shown in FIGS. 17A, 34A and 34B. The method includes a step S4000 of mounting two screens 74-7 across the flow channel 43 at fixed, spaced respective upstream and downstream stations 2 and 4.2 to selectively intercept large pieces 96 and small pieces 97 of the debris 41 and allow the liquid 46 and the solids 47 to flow past the screens 74-7. The upstream screen 74-7U is for intercepting the large pieces 96 and the downstream screen 74-7D is for intercepting the small pieces 97 of the debris 41. Step S4010 provides the rake 67-7 having two sets 101 of tines, one of the sets 101A being for engaging the upstream screen 74-7U, the other of the sets 101B being for engaging the downstream screen 74-7D. In step S4020, the rake 67-7 is mounted for movement between the two spaced screens 74-7U and 74-7D, with the one set 101A of tines 68-7 (shown in solid lines) positioned to engage the back face 63-7U of the upstream screen 74-7U and the other set 101B of tines 68-7 (shown in dashed lines) positioned to engage the front face 62-7D of the downstream screen 74-7D so that both back raking and front raking may be performed with the same rake 67-7.

Figure 17B:
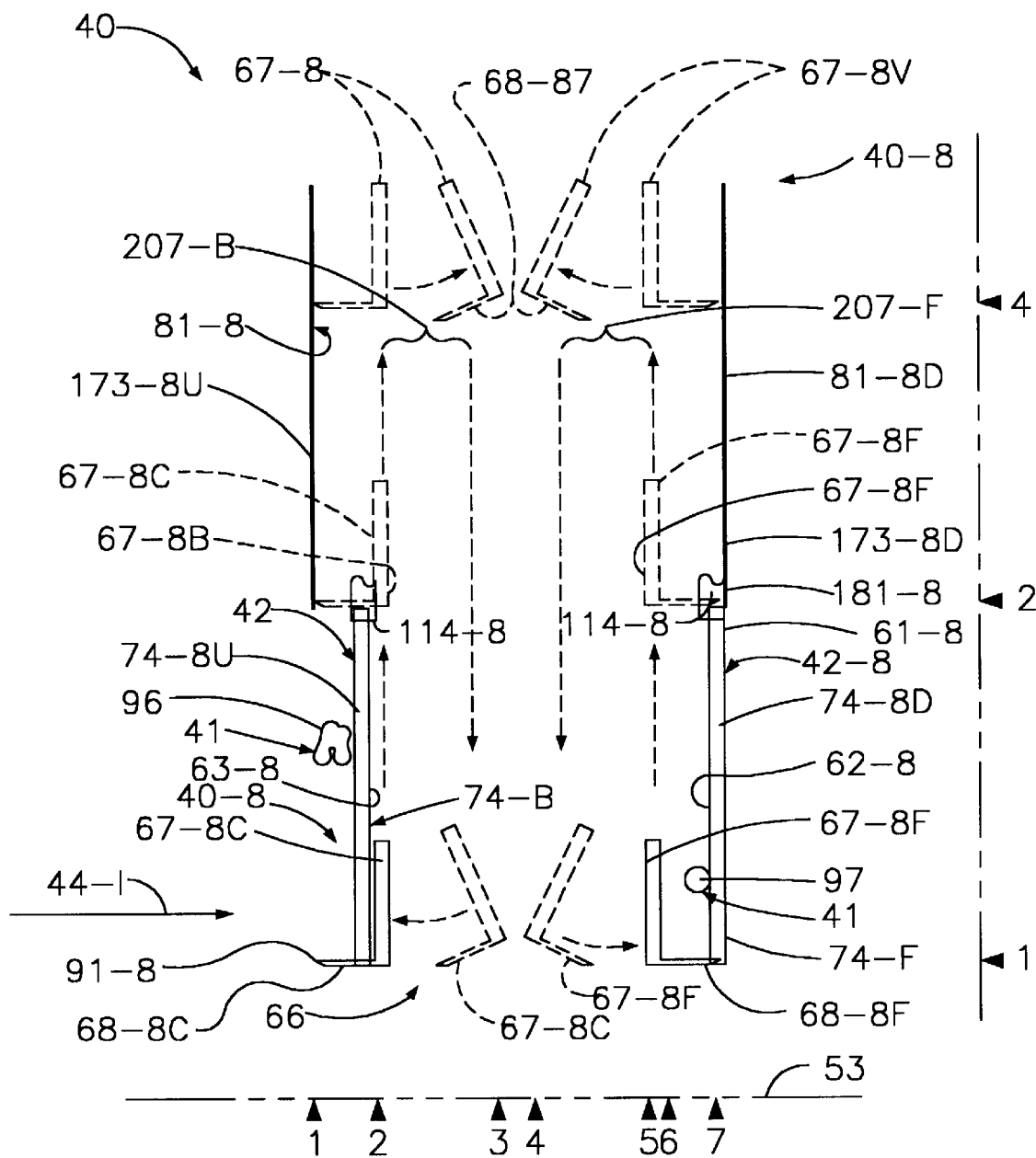
FIG. 17B is an elevational view of the eighth embodiment of the present invention illustrating two of the non-reversible rakes, one rake with tines for front raking the front face of a downstream screen and the other rake with tines for back raking an upstream screen to facilitate simultaneous respective front raking and back raking.

The eighth non-reversible rake/dual screen embodiment 40-8 operates according to another method of the present invention to provide simultaneous front and back raking as shown in FIGS. 17B, 35A and 35B. The method includes step S5000 which mounts two screens 74-8 across the flow channel 43 at spaced respective upstream and downstream locations to selectively intercept large pieces 96 of debris 41 and small pieces 97 of the debris 41 and allow the liquid 46 and the solids 47 to flow past the screens 74-8. The upstream screen 74-8U is for intercepting the large pieces 96 and the downstream screen 74D is for intercepting the small pieces 97. In step S5010 there are provided two rakes 67-8C and 68-8F having respective coarse tines 68-8C and fine tines 68-8F. The tines 68-8C are for engaging the upstream screen 74-8U, and the tines 68-8F are for engaging the downstream screen 74-8D. In step S5020 the rakes 67-8C and 68-8F are mounted for movement between the two screens 74-8U and 74-8D to simultaneously position the rake 67-8C to engage the back face 63-8 of the upstream screen 74-8U and to position the rake 67-8F to engage the front face 62-8 of the downstream screen 74-8D to facilitate simultaneous respective front raking and back raking.

The third parallel screen embodiment 40-3 (FIGS. 18A–18C, 36A, and 36B) operates according to another method of the present invention to provide a screen 40-3 parallel to the incoming flow 44-I. The method includes step S6000 of mounting at least one screen 74-3 in the flow channel 43 parallel to the longitudinal axis 51 (along the incoming flow 44-I). A step S6010 mounts baffles 106-3 in the flow channel 43 parallel to the transverse axis 52 to divert the incoming flow 44-I into transverse flow 44-T through the screen 74-3 to intercept the debris 41 and allow the liquid 46 and the solids 47 to flow transversely through the screen 74-3. A step S6020 provides a rake 67-3 (FIGS. 40A–40C) having two sets 107-3 (FIG. 18B) of tines 68-3. A first set 107A (FIG. 18B, or 107-RP in FIG. 40B) of the sets 107-3 is for engaging the front face 62-3 of the screen 74-3 and a second set 107B (FIG. 18C, or 107-LP in FIG. 40A) of the sets 107-3 is for engaging the back face 63-3 of the screen 74-3. A step 6030 mounts the rake 74-3 to position the respective sets 107A or 107B of tines 68-3 to either engage the front face 62-3 of the screen 74-3 or the back face 63-3 of the screen 74-3. A step 6040 is done in either of the positions of the sets 107A or 107B of tines 68-3 (engaged with the screen 74-3) by moving the rake 67-3 from the bottom 88-3 of the screen 74-3 to the upper end 61-3 of the screen 74-3 to remove the debris 41 from the screen 74-3.

The fourth and fifth parallel screen embodiments 40-4 and 40-5, respectively, operate according to two other methods of the present invention. Each method provides two screens 74-4L and 74-4R in S7000, and screens 74-5L and 74-SR in S8000, respectively, parallel to the incoming flow 44-I.

In the fourth embodiment (FIGS. 19A, 19B, 20A, 20B, 37A and 37B), a step S7010 mounts the baffles 106-4 in the flow channel 43 parallel to the transverse axis 52 to divert the incoming flow 44-I from a center 108 of the channel 43 into two opposed transverse flows 44-T transversely through the respective screens 74-4L and 74-4R to enable each screen 74-4L and 74-4R to intercept the debris 41 and allow the liquid 46 and the solids 47 to flow past the screens 74-4L and 74-4R. A step S7020 provides the reversible rake 67 as a rotary rake 67-4 (FIGS. 40A and 40B) having two sets 107-4 of tines 68-4. A step S7030 adjusts the rotary position of the rake 67-4. FIG. 19B shows rake positions in which the set 107-4L of tines 68-4 engages the front face 62-4 of the left screen 74-4L, and the set 107-4R engages the front face 62-4 of the right screen 74-4R. FIG. 20B shows rake positions in which the set 107-4L of tines 68-4 engages the back face 63-4 of the right screen 74-4R, and the set 107-4R engages the back face 63-4 of the left screen 74-4L. A step 7040 is done in either of the positions of the sets 107-4R or 107-4L of tines 68-4 (engaged with the screen 74-4) by moving the rake 67-4 from the bottom 88-4 of a selected one of the screens 74-4L or 74-4R to the upper end 61-4 of that screen to remove the debris 41 from that screen.

In the fifth embodiment (FIGS. 21A, 21B, 22A, 22B, 38A and 38B), a step S8010 mounts the baffles 106-5 in the flow channel 43 parallel to the transverse axis 52 to divert the incoming flow 44-I from each side 111 (FIG. 21A) of the channel 43 into two opposed transverse flows 44-T transversely toward the center 108 and through the respective screens 74-5L and 74-5R to enable each screen 74-5L and 74-5R to intercept the debris 41 and allow the liquid 46 and the solids 47 to flow past the screen 74-5. A step S8020 provides the reversible rake 67 as the rotary rake 67-5 (FIGS. 40A–40C) having two sets 107 of tines 68-5. A step S8030 adjusts the rotary position of the rake 67-5 for front raking. FIG. 22B shows that either the set 107-5R of tines 68-5 engages the front face 62-5 of the left screen 74-5L, or the set 107-5L engages the front face 62-5 of the right screen 74-5R for front raking. For back raking, FIG. 21B shows that either the set 107-5L of tines 68-5 engages the back face 63-5 of the left screen 74-5L, or the second set 107-5L engages the back face 63-5 of the right screen 74-5R. A step 8040 is done in either of the positions of the sets 107-5L or 107-5R of tines 68-5 (engaged with one of the screens 74-5) by moving the rake 67-5 from the bottom 88-5 of a selected one of the screens 74-5L or 74-5R to the upper end 61-5 of that screen to remove the debris 41 from that screen.

Channels 43

The channels 43 with which the present invention may be used are of various types, requiring the bar screen cleaner 40 to be adapted for installation with many different channels. For example, the channels 43 may have different cross-sectional dimensions, or be made from different materials, such metal trough-type channels or concrete channels. The existing channels 43 may have a screen facility 42 already installed.

One type of channel 43 shown in FIGS. 1–6 may be existing at a liquid treatment plant (not shown). Another bar screen cleaner 40 installation may be for a new liquid treatment plant, in which case the designed of the bar screen cleaner 40 may specify the type of channel 43. For other installations, the plant operator may specify that the bar screen cleaner 40 be a self-contained unit that includes a section of the channel 43.

These types of channels 43 may have a square or rectangular cross-section, or be a trough having a circular cross-section. Referring to FIGS. 7 and 8, for a rectangular cross-section, typical dimensions of a channel 43 for a small liquid treatment plant may be an eighteen inch height between a top 112 and a bottom 113 of the channel 43, and a twenty-four inch width between the opposite sides or walls 77 of the channel 43. For a large plant, a channel 43 may be up to three feet wide and five feet deep. A common characteristic of the channels 43 for use with the present invention is that the channel 43 be open at the top 112 between the walls 77 to permit the bar screen cleaner 40 to access the screen facility 42.

Bar Screens 74

The bar screen facilities 42 of the present invention include the screen, or bar screen, 74 which is carried by a screen support 114 (FIGS. 8, 9 and 39B) of the frame 69. The dimensions of the screen 74 of the bar screen cleaner 40 are designed to about match those of the channel 43 so that the flow 44 of the liquid 46, the solids 47, and the debris 41 is to, and not around, the screen 74 for removal of the debris 41 from the flow 44. FIGS. 1, 2, 7, 39A and 39B show a typical screen 74 as including a series of vertical bars 116 which are closely spaced to catch, or stop, the debris 41 so that the debris 41 will not flow past the screen 74, while allowing the liquid 46 and the solids 47 to flow past the screen 74 to the downstream end 49 of the channel 43.

Figure 39A:
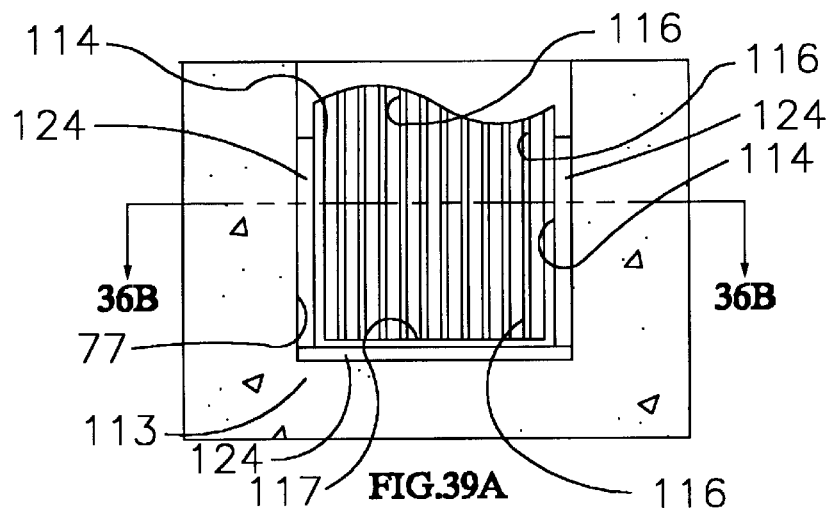
FIGS. 39A, 39B, and 39C are views of the screen facility respectively showing seals at the edges of the screens to prevent flow around the screens, the base of the screens supporting upwardly extending bars which cooperate to form the screen, and a screen having a variable length.
Figure 39B:
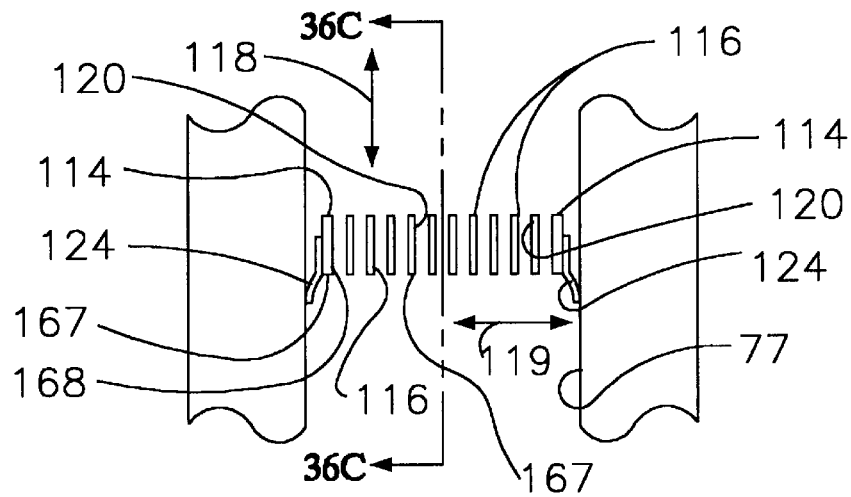
Figure 39C:
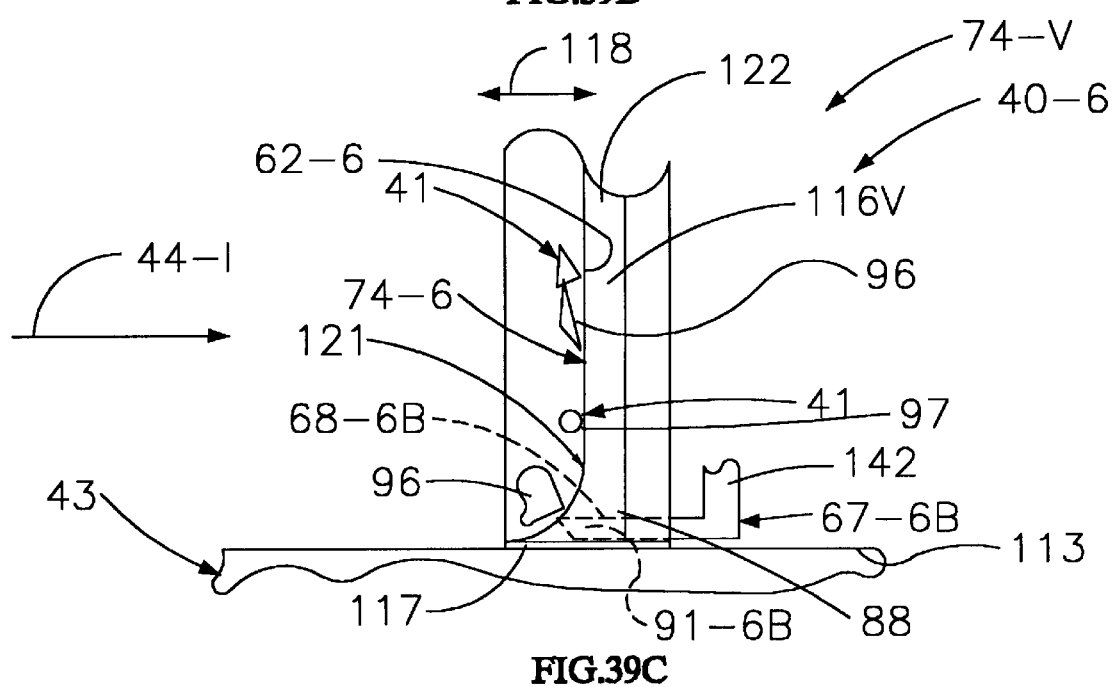

Referring to FIGS. 39A and 39C, the screen 74 is shown having a base 117 from which each of the bars 116 extends upwardly into the flow 44. Each bar 116 may be of rectangular cross-section, typically having a width of from ⅛ inch to ⅜ inch and a length of from one inch to one and one-half inch. When the bars 116 are for a screen 74 that is across the channel (e.g., in the first embodiment 40-1, FIG. 1), the length of the bars 116 is in the direction (see arrow 118, FIG. 39B) of the longitudinal axis 51, whereas the width of the bars 116 is in the transverse direction (see arrow 119, FIG. 39B) of the transverse axis 52 of the channel 43. When the bars 116 are for a screen 74 that is parallel to the incoming flow 44-I, (e.g., in the third embodiment 40-3, FIG. 18A), the width of the bars 116-3 is in the direction (see arrow 118) of the longitudinal axis 51, whereas the length of the bars 116-3 is in the transverse direction (see arrow 119) of the transverse axis 52 of the channel 43. In either case, the length is in the direction of the flow 44 through the screen 74, and the height of the bars 116 is about equal to the height of the channel 43. For a small plant, having a small size channel 43, the width of the bars may be ¹⁄₁₆ inch and the length may be one inch, for example, and the bars may be spaced from each other by about ⅛ inch. The bars 116 have sides 120 (FIG. 39B) which extend along the length of the bars 116.

In one embodiment of the screen 74-V shown in FIG. 39C, each of the bars 116-V is shown having a variable length (in the direction of arrow 118) to provide extra strength to resist the flow 44 and the large pieces 96 of the debris 41 that might be in the flow 44. The length is greater at or adjacent to the bottom 113 of the channel 43, and toward the upstream face 62 of the screen 74. The bar 116-V is provided with a curved front face surface 121 to allow the length to decrease smoothly along an arc to a smaller length (in the direction of arrow 118) toward a top 122 of the bar 116-V near the top 112 of the channel 43. The cooperation of this embodiment of the screen 116-V with the rakes 67 for front and back raking is described below.

The bars 116 of the present invention do not have cross supports which in prior screens (not shown) extend transversely across the prior screen from one side to the other side. Such cross supports would block the motion of the rakes 67 of the present invention, as described below.

As noted above, the dimensions of the screen 74 of the bar screen cleaner 40 are designed to about match that of the channel 43. The main area of the screen 74 is formed by the bars 116, which extend from between the vertical walls 77 and from the top 112 and to the bottom 113 of the channel 43. To assure a tight fit between the screen 74 and the walls 77 and the bottom 113 of the channel 43, a seal, or seal strip, 124 is attached to the base 117 of the screen 74 and to each screen support 114 at the sides of the screen 74. The seal 124 may be a strip of flexible material which retains its properties when immersed in the liquid 46. The seal strip 124 moves with the screen 74 and rubs against the walls 77 and the bottom 113 of the channel 43 as the screen support 114 moves the screen 74 into the channel 43, or as the screen 74 is moved out of the channel 43 for maintenance, or as the screen 74 is moved along the longitudinal axis 51 into different stations (axial positions) as described below. Because this movement of the screen 74 in the channel 43 involves scraping of the seal strip 124 along the bottom 113 and the walls 77 of the channel 43, for example, the material from which the seal strip 124 is made is smooth and abrasion resistant. Material sold under the trade name "Neoprene" may be used, for example, for the seal strip 124.

The screen 74 may be of three types. A universal screen 74-F-B (for both front and back raking, e.g., as used in embodiment 40-1, FIG. 4A) is for use in stopping both the large pieces 96 and the small pieces 97 of the debris 41. The spaces between the bars 116 of the screen 74-F-B are small enough, e.g., about ¼ inch, to stop the smallest of the small pieces 97 of debris 41. As used in embodiment 40-8 (FIG. 17B), a second type of screen 74-B may be suited primarily for stopping the large pieces 96 of the debris 41 (generally for back raking, in which case the spaces between the bars 116 are larger, e.g., ½ inch), and a third type of screen 74-F may be suited primarily for stopping the small pieces 97 of the debris 41 (generally for front raking, in which case the spaces between the bars 116 are small, e.g., ⅛ inch).

Figure 11:
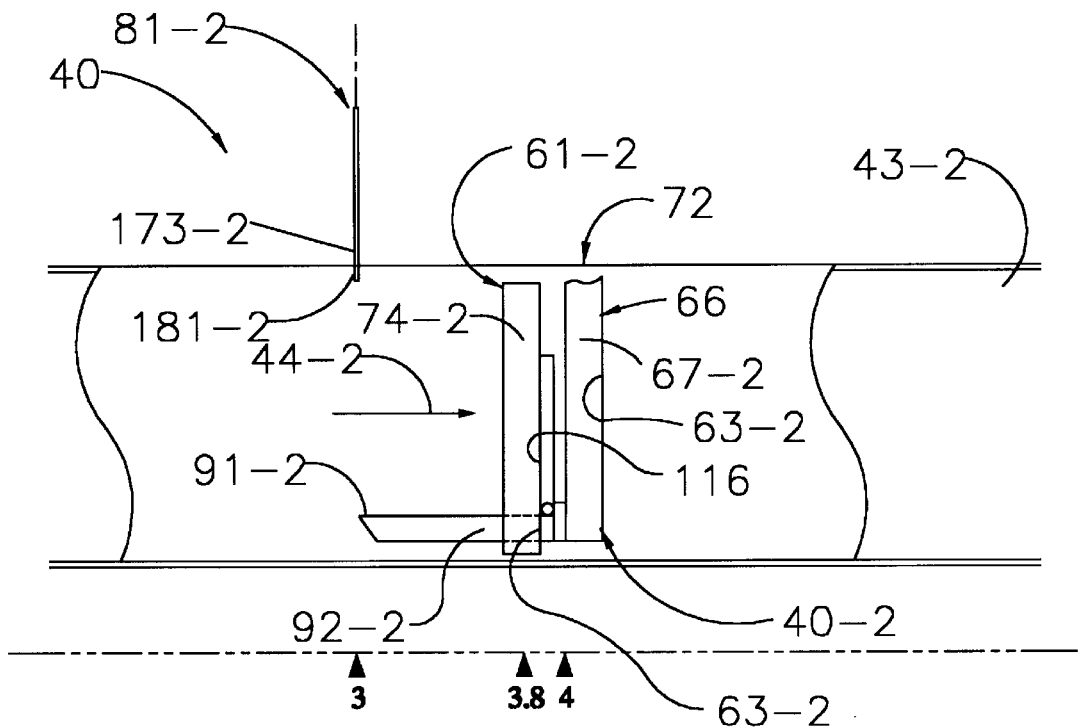
FIG. 11 is a schematic view of the second embodiment shown in FIG. 10, where the limiter is shown pivoted on the head in the up position for back raking with the screen in a downstream position spaced from the pan.
Figure 13:
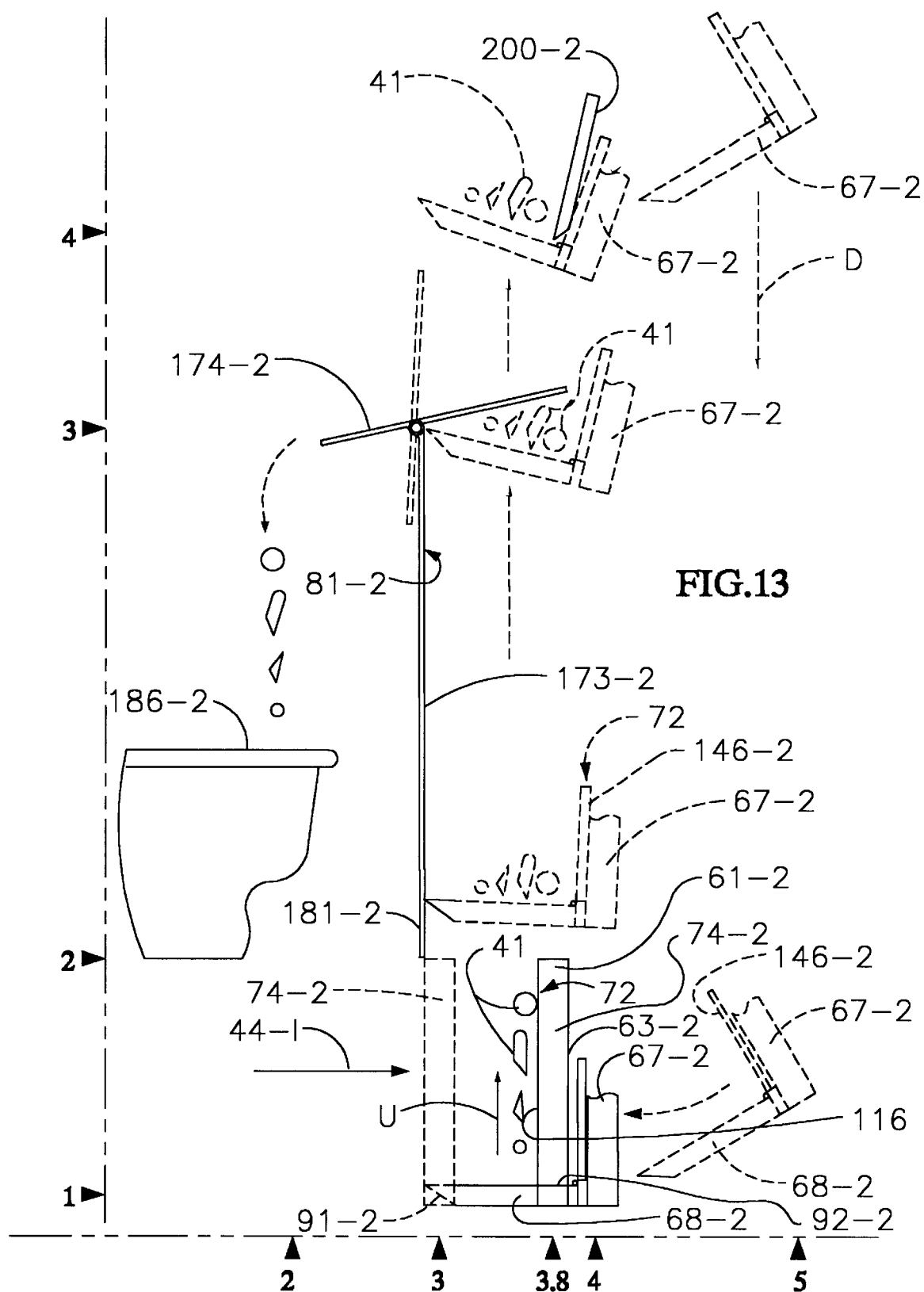
FIG. 13 is a side elevational view similar to FIG. 11, showing the complete motion of the reversed rake relative to the screen and the pan, wherein dashed lines show movement of the rake in the back raking position removing the debris from the back face of the screen and transporting it across the pan to the chute.
Figure 14A:
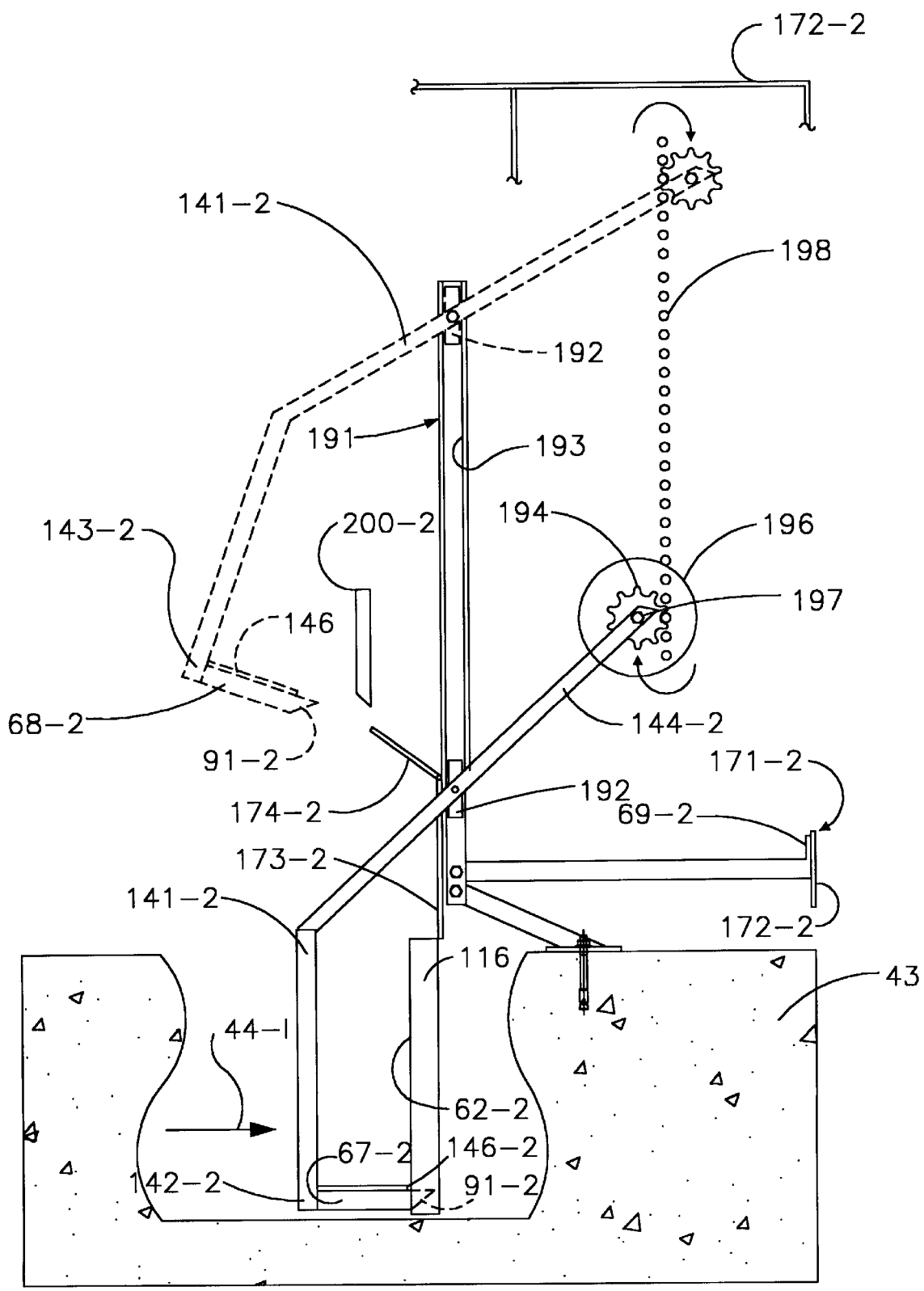
FIG. 14A is a side elevational view of the second embodiment showing a drive for moving the rake in a pre-set path relative to the screen in the upstream position shown in FIG. 10 for front raking.
Figure 14B:
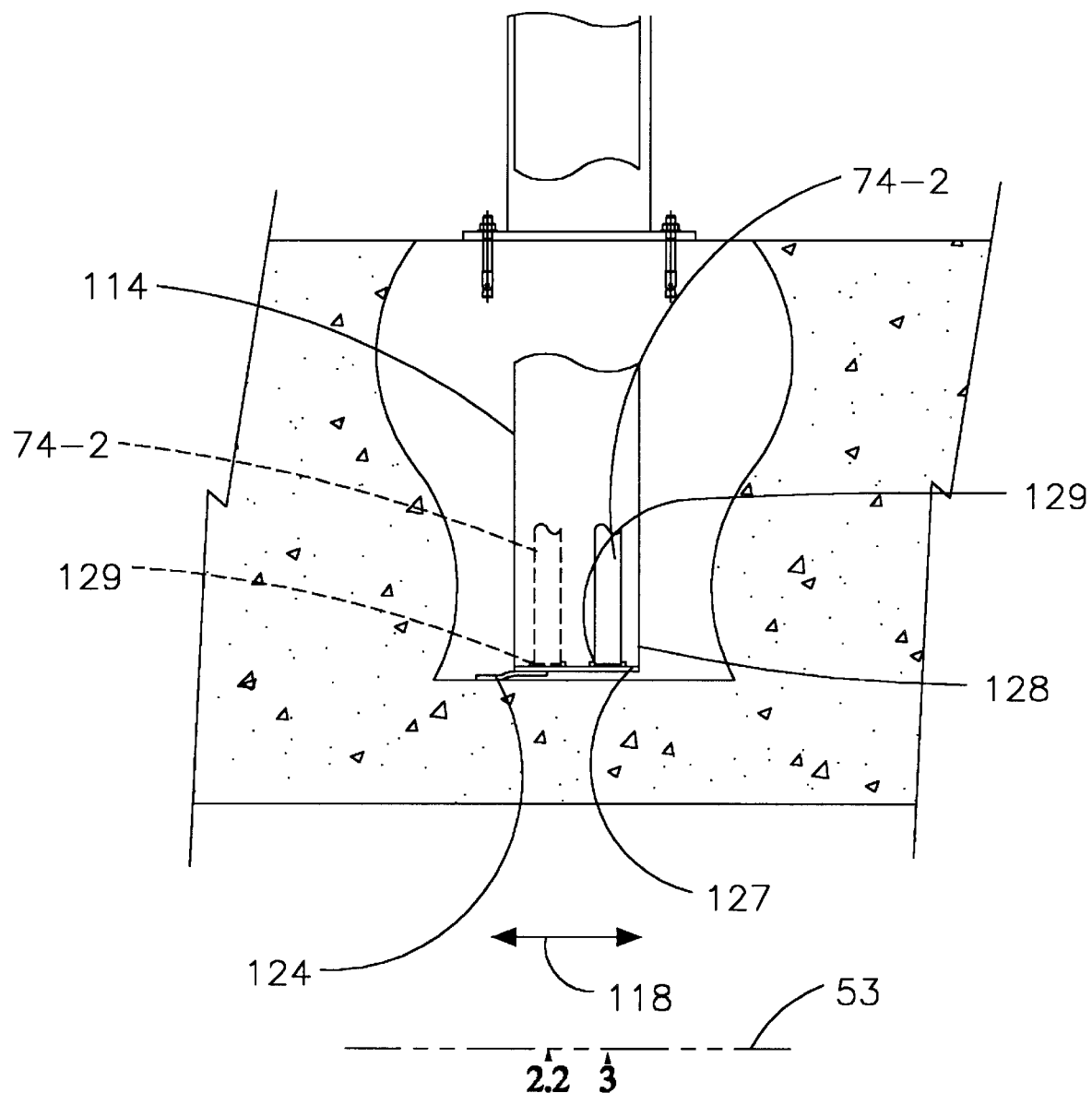
FIG. 14B is a side elevational view of a screen support which permits the screen to be located at two longitudinal positions in the channel.

At least one of the screens 74 is used in each of the embodiments 40-1, 40-3, 40-6 through 40-8. Each such screen 74 is supported in the channel 43 by the screen support 114 at the station described below. This differs from embodiment 40-2 (FIGS. 10, 11 and 14B) in which the screen 74-2 may be moved along the longitudinal axis 51 from one station 3 (FIG. 10) on the longitudinal line 53 to another station on the line 53. The other station is 2.2 when viewed in FIG. 14B in the front raking position 71. That station 2.2 becomes station 3.8 when the rake 67-2 has been reversed as shown in FIGS. 11 and 13. To permit such movement, as shown in FIG. 14B the screen support 114 is provided with an elongated base 127 which extends from a bottom 128 of the screen support 114. The elongated base 127 extends in the direction 118 of the longitudinal axis 51 and has two spaced mounts 129. One mount 129 secures the screen 74-2 (shown in dashed lines) at station 2.2, and one mount 129 secures the screen 74-2 (shown in solid lines) at station 3. To change the station at which the screen 74-2 is mounted, the screen support 114 is moved out of the channel 43 (FIG. 23B) and the screen 74-2 is moved on the elongated base 127 from one mount 129 to the other mount 129.

In embodiments 40-7 and 40-8 (respective FIGS. 17A and 17B), two screens 74 are mounted in the channel 43 at the same time. The screen support 114-7 and 114-8 for these embodiments 40-7 and 40-8, respectively, has the same elongated base 127 and two spaced mounts 129 (shown in FIG. 14B). However, each such mount 129 secures one of the screens 74-7 or 74-8, respectively, to the base 127-7 or 127-8.

Rakes 67 for Front Raking and Back Raking

The rake 67 in reversible form and non-reversible form have been generally described above. Referring to FIGS. 23A, 23B, 30A and 30B, the reversible rake 67-1 is shown having an arm 141 which is part of the frame 69. The arm 141 has a distal end 142 that supports a rake head 143 (FIG. 30B) which is positioned parallel to the screen 74 with which the rake 67 is used. The tines 68-1 of the reversible rake 67-1 extend from the head 143 generally at a right angle (FIG. 30A) to the arm 141. The tines 68-1 may have a full length (from the proximal ends 92 at the head 143 to the opposite distal ends 91) of about five inches. This length is used for back raking. When mounted for the first embodiment 40-1, the tine length extends generally along the longitudinal axis 51 (FIG. 1) when the rake 67-1 is in position for raking.

To selectively prevent such full axial length of the tines 68-1 from entering the spaces between the bars 116, a stop or limiter, sometimes called a flap, 146 is movably mounted on the rake head 143, as by being mounted on a pivot shaft 147 (FIG. 30A) on the rake head 143. The flap 146 may be moved into a "down" position shown in FIGS. 1, 3B, 30A and 30B overlapping a coverable portion 148, which is most of the full length of the tines 68-1. The flap 146 in the down position does not overlap an exposed portion 149 adjacent to the distal ends 91 of the tines 68-1. With the flap 146 in the down position, motion of the arm 141 in urging the tines 68-1 into the spaces between the bars 116 is stopped by the flap 146 with only the exposed portion 149 of the full length of the tines 68-1 located in, or between, the bars 116. The exposed portion 149 of the length of the tines 68-1 which is in the spaces between the bars 116 is about one inch in length, which is about the length of the bars 116 in the direction of the longitudinal axis 51.

Figure 30A:
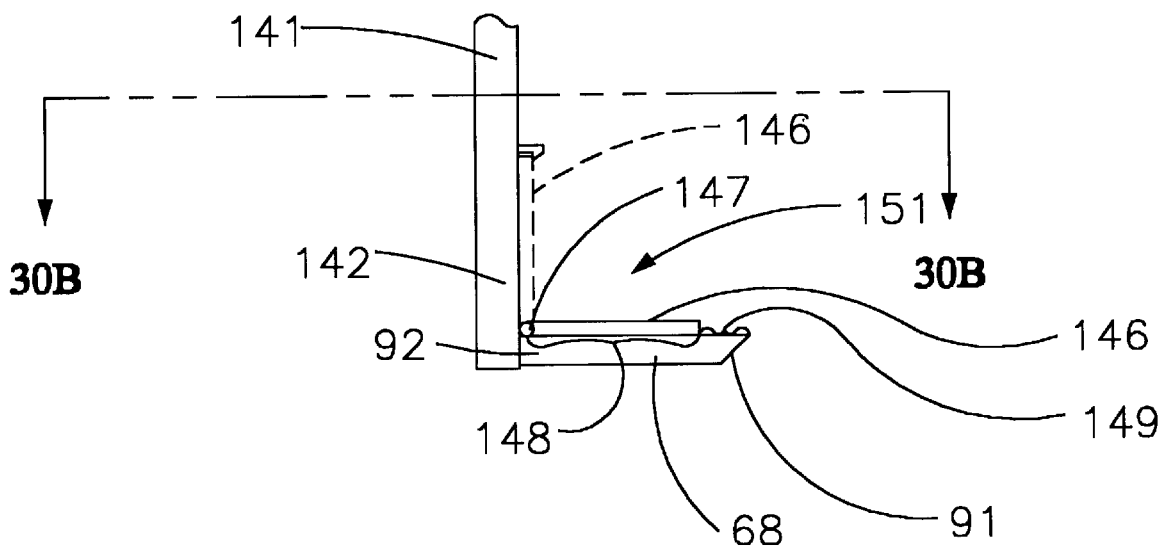
FIGS. 30A and 30B are enlarged diagrams of the embodiment of the reversible rake which is shown in FIGS. 18A through 22B, illustrating a rake head supporting two sets of tines, wherein the rake head may rotate to position one set of tines for raking while the other set is inactive.
Figure 30B:
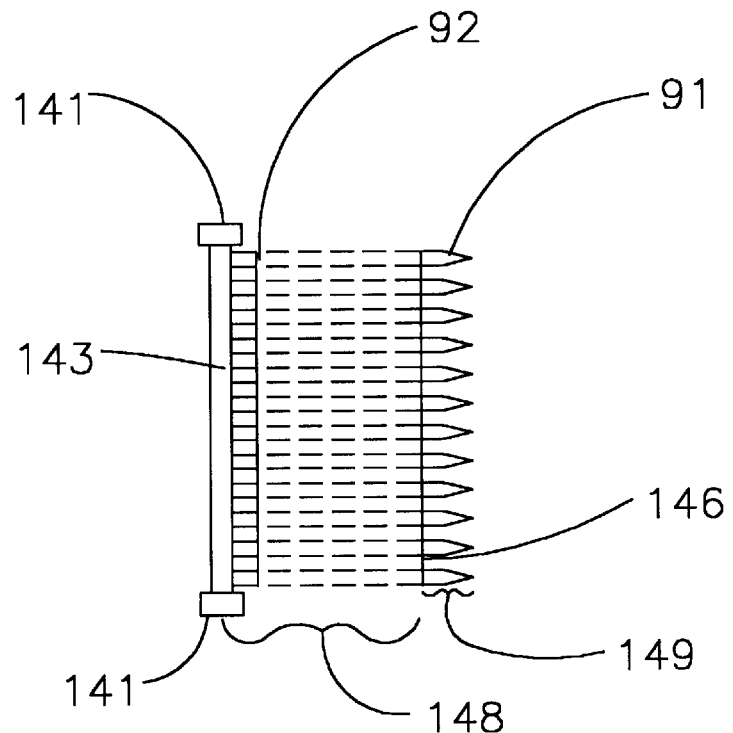

As shown in FIG. 30A, with the flap 146 in the down position, a shelf 151 is formed for carrying the debris 41 as the arm 141 moves the rake 67-1 and the tines 68-1 upwardly along the screen 74-1. With the flap 146 in the up position (shown in dashed lines in FIG. 30A and solid lines in FIG. 4A), the flap 146 is generally parallel to the arm 141, such that the long tines 68-1 themselves carry the debris 41.

As described below, to reverse the reversible rake 67-1, the entire frame 69, including the arm 141 and the rake 67-1 on the arm 141, are moved relative to the channel 43 to reverse the position of the bar screen cleaner 40-1 by 180 degrees as shown in FIGS. 1 and 2 (see letters A and B). To provide a simpler way of reversing the rake 67, the rotary reversible rake 67-3, 67-4 and 67-4 may be used. For ease of description, the rotary reversible rake 67-3 is described in detail in connection with FIGS. 40A–40C, it being understood that the same structure is provided for each of the rotary reversible rakes 67-3, 67-4 and 67-4. The rotary reversible rake 67-3 includes the arm 141 having a split distal end 156 to provide two lower arms 157. The rake head 143-3 is mounted on the lower arms 157 for rotation on an axis 158 in the form of a rod 159. The rake head 143 may rotate into two positions, A and B, depending on which embodiment 40-3, or 40-4 or 40-5 is used, and according to the desired front raking or back raking. A latch 161 on the lower arm 157 engages the rake head 143-3 to hold the rake head 143-3 in the selected rotary position A or B.

The rake head 143-3 is also provided with the flap 146-3, which operates the same as the flap 146-1 with the flap 146-3 being pivotable on the rake head 143-3, so that in each position A or B of the rotary rake 67-3, either front or back raking can be performed.

Figure 16A:
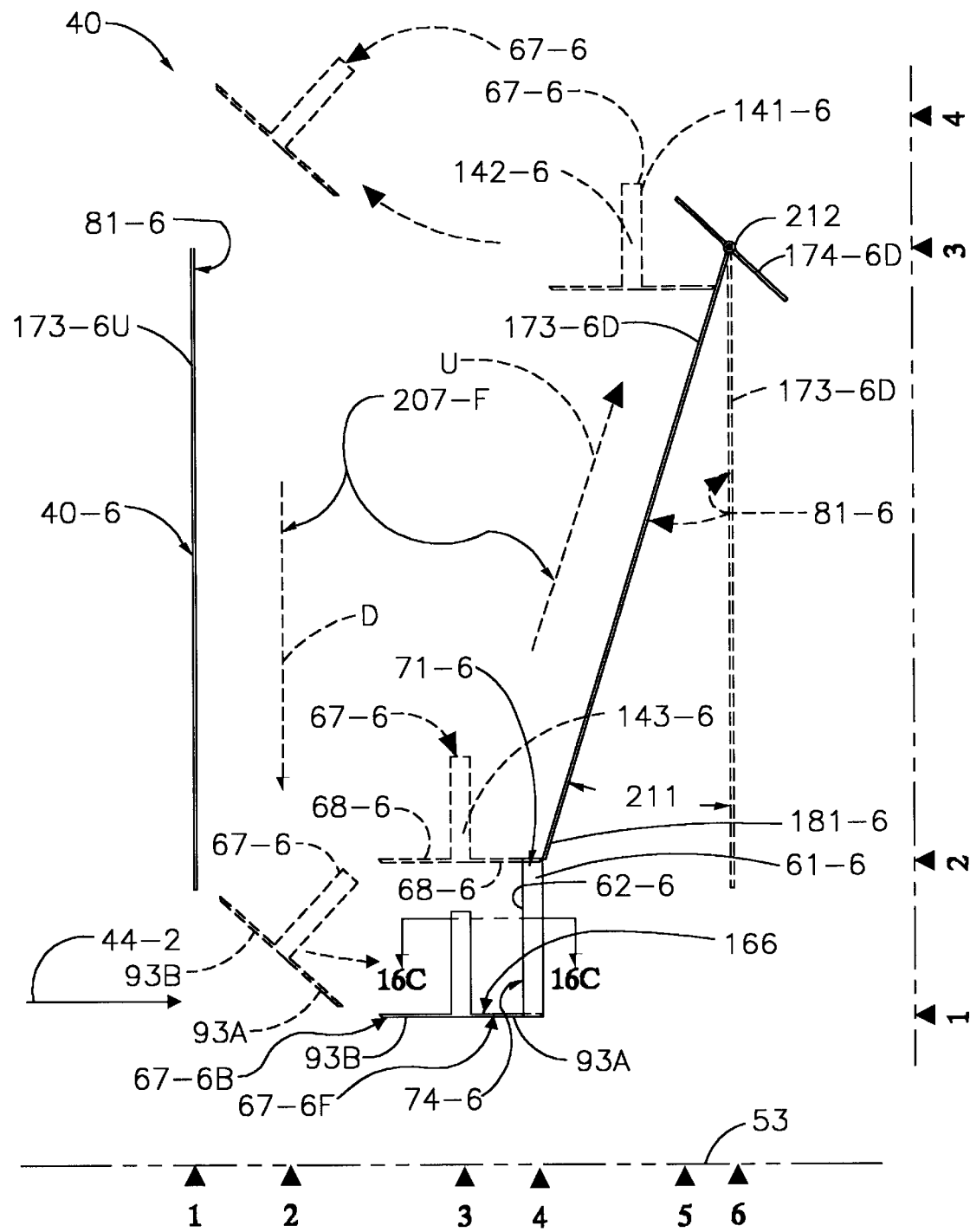
FIG. 16A is a schematic elevational view of the sixth embodiment of the present invention showing the non-reversible rake having two-way tines shown selectively engagable with the front face of a single fixed screen and a right one of two movable pans at a working angle to keep the debris on the rake for front raking.

The non-reversible rake 67 is used with the sixth and seventh embodiments 40-6 (FIGS. 16A and 16B) and 40-7 (FIG. 17A), respectively, and does not require reversal as with the rake 67-1, nor reversal of the rake head 143-3, for example. For ease of description, the rake 67-6 is described, it being understood that the rake 67-7 is the same as the rake 67-6. The non-reversible rake 67-6 includes the arm 141-6 (FIG. 16A) which supports the rake head 143-6. The rake head 143-6 supports both a front rake 67-6F and a back rake 67-6B. As shown in FIG. 16A, each rake 67-6F and 67-6B extends in opposite directions along the longitudinal axis 51 when in position for raking. The arm 141-6 has the distal end 142-6 that supports the rake head 143-6, which is positioned transversely across the channel 43 parallel to the screen 74-6. Referring to FIGS. 29A and 29B, the tines 68-6F of the non-reversible front rake 67-6F extend generally at a right angle to the arm 141-6 and in the direction of the flow 44-I (i.e., in the downstream direction). The tines 68-6F are short, and are about one inch in length, which is about the length of the bars 116 in the direction of the longitudinal axis 51. The tines 68-6F extend from a solid section 164 of the rake 67-6F, forming a short (e.g., four inches) shelf 166. The tines 68-6F are spaced apart by about the same distance as the bars 116, such as ⅛ inch for front raking in the small channels 43. When engaged with the bars 116, the tines 68-6F extend around front surfaces 167-6 (FIG. 39B) of the bars 116 and around corners 168-6 of the bars 116 and wipe the debris 41 off the bars 116, but do not extend past the bars 116 in the downstream direction of the axis 51.

Figure 16B:
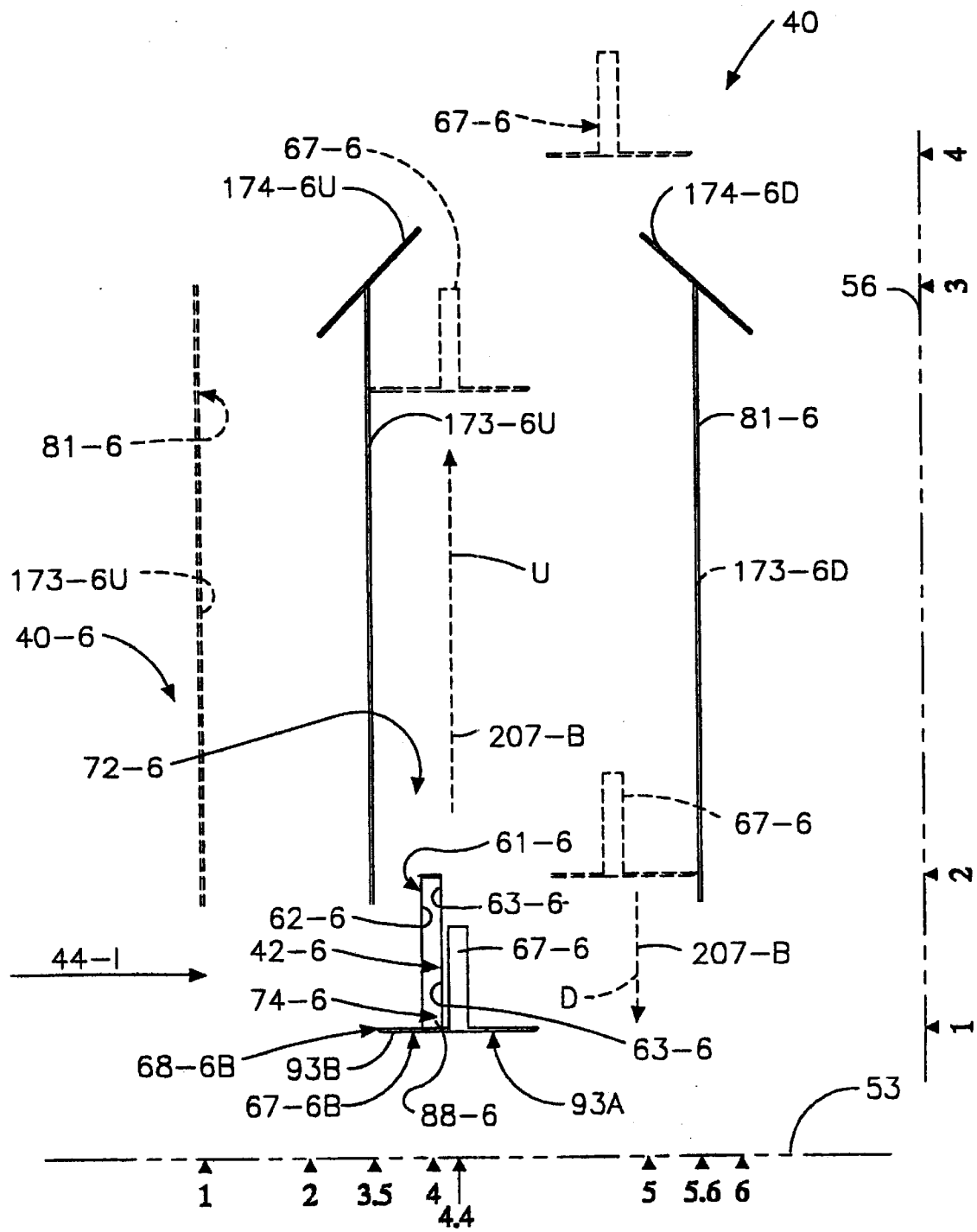
FIG. 16B is a schematic elevational view of the non-reversible rake shown in FIG. 16A illustrating the rake selectively engaged with the back face of the single fixed screen and a left one of two movable pans in a second position 4 to keep the debris on the rake for back raking.

The tines 68-6B of the non-reversible back rake 67-6B extend from the rake head 143-6 generally at a right angle to the arm 141-6, and in the opposite direction from the short, front rake tines 68-6F (i.e., in the upstream direction). The tines 68-6B which extend from the rake 67-6B have a length from the proximal end 92-6B at the rake 67-6B to the opposite distal end 91-6B of about five inches. The tines 68-6B are spaced apart by about the same distance as the bars 116, such as ½ inch for back raking in the small channels 43. When engaged with the bars 116, the tines 68-6B extend from the back face 62-6 of the screen 74-6 and between the bars 116 so that the distal ends 91-6B of the back rake tines 68-6B are past (upstream) of the front face 62-6 of the screen 74-6 (FIG. 16B). The shelf 166 and the long tines 68-6B carry the debris 41 off the bars 116.

Engagement of Tapered Length Bars 116-V and Tines 68

With the description of the tines 68 in mind, reference is made to FIG. 39C, where the tapered length bars 116-V are shown being engaged by the non-reversible back rake 67-6B. The back rake 67-6B is shown advanced into the spaces between the bars 116-V adjacent to the bottom 88 of the screen 74. With the rake 67-6B at the bottom 88, the tines 68-6B extend almost completely through the long length of the bars 116-V before the distal ends 91-6B appear at the upstream (front) face 62-6 of the screen 74-6. As a result, the distal ends 91-6B do not have to be forced through the debris 41 which the flow 44-I urges against the front face 62-6 of the screen 74-6. This reduces the force required to move the back rake tines 68-6B into the spaces between the bars 116, and minimizes the risk of breaking a tine 68-6B due to a build-up of debris 41 at the front face 62-6. With the long tines 68-6B fully inserted into the spaces, upward movement of the tines 68-6B causes the tines 68-6B to gradually engage and lift the debris 41 from the front face 62-6 of the screen 74-6, reducing the stress on the tines 68-6B as they are first moved upwardly. The engagement of the two-way rake 67-7B of the seventh embodiment 40-7 with the tapered length bars 116-V is the same as described above with respect to the two-way rake 67-6B.

First Reversible Rake/Fixed Screen Embodiment 40-1 of Bar Screen Cleaner 40

The reversible rake/fixed screen embodiment 40-1 of the bar screen cleaner 40 is shown in FIGS. 1–6 for use with one of the above-described channels 43 to remove the debris 41 from the flow 44 and permit only the liquid 46 and the solids 47, and not the debris 41, to be guided along the channel 43 to the liquid treatment basin 57 (FIG. 2). The reversible rake/fixed screen embodiment 40-1 includes a housing 171-1 (FIGS. 5, 6 and 23A) adapted to be placed on the channel 43 over the flow 44. The housing 171 has an outer cover 172 (FIG. 23A) to protect the inner structural elements (e.g., the rake 67) from inclement weather, for example. Within the cover 172 there is the frame 69 (FIG. 23A) which supports the screen support 114 (FIG. 39B), the drive 82 (FIGS. 7 and 23A), the reversible rake 67-1 driven by the drive 82 relative to the screen 74-1, a pan 173 of the pan facility 81 (FIGS. 3B and 4B), and a chute 174. The screen 74-1 may be one of the screens described above, and is mounted on the screen support 114 to be movable into a position to extend across the flow 44-I at station 3 shown in FIG. 1 on line 53, which station 3 is an axial location along the axis 51. The screen 74-1 has the front face 62-1 facing the flow 44-I and the back face 63-1 facing the liquid 46 and the solids 47 flowing to the basin 57 (FIG. 2). The reversible rake 67-1 is mounted on the arm 141 as described above, and includes (FIGS. 3B and 4B) the distal end 142 supporting the rake head 143-1 (FIG. 30B) for mounting the plurality of tines 68-1. The tines 68-1 are spaced to correspond to the spacing of the bars 116. The rake 67-1 and the arm 141 are driven by the drive 82 for raking as described in detail below.

The housing 171-1 is selectively oriented relative to the channel 43 according to whether front raking or back raking is desired. Such orientation simply involves lifting the housing 171 using a small, standard hoist (not shown) available at liquid treatment plants (not shown), and rotating the housing 171 into one of two orientations (see reference letters A and B, where B is above A in FIG. 1, and A is above B in FIG. 2). Referring to FIG. 23A, such hoist is attached to a lift ring 176 at the top 177 of the housing 171, and after unbolting the frame 69 from the top 112 of the channel 43, lifts the housing 171 off the top 112 for the desired rotation.

Figure 3A:
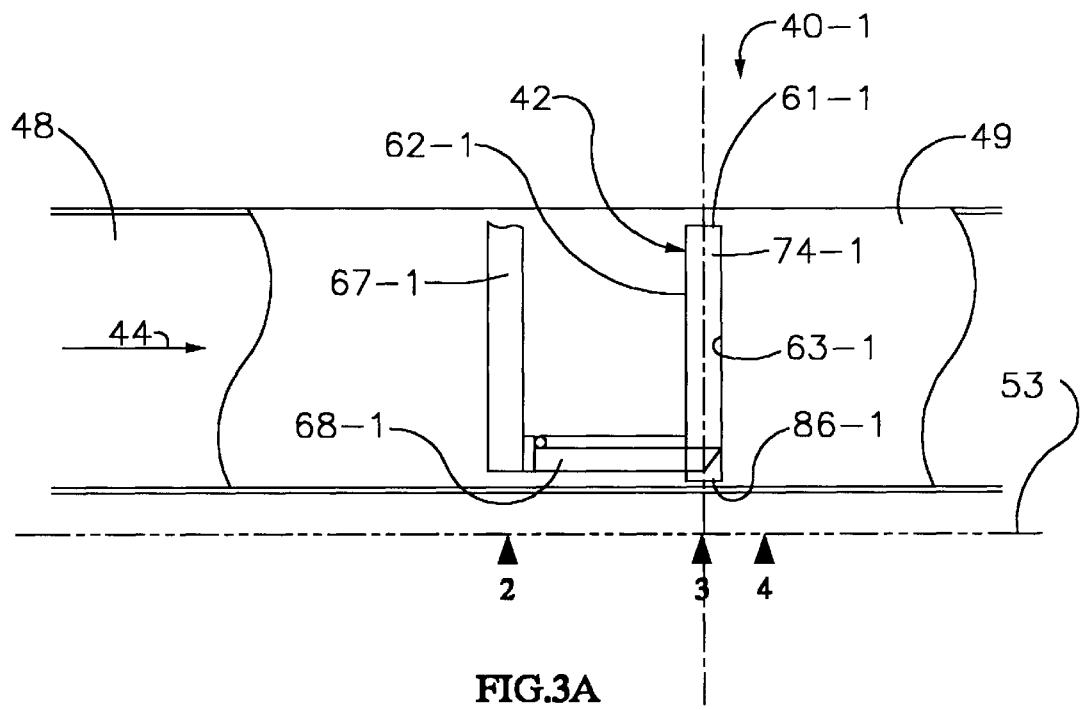
FIG. 3A is an elevational view of the reversible rake shown in FIG. 1 in the front raking position with the tines facing downstream and a stop limiting the depth of engagement by the tines with the front side of the screen.
Figure 3B:
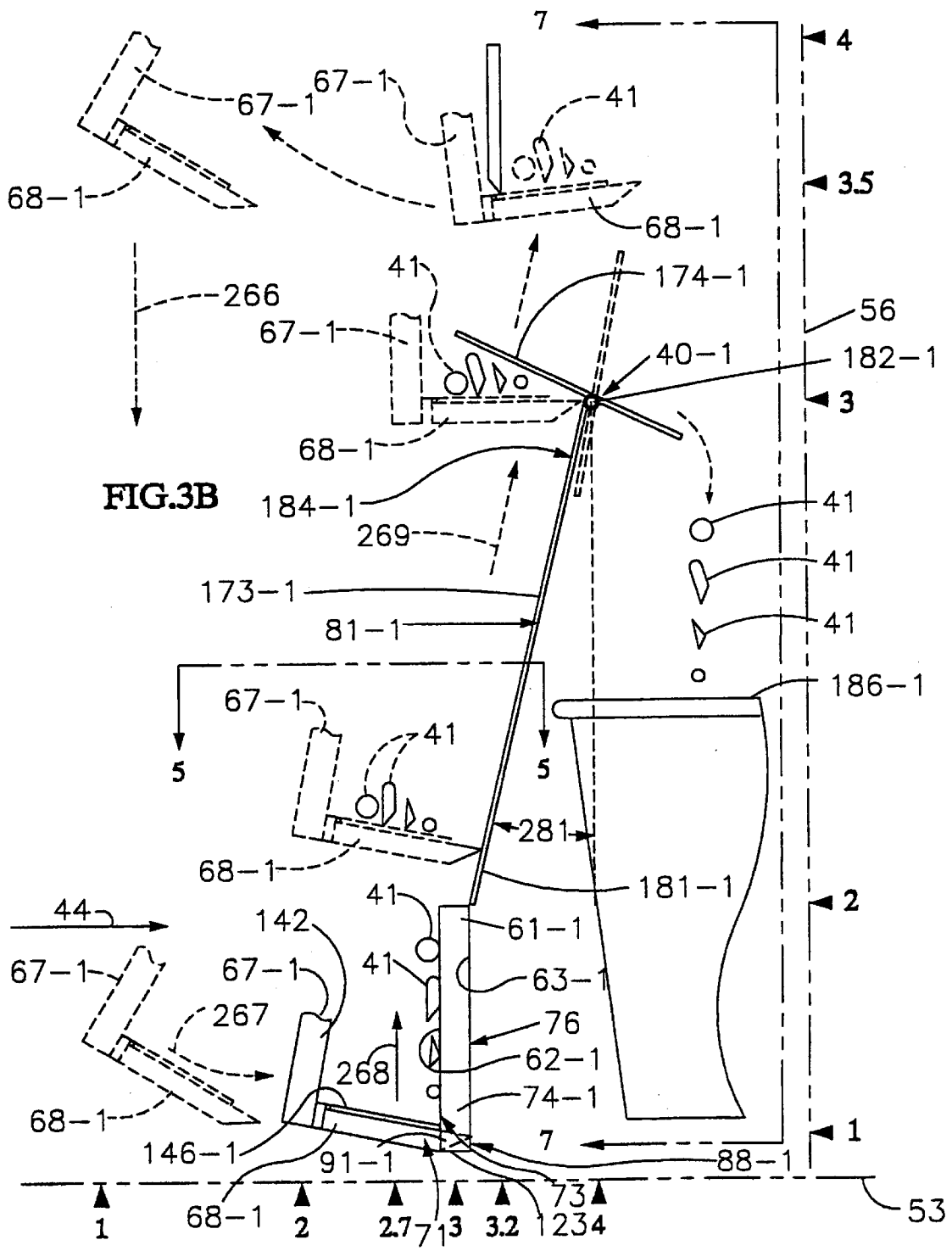
FIG. 3B is a schematic elevational view of universal bar screen debris remover which includes the rake shown in FIG. 1, wherein dashed lines show movement of the rake in removing the debris from the front side of the screen and transporting it across a pan to a chute.

In the orientation of the housing 171 shown in FIGS. 1, 3A and 3B, the reversible rake 67-1 is shown at axial station 1 with the tines 68-1 initially positioned facing downstream and spaced from the front face 62-1 of the screen 74-1. The flap 146 has been positioned to selectively prevent the full axial length of the tines 68-1 from entering the spaces between the bars 116. Thus, the flap 146 has been moved into the down position shown in FIGS. 1 and 3B overlapping the coverable portion 148 (FIGS. 30A and 30B) of the tines 68-1, leaving the exposed portion 149 free to enter the spaces between the bars 116.

FIG. 3B shows raking movement of the rake 67-1, where the rake 67-1 is shown in solid lines engaged with the bottom 123 of the screen 74-1, and dashed lines showing the rest of the movement. With the flap 146 in the down position, the rake 67-1 is moved axially with the flow 44-I (downstream direction) to urge the tines 68-1 into the spaces between the bars 116. This motion is stopped by the flap 146-1 with only the exposed portion 149 (FIG. 30B) of the tine 68-1 located in, or between, the bars 116 for front raking. The position of the rake 67-1 with the tines 68-1 in such spaces, but not extending axially past the bars 116, is referred to as the "first rake position" 71 of the reversible rake 67-1, and is seen in FIG. 3B in solid lines as having the tines 68-1 facing downstream, or in the direction of the flow 44-I.

With the rake 67-1 in the first rake position 71, the next movement of the rake 67-1 is upward in the channel 43 (see arrow 268, FIG. 3B), which moves the tines 68-1 along and relative to the front face 62-1 and to the sides 120 (FIG. 39B) of each bar 116 of the screen 74-1, and toward the upper end 61-1. This is the front raking position of the rake 67-1 and the tines 68-1.

Figure 4A:
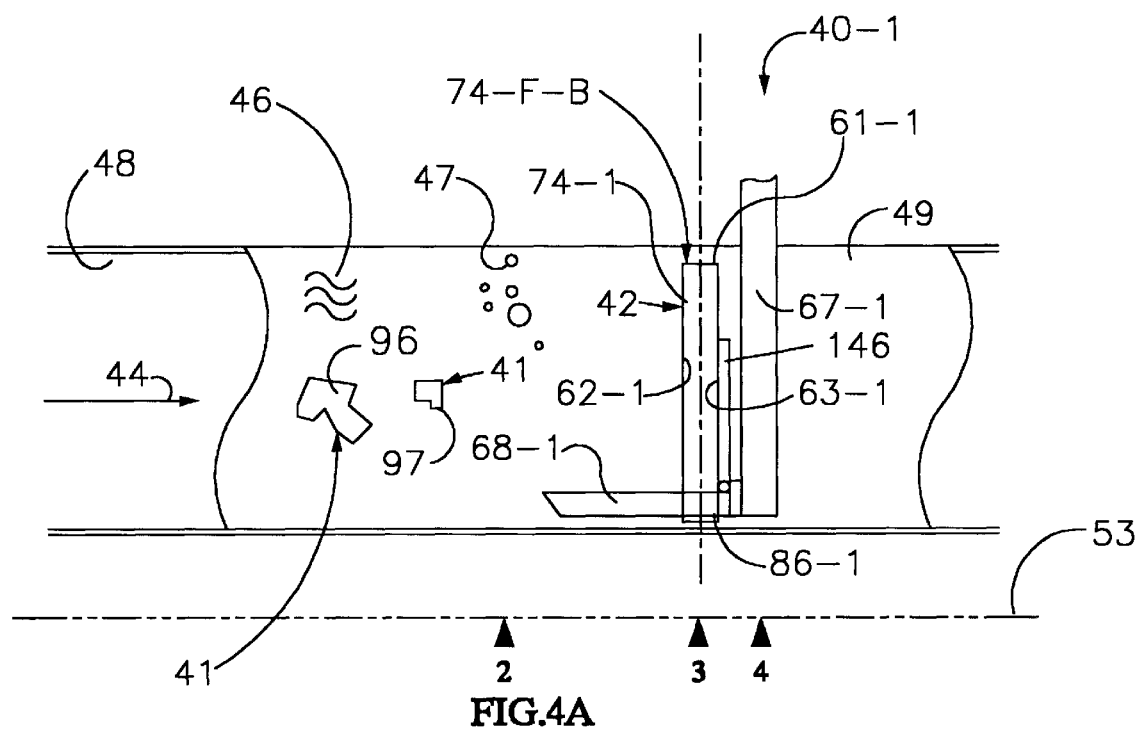
FIG. 4A is an elevational view of the reversible rake in the back raking position shown in FIG. 2 with the tines facing upstream and the stop moved to an inactive position to not limit the engagement by the tines with the back side of the screen and permit the tines to extend through the screen.
Figure 4B:
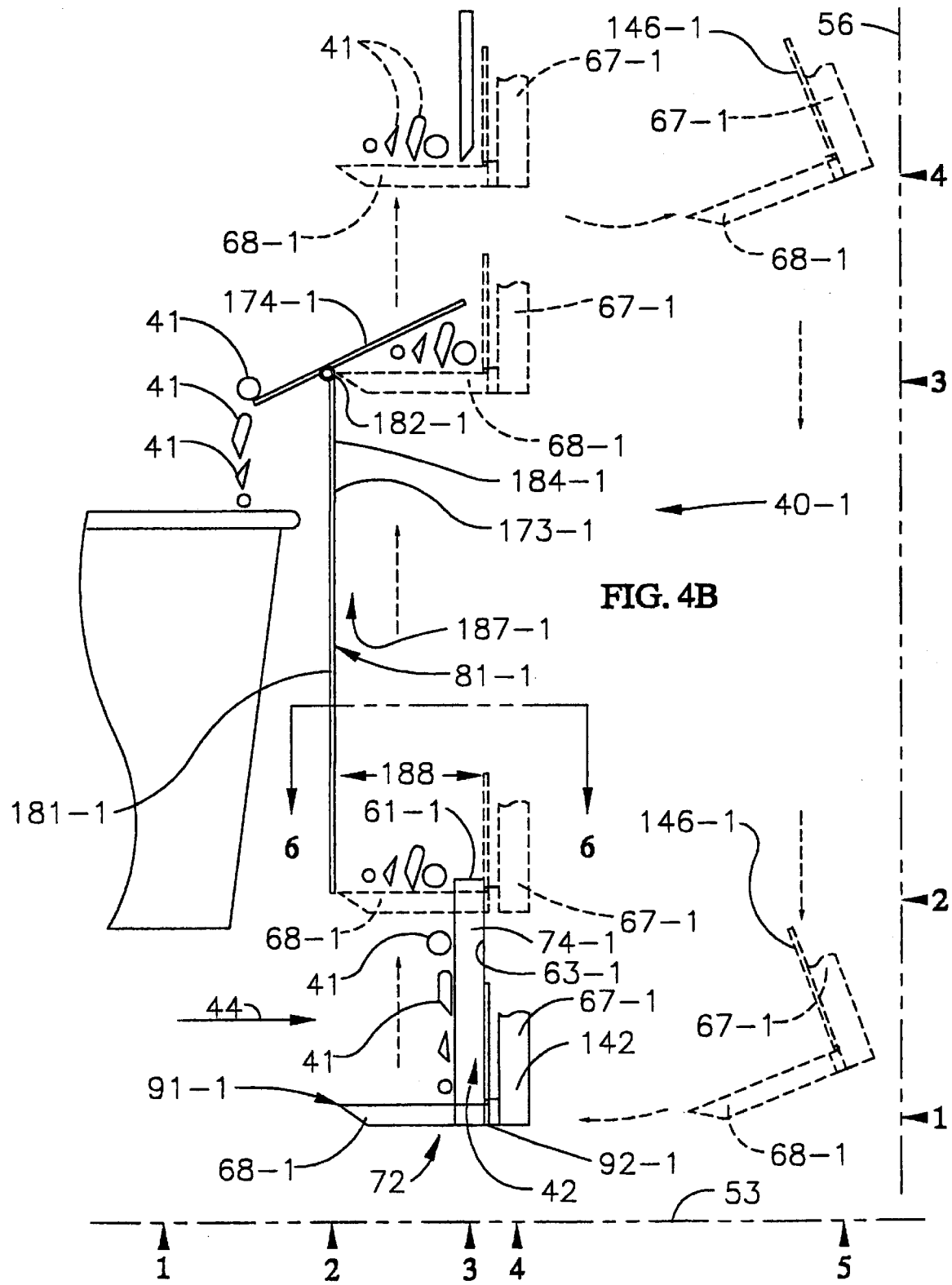
FIG. 4B is an elevational view of the reversible rake in the back raking position shown in FIGS. 2 and 4A, wherein dashed lines show movement of the rake removing the debris from the front side of the screen and transporting it across the pan to the chute.
Figure 5:
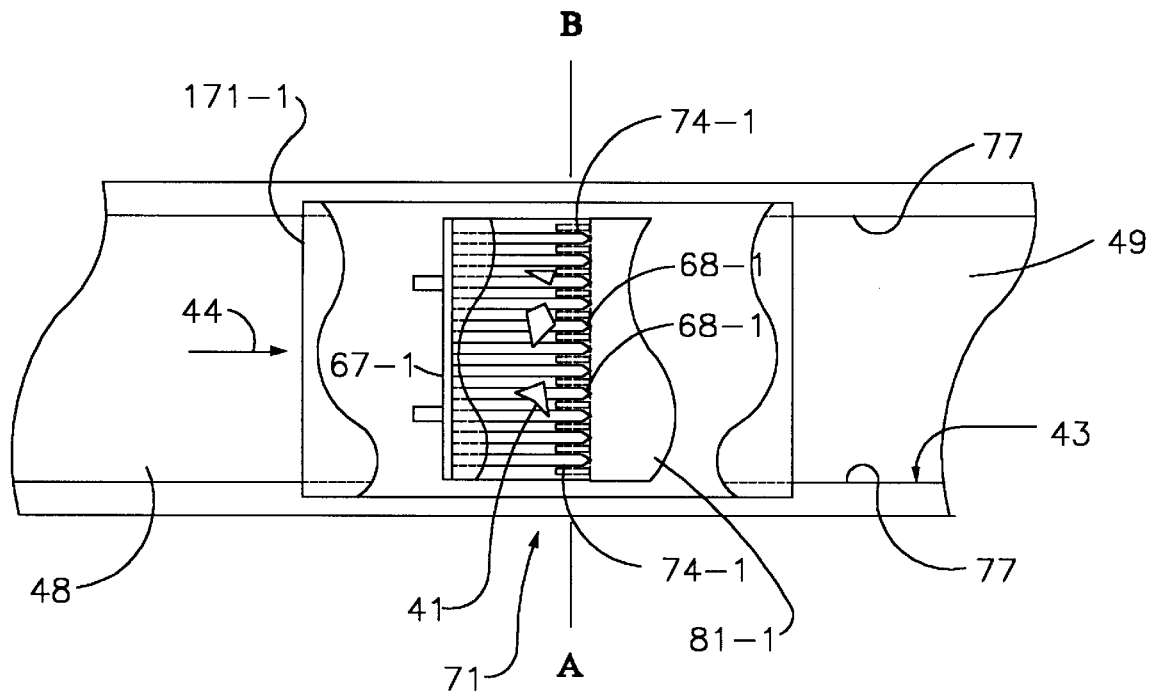
FIG. 5 is a plan view taken along line 5—5 in FIG. 3B showing the rake in the front raking position moving on the pan to retain the debris on the rake after the rake has moved past the screen.
Figure 6:
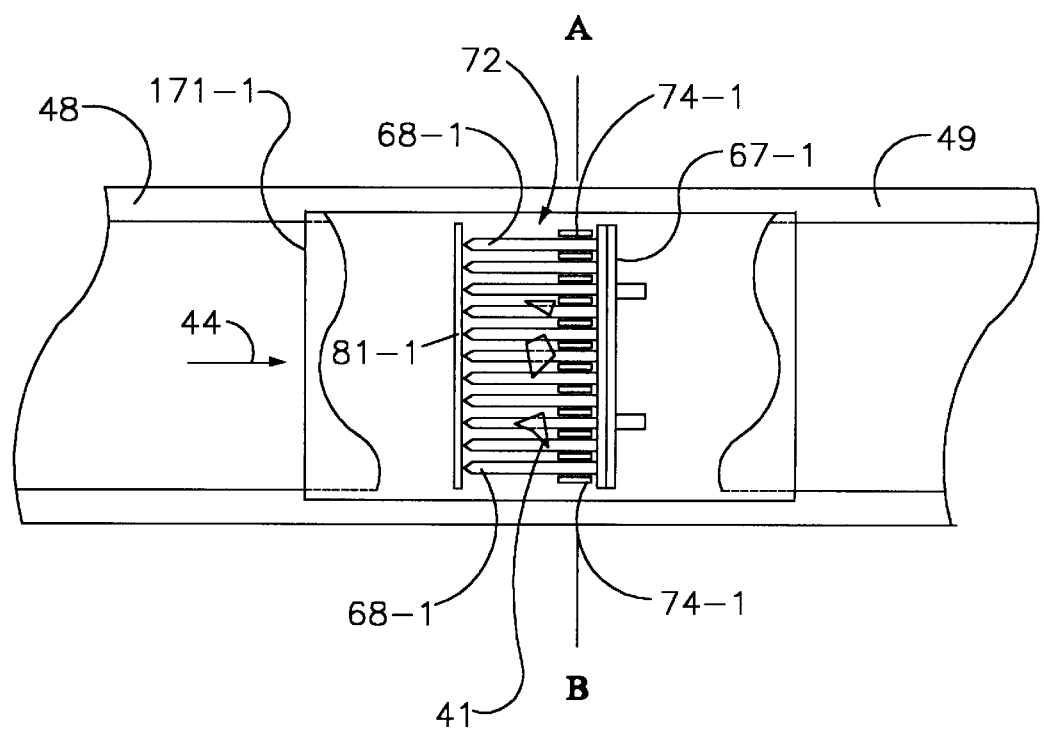
FIG. 6 is a plan view taken along line 6—6 in FIG. 4B showing the rake in the back raking position starting to move along the pan to retain the debris on the rake after the rake has moved past the screen.

For back raking, the housing 171 is lifted off the top 112 of the channel 43 and rotated into the other of the two rake positions, the second rake position 72. This reversed orientation, or position, relative to the channel 43 is shown in FIGS. 2, 4B and 6 is shown by reference letters A and B, where A is above B and is one hundred eighty degrees reversed from that shown in FIGS. 1 and 4A. As also shown in FIGS. 4A and 4B, the flap 146 is moved into the "up" position parallel to the arm 141. With the flap 146 in the up position, the initial motion of the arm 141 in urging the tines 68-1 into the spaces between the bars 116 is not stopped by the flap 146; rather, almost the full length of the tines 68-1 extends through the screen 74-1 with the proximal ends 92-1 adjacent to the back face 63-2 of the screen 74-1 (see solid line position in FIG. 4B). This initial movement of the tines 68-1 for back raking is axial and against the flow 44-I to place the distal ends 91-1 in such spaces between the bars 116, and past the bars 116 so that the proximal ends 92-1 of the tines 68-1 are adjacent to the bars 116. This position of the rake 67-1 with the tines 68-1 in such spaces and the distal ends 91-1 extending axially past the bars 116, is referred to as the second rake position 72 of the reversible rake 67-1, and is seen in FIG. 2 as having the tines 68-1 face upstream, or against the direction of the incoming flow 44. With the rake 67-1 in the second rake position 72, the rake 67-1 is moved upward in the channel 43, which moves the tines 68-1 along and relative to the back face 63-1 of the screen 74-1 and relative to the sides 120 of the bars 116 (FIG. 39B), toward the upper end 61-1 of the screen 74-1.

The debris 41 is moved off the front or back face 62 or 63, respectively, of the screen 74-1 according to which of the respective first or second rake positions 71 or 72 the rake 74-1 is in. The debris 41 moves to and past the upper end 61-1 of the screen 74-1 and onto the pan 173-1 which is mounted on the frame 69 to retain the debris 41 on the tines 68-1 and the shelf 151 until the rake 67-1 has been moved upwardly enough to discharge the debris 41 into the chute 174-1. The pan 173-1 has a lower end 181-1 movable on an axis of rotation 182-1 on the frame 69 into one of two positions according to the position of the rake 67-1. In FIG. 3B the pan 173-1 is shown rotated clockwise from vertical into a front pan position with the lower end 181-1 adjacent to the upper end 61-1 of the screen 74-1. The pan 173-1 extends at an angle 281 upwardly to an upper pan end 184-1 at the axis 182-1. Also mounted on the axis 182-1 of the frame 69 is the chute 174-1 for directing the debris 41 into a container 186-1, such as a receptacle or conveyor. The pan 173-1 is also mounted on the axis 182-1 for counterclockwise rotation from the front raking position back to vertical into a back raking position 187-1 with the lower end 181-1 spaced axially away from the upper end 61-1 of the screen 74-1, and generally on a horizontal line with the upper end 61-1 of the screen 74-1. The pan 173-1 extends vertically to the upper pan end 184-1 at the axis 182-1. An axial space 188 between the lower end 181-1 of the pan 173-1 and the proximal ends 92-1 of the tines 68-1 is shown in FIG. 4B as a space between axial stations 2 and 3 in FIG. 4B, and is about equal to the full length of the tines 68-1 less the length of the bars 116.

Second Reversible Rake/Movable Screen
Embodiment 40-2 of Bar Screen Cleaner 40

The second, or reversible rake/movable screen, embodiment 40-2 of the bar screen cleaner 40 is shown in FIGS.

10–13 and 14A for use with one of the above-described channels 43 to remove the debris 41 from the flow path 44-I in which it is desired to permit only the liquid 46 and the solids 47, and not the debris 41, to be guided along the channel 43 to the liquid treatment basin 57 (FIG. 2). The second, reversible rake/movable screen, embodiment 40-2 differs from the first (reversible rake/fixed screen) embodiment 40-1 primarily in (i) fixedly mounting the pan 173-2 at axial station 3 above the channel 43-2, and (ii) movably mounting the screen 74-2 along the channel 43-2 relative to the fixed pan 173-2 (FIG. 14B). The second embodiment 40-2 includes the same housing 171-2, which is placed on the channel 43 over the flow 44-I in either of the two orientations described above in respect to the first embodiment 40-1, i.e., for the first rake position 71 (FIGS. 10 and 12) or the second rake position 72 (FIGS. 11 and 13). Within the cover 172-2, the base 127-2 (FIG. 14B) of the screen support 114-2 of the frame 69-2 supports the mounts 129-2 so that the screen 74-2 may be moved axially along the channel 43-2 from one mount 129-2 at station 3 to the other mount 129-2 station 3.8 (FIGS. 11 and 13).

A drive for moving the rake 67-2 may be a pre-set drive 191, or may be the programmed drive 82-2. The pre-set drive 191 is shown in FIG. 14A supporting the arm 141-2 on a slide 192 which is contained for reciprocation in a slot 193. The reversible rake 67-2 is on the distal end 142-2 of the arm 141-2, and on the proximal end 144-2 there is a gear 194. The gear 194 is rotated by a motor 196 that drives a shaft 197 on which the gear 194 is mounted. As the motor 196 rotates the gear 194, a cam (not shown) keeps the gear 194 engaged with a rack 198 mounted on the frame 69-2. The gear 194 turns, climbs the rack 198 and pulls the arm 141-2 so that the slide 192 rides in the slot 193. If the gear 194 is on the left side of the rack 198, the arm 141-2 is in the "in" postion (first rake position 71-2) to engage the tines 68-2 with the screen 74-2 (see solid line position, FIG. 14A). If the gear 194 is on the right side of the rack 198, the arm 141 is in an "out" position to locate the tines 68-2 away from the screen 74-2 (see dashed line position, FIG. 14A).

Figure 12:
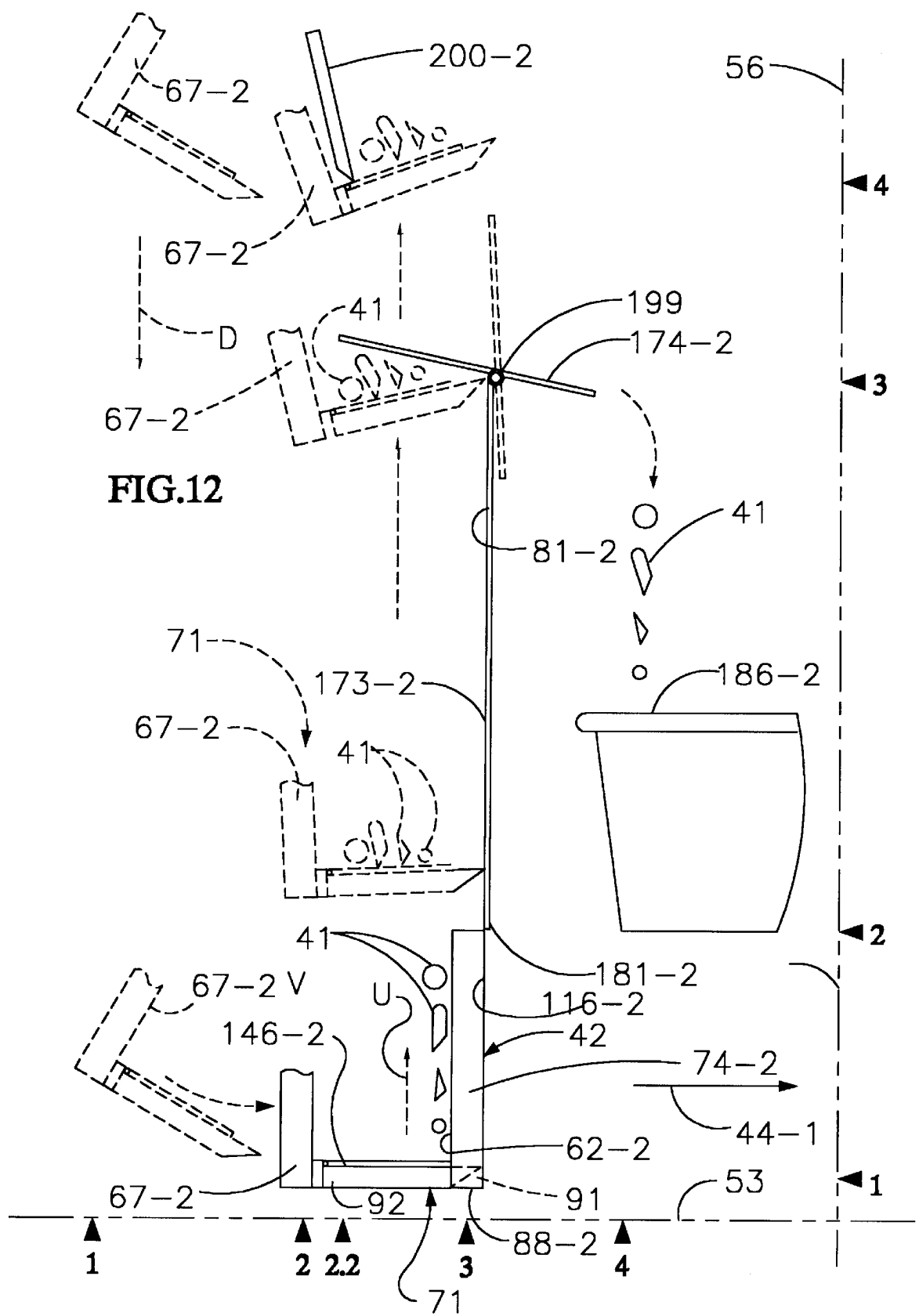
FIG. 12 is a side elevational view similar to FIG. 10, showing the complete motion of the reversed rake relative to the screen and the pan, wherein dashed lines show movement of the rake in the front raking position removing the debris from the front face of the screen and transporting it across the pan to the chute.

The movable screen 74-2 may be one of the screens 74 described above, having the front face 62-2 facing the flow 44-I and the back face 63-2 facing the liquid 46 and the solids 47 flowing to the basin 57 (FIG. 12). Referring to FIG. 14B, the screen support 114-2 mounts the screen 74-2 transversely across the channel 43 to block the debris 41. As shown in FIG. 14A, the pan 173-2 is mounted on the frame 69, and is in the axial position at station 3 as shown in FIG. 13, as is the chute 174-2. The pan 173-2 at station 3 is axially spaced from the screen 74-2 when the screen 74-2 is at station 3.8 in the back raking position (FIG. 13). The lower end 181-2 of the pan 173-2 is horizontally aligned with the upper end 61-2 of the screen 74-2.

When the housing 171-2 is in the orientation shown in FIG. 1 (see reference letters A and B in FIG. 1), the screen 74-2 is moved to the axially upstream position (station 3, FIG. 12) for front raking and the flap 146-2 is moved into the down position to selectably prevent the full axial length of the tines 68-2 from entering the spaces between the bars 116. With the flap 146-2 in the down position, the drive 191 moves the rake 67-2 to engage the screen 74-2. Similar to the first (reversible rake/fixed screen) embodiment 40-1, the position of the rake 67-2 with the tines 68-2 in such spaces, but not extending axially past the bars 116, is referred to as the first rake position 71 of the reversible rake 74-2, and corresponds to the position 71 the front raking operation of the first embodiment 40-1.

When the housing 171 is in the reversed orientation relative to the channel 43 as shown in FIGS. 11 and 13 (see reference letters A and B in FIG. 2, where A is above B and is one hundred eighty degrees reversed from that shown in FIG. 1), and the screen 74-2 is moved to the axially downstream position (station 3.8, FIG. 13) for back raking, the drive 191 initially moves the rake 74-2 axially against the flow 44-I to place the distal ends 91-2 in the spaces between the bars 116, and past the bars 116, so that the proximal ends 92-2 of the tines 68-2 are adjacent to the bars 116. This position of the rake 67-2 with the tines 68-2 in such spaces and the distal ends 91-2 extending axially past the bars 116, is referred to as the second rake position 72 of the reversible rake 74-2, and is seen in FIGS. 11 and 13 as having the tines 68-2 facing upstream, or against the direction of the flow 44-I. Also, as shown by the axial location of the rake 67-2 at station 3, the movement of the rake 67-2 into engagement with the screen 74-2 requires the same amount of axial motion regardless of whether front or back raking is to be performed. Thus, the pre-set drive 191, which provides a pre-set rake motion, may be used if the benefits of the programmed drive 82 are not necessary for a particular bar screen cleaner 40.

With the rake 74-2 in the second rake position 72-2 (FIG. 13), the drive 191 then moves the rake 74-2 upwardly (see arrow U) in the channel 43, which moves the tines 68-2 along and relative to the back face 63-2 of the screen 74-2 and relative to the sides 120 (FIG. 39B) of the bars 116, toward the upper end 61-2 of the screen 74-2. Because of the movability of the screen 74-2, the rake 67-2 is always positioned so that just after raking there is effectively no axial space between the lower end 181-2 of the pan 173-2 and the distal ends 91-2 of the tines 68-2. This enables the distal ends 91-2 of the tines 68-2 to engage the pan 173-2 in both raking positions of the rake 67-2. The amount of axial movement of the screen 74-2 is seen in FIG. 13 as being about equal to the full length of the tines 68-2 less the length of the bars 116-2. The debris 41 is moved off the respective front or back face 62-2 or 63-2 of the screen 74-2 according to the current position of the rake 67-2 (first or second rake position 71 or 72, respectively). The debris 41 is moved to and past the upper end of the screen 61-2 and onto the pan 173-2 which retains the debris 41 on the tines 68-2 until the rake 67-2 has been moved upwardly enough to discharge the debris 41 onto the chute 174-2. The chute 174-2 directs the debris 41 into the container 186-2.

Debris Removal Cycle For Second Embodiment 40-2 Using Pre-set Drive 191

With the movable screen 74-2 in an axial position selected for either front or back raking, the drive 191 moves the rake 67-2 in the same path in either of the rake positions 71-2 or 72-2 through a debris removal cycle. The motion of the rake 67-2 when in the front raking position 71-2 and with the screen 74-2 at station 3 on line 53 is shown in FIG. 12 starting with the rake 74-2 shown in dashed lines upstream and above the channel 43-2 at axial station 4 on vertical line 56. The cycle starts with the rake 67-2 being moved downwardly (see arrow D) in the vertical path to the vertical station 1 while in the same axial station 1 spaced upstream from the lower end 88-2 of the screen 74-2. The drive 191 moves the rake 67-2 in the direction of the flow (see arrow 44-I) toward the front face 62-2 of the screen 74-2. The flap 146-2 is down, so the motion of the rake 67-2 stops in the front rake position 71-2 (at axial station 2) with only the distal ends 91-2 of the tines 68-2 between the bars 116-2 of the screen 74-2. This is the position shown in solid lines in FIG. 12. The drive 191 then moves the rake 67-2 upwardly (arrow U) at axial station 2 across the screen 74-2 which is at axial station 3, with the tines 68-2 scraping along the sides 120-2 (FIG. 39B) and along the front face 62-2 of the screen 74-2 to remove the debris 41 therefrom. At vertical station 2, the rake 67-2 has moved past the upper end 61-2 of the screen 74-2 and vertically upwardly onto the pan 173-2. The distal ends 91-2 of the tines 68-2 have become engaged with the pan 173-2. The drive 191 continues to move the rake 67-2 along the pan 173-2, past the chute 174-2. Since the chute 174-2 is in the path of the rake 67-2, the distal ends 91-2 of the tines 68-2 engage the chute 174-2 and rotate the chute 174-2 clockwise out of the rake path until the rake 67-2 passes the chute 174-2 and is moved into vertical station 4. The chute 174-2 is biased by a coiled spring 199 (FIG. 12) to return to the original position (in the path of the rake 67-2) at which the chute 174-2 directs the debris 41 to the right into the receptacle 186-2. The debris 41 is moved off the tines of the rake 67-2 as the drive 191 moves the rake 67-2 upstream, to the left in FIGS. 12 and 14A, past a doctor blade 200-2 that scrapes along the tines 68-2 as the tines 68-2 move past the blade 200-2. The blade 200-2 is at vertical station 4. With the screen 74-2 cleaned and the debris 41 removed from the rake 67-2, the debris cleaning cycle ends with the rake 67-2 back at vertical station 4 and axial station 1.

The drive 191 also moves the rake 67-2 through the same debris removal cycle in the back rake position 72-2, in which the screen 74-2 is at station 3.8. The motion of the rake 67-2 when in the back raking position 72-2 is shown in FIG. 13, and also starts with the rake 67-2 shown in dashed lines, here downstream of the pan 173-2 and above the channel 43-2 at vertical station 4 and axial station 5. The rake 67-2 is downstream of the pan 173-2 because the orientation of the housing 171-2 has been reversed, to reverse the rake 67-2 to have the tines 68-2 extending in the upstream direction. The cycle starts with the rake 67-2 being moved downwardly in a vertical path (arrow D) to the same vertical station 1 as in front raking, but at axial station 5. Due to the reversal of the housing 171-2 and thus the rake 67-2, the axial location of the vertical path (station 5) is now downstream from the corresponding path for front raking (FIG. 12).

The drive 191 then moves the rake 67-2 against the direction of the flow (see arrow 44-I) toward the back face 63-2 of the screen 74-2. The flap 146-2 is up, so the motion of the rake 67-2 does not stop in what would be the front raking position 71-2, but moves further upstream with the distal ends 91-2 of the tines 68-2 extending between and past the bars 116-2 and the proximal ends 92-2 adjacent to the screen 74-2. The rake 67-2 is at axial station 4 now (shown in solid lines). The drive 191 then moves the rake 67-2 upwardly (see arrow U) in axial station 4 and across the screen 74-2 with the tines 68-2 scraping along the sides 120-2 and the back face 63-2 of the screen 74-2 to remove the debris 41 therefrom. At vertical station 2, the rake 67-2 has moved past the upper end 61-2 of the screen 74-2 and upwardly with the distal ends 91-2 moving in a path that matches the axial station 3 of the pan 173-2. With the screen 74-2 now spaced axially from the pan 173-2 for back raking, the distal ends 91-2 engage the pan 173-2. The drive 191 continues to move the distal ends 91-2 of the tines 68-2 along the pan 173-2, past the chute 174-2 so the tines 67-2 engage the chute 174-2. The rest of the debris cleaning cycle is the same as that described above for front raking, and the debris 41 is moved off the tines 68-2 as the drive 191 moves the rake downstream, to the right in FIG. 13, past the doctor blade 200-2. With the screen 74-2 cleaned and the debris 41 removed from the rake 67-2, the cycle ends with the rake 67-2 back at vertical station 4 and axial station 5.

Third, Fourth, and Fifth Embodiments 40-3, 40-4 and 40-5 of Bar Screen Cleaner 40

Reversible (Two-Way) Rakes/Fixed Screen(s) Parallel To Flow

The features common to the third, fourth, and fifth embodiments 40-3, 40-4 and 40-5 are described below with respect to Figures in the 18 through 22 series. Common elements are noted with a "-P" following the reference number. Referring to FIG. 18A, the baffles 106-P are held by a baffle section 202-P of the screen support 114-P. The baffles 106-P extend transversely across the channel 43-P and divert the incoming flow 44-I into the transverse flows 44-T as described above so that the transverse flows 44-T are turbulent. The turbulence causes the paths of the debris 41 to become curved and increases the likelihood that the debris 41 will become caught on a bar 116-P rather than flowing past the screen 74-P.

The seals 124-P are attached to the baffles 106-P adjacent to the walls 77-P of the channel 43-P. The seals 124-P flex as the frame 69-P is moved to position the bar screen cleaners 40-P and the screens 74-P in the channel 43-P. A baffle section 202-P is secured to a downstream screen support 114-P and to an upstream screen support 114-P with the screens 74-P positioned parallel to the incoming flow 44-I. The screens 74-P may be any of the screens 74 described above.

The seals 124-P are also secured to the bottoms 88-P of these screens 74-P (FIG. 39A) and flex as the frame 69-P is moved to position the bar screen cleaners 40-P and the screens 74-P in the channel 43-P. The seals 124-P prevent the flows 44-T from going around or under the screens 74-P. For the fourth embodiment 40-4 (FIGS. 19A and 20A), the flows 44-T through the screens 74-P are transverse from the center 108-P of the channel 43-P, toward the outer walls 77-P. For the fifth embodiment 40-5, the flows 44-T are through the screens 74-P are transverse from near the walls 77-P of the channel 43-P, toward the center 108-P at the longitudinal axis 51 of the channel 43-P.

Each embodiment 40-3, 40-4 and 40-5 has the rake facility 66 with the reversible (or rotary) rake 67-P driven by the programmed drive 82-P. The rake 67-P may be reversed as shown in FIGS. 40A and 40B to facilitate the desired front raking (FIGS. 18B, 19B and 22B) or back raking (FIG. 18C, 20B and 21B). The rotary rake 67-P is as described above in respect to FIGS. 40A through 40C, with the sets 107-P of tines 68-P spaced from each other by ninety degrees, and the sets 107-P being mounted on the rotary rake head 143-P for rotation on the lower arms 157-P. Depending on the rotary position of the rake head 143-P, e.g., L or R, for facing left (FIG. 40A), or facing right (FIG. 40B) relative to the arm 143-P, the first set 107-RP of tines 68-P may face the right wall 77-P for raking the front face 63-P of the screen 74-3 shown in FIG. 18B, while the second set 107-LP of tines 68-P faces upwardly (FIG. 40B) in the idle, or resting, position. Alternatively, the first set 107-RP of tines 68-P may face upwardly in the idle position (FIG. 40A) while the second set of tines 107-LP (FIG. 40A) faces the left wall 77-P for raking the back face 62-P as shown in FIG. 18C as 107B. The rakes 74-P are also provided with the flaps 146-P which are moved to, and latched in, the up position for back raking. The flaps 146-P are moved to, and latched in, the down position for front raking.

The fourth, fifth and sixth embodiments 40-3, 40-4, and 40-5 include the housing 171-P (FIG. 23A) which is supported by the frame 69-P. The housing 171-P and the frame 69-P are placed on the channel 43-P over the flow 44-I, which is diverted to the transverse flow 44-T under the housing 171-P. The housing 171-P is provided with the cover 172-P, and the frame 69-P supports the drive 82-P. The drive 82-P carries the arm 141-P and moves the arm 141-P and the lower arms 157-P through the programmed operational cycle(s) described above. The arm 141-P moves the reversible (rotary) rake 67-P relative to the screen 74-P for the raking operations relative to the screens 74-P, and past the pan, or pans, 173-P as described above in respect to FIGS. 1–6.

The pan 173-3 is mounted on a pan support 206-3 connected to the frame 68-P. The pan 173-3 is positioned by the support 206-3 either at axial station 2 (FIG. 18C) or at axial station 3.2 (FIG. 18B). Each of embodiments 40-4 and 40-5 has two pans 173-P movably mounted on the pan support 206-P. For example, a left pan 173-4L is located either at axial station 1 (FIG. 19B) for front raking or at axial station 3.2 (FIG. 20B) for back raking. For clarity of illustration, the chute 174-P and the doctor blade 200-P are not shown in the series of FIGS. 18 through 22. However, the chute 174-P and the doctor blade 200-P are mounted and operate the same as described above with respect to FIGS. 12 and 13, for example, to respectively direct the debris 41 into the container 186-P, and to wipe the debris 41 from the tines 68-P.

Referring to FIGS. 18B and 18C, the programmed drive 82-3 is shown effective to move the rake 67-3 in an operational cycle either on the left side of the screen 74-3 for front raking, or on the right side of the screen 74-3 for back raking. If these two cycles are alternated in succession, the rake 67-3 is rotated appropriately (FIGS. 40A and 40B) between each such cycle for successively front and back raking the screen 74-4, and the position of the flap 146-3 is appropriately adjusted.

Pairs 207 of Paths Of Motion Of Rakes 67-4 and 67-5

In-Out Transverse Flow 44-T, Front Raking

Referring to FIGS. 19B and 20B, the programmed drive 82-4 causes the same rotary rake 67-4 to move in any of four operational cycles for front raking and back raking. The paths of the rake 67-4 are either of two pairs 207-F of paths for front raking (FIG. 19B), or two pairs of paths 207-B for back raking. The paths are vertical paths depicted by arrows U and D. Two such pairs 207-F are shown between the screens 74-4 for front raking the screens 74-4. For the left pair 207-FL of paths U and D, the rake 67-4 is on the left side of the vertical axis 55 with the rake 67-4 having been rotated to have the set 107-4L of tines 68-P face left to front rake the left screen 74-4L, which is referred to as the first rake position 71-4 of the rake 74-4.

The rotary rake 67-P is reversed between cycles, such that for the right pair 207-FR of paths U and D shown in FIG. 19B, the rake 67-4 is on the right side of the vertical axis 55 with the rake 67-4 rotated to have the set 107-4R of tines 68-4 face right so as to front rake the right screen 74-4R, and the position of the flap 146-4 is appropriately adjusted, which rake position is also be referred to as the first rake position 71-4 of the rake 74-4. If these two cycles are alternated in succession, the rake 67-4 and the flap 146-4 are rotated appropriately between each such cycle for successively front raking both of the screens 74-4.

In-Out Transverse Flow 44-T, Back Raking

Referring to FIGS. 20A and 20B, the programmed drive 82-4 is shown effective to move the same rake 67-4 in operational cycles in the other two of the four pairs 207 of vertical paths depicted by arrows U and D. Two such pairs 207-B ("B" for back raking) are shown between the walls 77-P and the screens 74-4L and 74-4R for back raking the screens 74-4. For the left pair 207-BL of paths U and D, the rake 67-4 is on the left side of the left screen 74-4L with the rake 67-4 having been rotated to have the set 107-4R of tines 68-4 face right to back rake the left screen 74-4L, which is referred to as the second rake position 71-4 of the rake 74-4.

The rotary rake 67-4 is reversed between cycles, such that for the right pair 207-4R of paths U and D shown in FIG. 20B, the rake 67-4 is on the right side of the vertical axis 55 with the rake 67-4 rotated to have the set 107-4L of tines 68-4 face left so as to back rake the right screen 74-4R, and the position of the flap 146-4 is appropriately adjusted. This position of the rotary rake 67-4 is also be referred to as the second rake position 71-4 of the rake 74-4. If these two cycles are alternated in succession, the rake 67-4 and the flap 146-4 are rotated appropriately between each such cycle for successively back raking both of the screens 74-4.

Pairs 207 of Paths Of Motion Of Rakes 67-4 and 67-5

Out-In Transverse Flow 44-T Front Raking

Figure 22A:
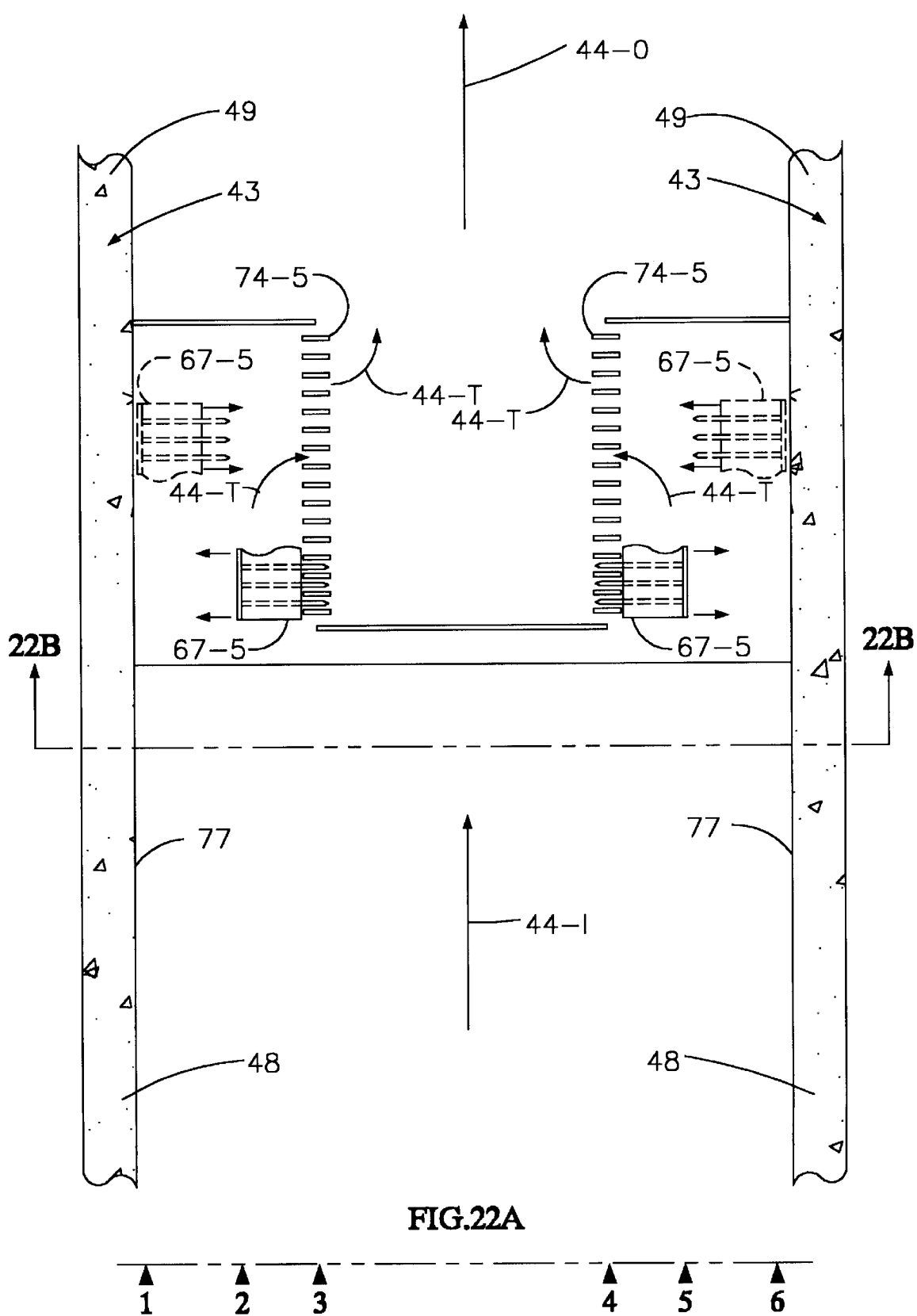
FIG. 22A is a plan view of the fifth embodiment shown in FIG. 21A with the position of the rake reversed for front raking.
Figure 22B:
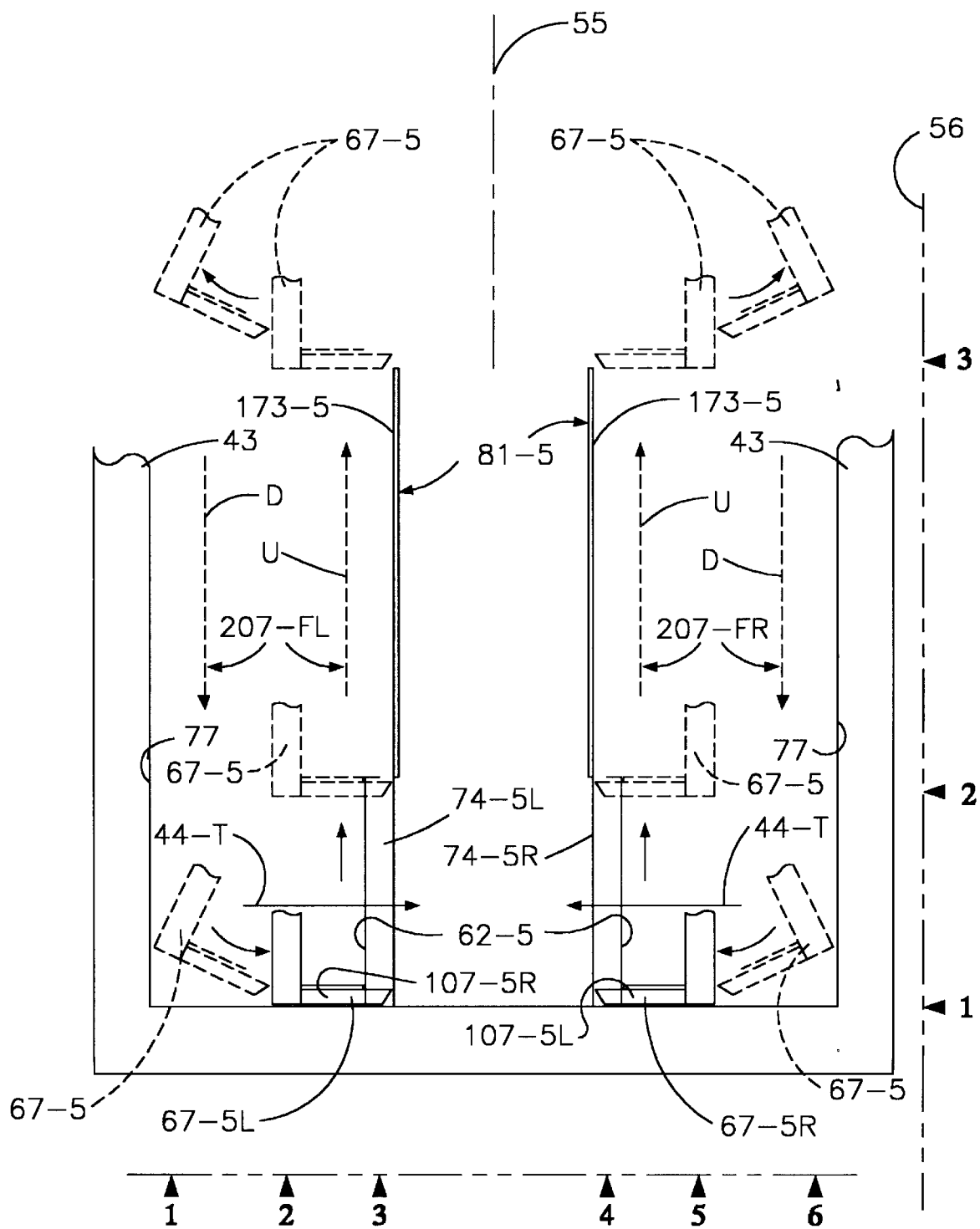
FIG. 22B is a schematic view taken along line 22B—22B in FIG. 22A showing the motion of the reversible rake (reversed from FIG. 21B) for front raking the two parallel screens.

Referring to FIGS. 22A and 22B, the programmed drive 82-5 causes the same rotary rake 67-5 to be moved in an operational cycle in any of four pairs 207-F (for front raking) or 207-B (for back raking) of vertical paths depicted by arrows U and D. Two such pairs 207-F are shown between the screens 74-5 for front raking the screens 74-5. For the left pair 207-FL of paths U and D, the rake 67-5L is on the left side of the left screen 74-5L with the rake 67-4 having been rotated to have the set 107-5R of tines 68-5 face right to front rake the left screen 74-5L. The position of the flap 146-5 has been appropriately adjusted. This position of the rotary rake 67-5L is referred to as the first rake position 71-5 of the rake 74-5. The rake 67-5 is reversed between cycles, such that for the right pair 207-FR of paths U and D shown in FIG. 22B, the rake 67-5R is on the right side of the right screen 74-5R with the rake 67-5R rotated to have the set 107-5L of tines 68-5 face left so to front rake the right screen 74-5R, and the position of the flap 146-5 is appropriately adjusted. This position of the rotary rake 67-5 is referred to as the first rake position 71-5 of the rake 74-5. If these two cycles are alternated in succession, the rake 67-5 and the flap 146-5 are rotated appropriately between each such cycle for successively front raking both of the screens 74-5.

Out-In Transverse Flow 44-T, Back Raking

Referring to FIGS. 21A and 21B, the programmed drive 82-5 causes the same rotary rake 67-5 to move in operational cycles in the other two of the four pairs 207 of vertical paths depicted by arrows U and D. Two such pairs 207-B ("B" for back raking) are shown between the screens 74-5L and 74-5R for back raking the screens 74-5L and 74-5R. For the left pair 207-BL of paths U and D, the rake 67-5 is on the right side of the left screen 74-5L with the rake 67-5 having been rotated to have the set 107-5L of tines 68-5 face left to back rake the left screen 74-5L. The position of the left rotary rake 67-5 with the set 107-5L of tines 68-5 facing left is the second rake position 72-5. Upon reversal of the rotary rake 67-5, and with the flap 146-5 still up, the right pair 207-BR of paths is followed in a similar manner.

Sixth Embodiment 40-6 of Bar Screen Cleaner 40

Non-Reversible, Two-Way Rake/One Fixed Screen

The sixth, non-reversible rake/one fixed screen, embodiment 40-6 of the bar screen cleaner 40 is shown in FIGS.

16A and 16B for use with one of the above-described channels 43 to remove the debris 41 from the flow 44-I. The sixth embodiment 40-6 differs from the first embodiment 40-1 primarily in having one, two-way, non-reversible rake 67-6 movable relative to the one screen 74-6 for alternating back and front raking. The sixth embodiment 40-6 provides the ability to alternately perform both back raking and front raking; that is to first perform a back raking cycle, for example, and then perform a front raking cycle.

Referring also to FIG. 23A, the sixth embodiment 40-6 includes the housing 171-6 which is placed on the channel 43-6 over the flow 44-I. The housing 171-6 has the outer cover 172-6 to protect the inner structural elements from inclement weather, for example. Within the cover 172-6 there is the frame 69-6 which supports the screen support 114-6 and the drive 82-6. The screen support 114-6 supports the screen 74-6 at the fixed axial station 4 (FIGS. 16A and 16B) extending across the flow 44-I. The screen 74-6 has the bars 116-6 as described above in respect to FIGS. 39A and 39B, and has the seal 124-6 to keep the flow 44-I directed through the screen 74-6.

The non-reversible rake 67-6 is a two-way rake as described above in respect to FIGS. 29A and 29B. The rake 67-6 is mounted on the housing 171-6 for motion under the action of the drive 82-6 as described in detail below. The rake 67-6 includes the arm 141-6 having the rake head 143-6 for supporting both the front rake 67-6F and the back rake 67-6B. The housing 171-6 is oriented at a fixed location relative to the channel 43-6, since the use of the two-way rake 67-6 does not require reversal of the housing 171-6 nor use of the rotary rake 67-3 (FIG. 40A), for example. As shown in FIGS. 16A and 16B, each such rake 67-6B and 67-6F, with the respective tines 68-6, extends in opposite directions along the longitudinal reference line 53 when in position for raking. The front rake 67-6F (and tines 68-6) extends toward the downstream end 49-6, and the back rake 67-6B (and tines 68-6) extends toward the upstream end 48-6.

A first, or upstream, one of the pans 173-6U is mounted on the frame 69-6 for movement axially from a working, back raking location at station 3.5 on line 53 (FIG. 16B), to an idle, front raking location at station 1 on the line 53 (FIG. 16B). At station 3.5, the pan 173-6 is vertically aligned with the distal ends 91-6 of the tines 68-6 of the back rake 67-6B as the back rake 67-6B moves upwardly (FIG. 16B) in the back raking cycle. In the idle location, the pan 173-6U is axially upstream of the working location (no longer vertically aligned with the distal ends 91-6 of the back rake 67-6B) to provide clearance for the rake 67-6 to be positioned upstream of the screen 74-6 as the rake 67-6 moves to the front raking position 71-6.

The other pan 173-6D is mounted on the frame 69 (FIG. 16B) for movement rotationally from a working, front raking location (FIG. 16A, solid lines) at an angle 211 to vertical on a pivot 212 positioned at axial station 6. The pan 173-6D rotates to vertical at station 6 into an idle, back raking location. In the idle location, the pan 173-6 is axially downstream of the working location as the lower end 181-6 of the pan 173-6 is no longer adjacent to the upper end 61-6 of the screen 74-6 to provide clearance for the rake 67-6 to be positioned downstream of the screen 74-6 in moving to the back raking position (FIG. 16B). In the working location (FIG. 16A), the lower end 181-6 of the pan 173-6D is adjacent to the upper end 61-6 of the screen 74-6 to be engaged by the short tines 68-6 (FIG. 29B) of the front rake 67-6F. An upstream chute 174-6U (FIG. 16B) is located for use with the pan 173-6U at the working station 3.5, and a downstream chute 174-6D is located for use with the pan 173-6D when the pan 173-6D is in the working position between stations 4 and 6.

FIGS. 16A and 16B show that there are two positions of the two-way rake 67-6. First, as shown in FIG. 16B the rake 67-6 may be positioned with the back rake 67-6B at station 4.4 immediately downstream of the back face 63-6 of the screen 74-6, with the tines 68-6 of the back rake 67-6B facing upstream for back raking. This can be the temporally first position of the rake 67-6 because it is preferable to remove the large pieces 96 of debris 41 first. The back rake position of the rake 67-6B with the back rake tines 68-6 in the spaces between the bars 116-6, and extending past the bars 116-6, of the screen 74-6 is referred to as the second rake position 72-6 of the rake 67-6. Next, as shown in FIG. 16A, the rake 67-6 may be positioned with the front rake 67-6F at station 3 immediately upstream of the front face 62-6 of the screen 74-6 (which is at station 4), with the short tines 68-6F of the front rake 67-6F positioned facing downstream for front raking to remove the small pieces 97. The front rake position of the rake 67-6 with the short, front rake tines 68-6F in the spaces between the bars 116-6 of the screen 74-6 is referred to as the first rake position 71-6.

As described above in respect to the second embodiment 40-2, and if no jamming of the debris 41 occurs, the drive 82-6 moves the rake 67-6F or 67-6B relative to the screen 74-6 and to the appropriate ones of the pans 173-6 and chute 174-6 so that the debris 41 is cleaned from the screen 74-6, moved along the pan 174-6 and is wiped from the tines 68-6 by the doctor blade 200-6 to drop into the container 186-6.

Seventh Embodiment 40-7 of Bar Screen Cleaner 40

Non-Reversible, Two-Way Rake/Two Fixed Screen

The seventh, non-reversible rake/two fixed screen, embodiment 40-7 of the bar screen cleaner 40 is shown in FIG. 17A for use with one of the above-described channels 43 to remove the debris 41 from the flow 44-I. The seventh embodiment 40-7 is similar to the sixth embodiment 40-6 in that the rake 67-7 is a two-way rake, and the housing 171-7 is not rotated into two orientations. The seventh embodiment differs from the first embodiment, for example, primarily in (i) providing two screens 74-7U and 74-7D, at fixed axial stations 2 and 4.2 in the channel 43-7, wherein the upstream screen 74-7U has wider spaces between the bars 166-7U (coarse bars 116-7C) than the spaces between the bars 116-7D (fine bars 116-7F) of the downstream screen 74-7D; (ii) mounting two fixed pans 173-7U and 173-7D, respectively, at respective fixed axial stations 1.1 and 4.2 above the respective fixed screens 74-7U and 74-7D, and (iii) having one, two-way, non-reversible rake 67-7 movable relative to the two screens 74-7U and 74-7D, and relative to the two pans 173-7U and 173-7D. The rake 67-7 has a back rake 67-7C with coarse tines 68-7C to back rake the coarse bars 116-7C of the upstream screen 74-7U, and has a front rake 67-7F with fine tines 68-7F to back rake the fine bars 116-7F of the downstream screen 74-7D. The seventh embodiment 40-7 provides the ability to alternately perform both back raking and front raking; that is to first perform a back raking cycle, for example, and then perform a front raking cycle.

The seventh embodiment 40-7 includes the housing 171-7 (FIG. 23A) which is placed on the channel 43-7 over the flow 44-I. The housing 171-7 has the outer cover 172-7 to protect the inner structural elements from inclement weather, for example. Within the cover 172-7 there is the frame 69-7 which supports the screen support 114-7 and the drive 82-7. The screen support 114-7 supports the screens 74-7U and 74-7D respectively at the fixed axial stations 2 and 4.2 (FIG. 17A) extending across the flow 44-I. The screens 74-7 have the respective coarse and fine bars 116-7C and 116-7F as described above, and has the seals 124-7 on each screen 74-7 to keep the flow 44-I directed through the screens 74-7.

The non-reversible rake 67-7 is a two-way rake, mounted on the housing 171-7 for motion under the action of the drive 82-7 as described in detail below. The rake 67-7 includes the arm 141-7 (FIG. 23A) having the rake head 143-7 for supporting both the front rake 67-7F and the back rake 67-7C. The housing 171-7 is oriented at a fixed location relative to the channel 43-7, since the use of the two-way rake 67-7 does not require reversal of the housing 171-7 nor use of the rotary rake 67-3, for example. As shown in FIG. 17A, each such rake 67-7C and 67-7F, with the respective tines 68-7, extends in opposite directions along the line 53 when in position for raking. The front rake 67-7F (and tines 68-7) extends toward the downstream end 49-7, and the back rake 67-7C (and tines 68-7) extends toward the upstream end 48-7. The first, or upstream, one of the pans 173-7U is mounted on the frame 69-7 at a working, back raking location at station 1.1 on line 53. At station 1.1 the pan 173-7U is vertically aligned with the distal ends 91-7 of the tines 68-7C of the back rake 67-7C as the back rake 67-7C moves upwardly in the back raking cycle. The other pan 173-7D is mounted on the frame 69-7 at a working, front raking location at axial station 4.2. In the working locations, the lower ends 181-7 of the pans 173-7 are adjacent to the respective upper ends 61-7 of the screens 74-7. The upstream pan 173-7U is engaged by the long tines 68-7C of the back rake 67-7C, whereas the downstream pan 173-6D is engaged by the short tines 68-7F of the front rake 67-7F. An upstream chute 174-7U (not shown, similar to chute 174-6U) is located for use with the pan 173-7U, and a downstream chute 174-7D (not shown, similar to chute 174-6D) is located for use with the pan 173-7D.

FIG. 17A shows that there are two positions of the two-way rake 67-7. First, the rake 67-7 may be positioned with the back rake 67-7C at station 2.2 immediately downstream of the back face 63-7U of the screen 74-7U, with the tines 68-7C of the back rake 67-7C facing upstream for back raking. This position of the rake 67-7B is referred to as the second rake position 72-7 of the rake 67-7. Next, the rake 67-7 may be positioned with the front rake 67-7F at station 4 immediately upstream of the front face 62-7 of the screen 74-7, with the short tines 68-7F of the front rake 67-7F positioned facing downstream for front raking to remove the small pieces 97. This position of the rake 67-7 is referred to as the first rake position 71-7.

As described above in respect to the second embodiment 40-2, and if no jamming of the debris 41 occurs, the drive 82-7 moves the rakes 67-7C or 67-7F relative to the respective screens 74-7U and 74-7D and to the respective pans 173-7U and 173-7D and to the chutes 174-7U and 174-7D. The debris 41 is cleaned from the respective screens 74-7U and 74-7D, moved along the respective pans 174-7U and 174-7D and is wiped from the respective tines 68-7 by the doctor blades 200-7U and 200-7D (similar to blades 200-2 in FIG. 13), and drops into the containers 186-7 (similar to containers 186-2 in FIG. 13).

Eighth Embodiment 40-8 of Bar Screen Cleaner 40

Non-Reversible, Two Rake/Two Fixed Screens

Simultaneous Front and Back Raking

The eighth, non-reversible, two (or split) rake, two fixed screens, embodiment 40-8 of the bar screen cleaner 40 is shown in FIG. 17B for use with one of the above-described channels 43 to remove the debris 41 from the flow 44-I. The eighth embodiment 40-8 is similar to the seventh embodiment 40-7, and the rake 67-8 is in two parts. Each part of the rake 67-8 is a one-way rake, and the housing 171-8 (FIG. 23A) is not rotated into two orientations. The eighth embodiment 40-8 provides the ability to simultaneously perform both back raking and front raking; that is, at the same time that a back raking cycle is performed on one screen 74-8U, a front raking cycle is performed on a second screen 74-8D, which is preferably downstream of the screen 74-8U.

The eighth embodiment 40-8 includes the housing 171-8 which is placed on the channel 43-8 over the flow 44-I. The housing =171-8 has the outer cover 172-8 to protect the inner structural elements from inclement weather, for example. Within the cover 172-8 there is the frame 69-8 which supports the screen support 114-8 and the drive 82-8. The screen support 114-8 supports the screens 74-8U and 74-8D respectively at the fixed axial stations 1.8 and 7 extending across the flow 44-I. The screens 74-8U and 74-8D have the respective coarse and fine bars 116-8C and 116-8F as described above, and have the seals 124-8 to keep the flow 44-I directed through the screens 74-8.

The non-reversible rake 67-8 is formed by the two rakes 67-8C and 67-8F mounted on the housing 171-8 for motion under the action of the drive 82-8 as described in detail below. Each of the rakes 67-8U and 67-6D includes the arm 141-8 having the rake head 143-8. The rake head 143-8B supports the back rake 67-8C, which is the same as the back rake 67-7C and has the coarse tines 68-7C. The rake head 143-8F supports the front rake 67-8F, which is the same as the front rake 67-7F, and has the fine tines 68-8F.

The housing 171-8 is oriented at a fixed location relative to the channel 43-8, since the use of the two rakes 67-8C and 67-8F does not require reversal of the housing 171-8 nor use of the rotary rake 67, for example. As shown in FIG. 17B, each such rake 67-8C and 67-8F, with the respective tines 68-8, extends in opposite directions along the longitudinal axis 51 when in position for raking. The front rake 67-8F (and tines 68-8) extends toward the downstream end 49-8, and the back rake 67-8C (and tines 68-8) extends toward the upstream end 48-8. A first, or upstream, one of the pans 173-8U is mounted on the frame 69-8 at a working, back raking location at station 1 on line 53. At station 1, the pan 173-8U is vertically aligned with the distal ends 91-8 of the tines 68-8 of the back rake 67-8C as the back rake 67-8C moves upwardly in the back raking cycle. The other pan 173-8D is mounted on the frame 69-8 at a working, front raking location at axial station 7. In the working location, the lower ends 181-8 of the pan 173-8D is adjacent to the upper end 61-8 of the screen 74-8D. The upstream pan 173-8U is engaged by the long tines 68-8C of the back rake 67-8C, whereas the downstream pan 173-8D is engaged by the short tines 68-8F of the front rake 67-8F. An upstream chute 174-8U (not shown) is located for use with the pan 173-8U, and a downstream chute (not shown) 174-8D is located for use with the pan 173-8D.

FIG. 17B shows that the two rakes 67-8U and 67-8D may simultaneously be positioned with: (1) the back rake 67-8C at station 2 immediately downstream of the back face 63-8 of the upstream screen 74-8U, with the tines 68-8C of the back rake 67-8C facing upstream for back raking; and (2) the front rake 67-8F at station 5 immediately upstream of the front face 62-8 of the screen 74-8D, with the tines 68-8F of the front rake 67-8F facing downstream for front raking. The first rake position 71-8 of the rake 67-8 is on the right in FIG. 17B, and the second rake position 72-7 is on the left in FIG. 17B.

If no jamming of the debris 41 occurs, the drive 82-8 simultaneously moves the rakes 67-8C and 67-8F relative to the respective screens 74-8U and 74-8D and relative to the respective pans 173-8U and 173-8D and relative to the respective chutes 174-8U and to 174-8D so that the debris 41 is cleaned from the respective screens 74-8U and 74-8D, moved along the respective pans 174-8U and 174-8D, is wiped from the respective tines 68-8 by the doctor blades 200-8U and 200-8D, and drops into the containers 186-8.

The Programmed Drive 82

The programmed drive 82 may be used to move the rake 67 of all of the embodiments 40-1 through 40-8 of the present invention. The pre-set drive 191 is used with the second embodiment 40-2 to move the rake 67-2 when the benefits of the programmed drive 82 are not necessary for a particular installation of a bar screen cleaner 20, e.g., a very small size water treatment plant. The programmed drive 82 includes structure for performing the above described basic movements of the rakes 67, and the program 86 and the computer 87 of a controller 220 which controls such structure in the event of situations, such as jamming of the debris 41 in the screen 74. The computer 87 may be a computer sold by Idec under the brand name "Micro$^3$", for example.

Drive 82 Provides Movement of Rake 67

Figure 23B:
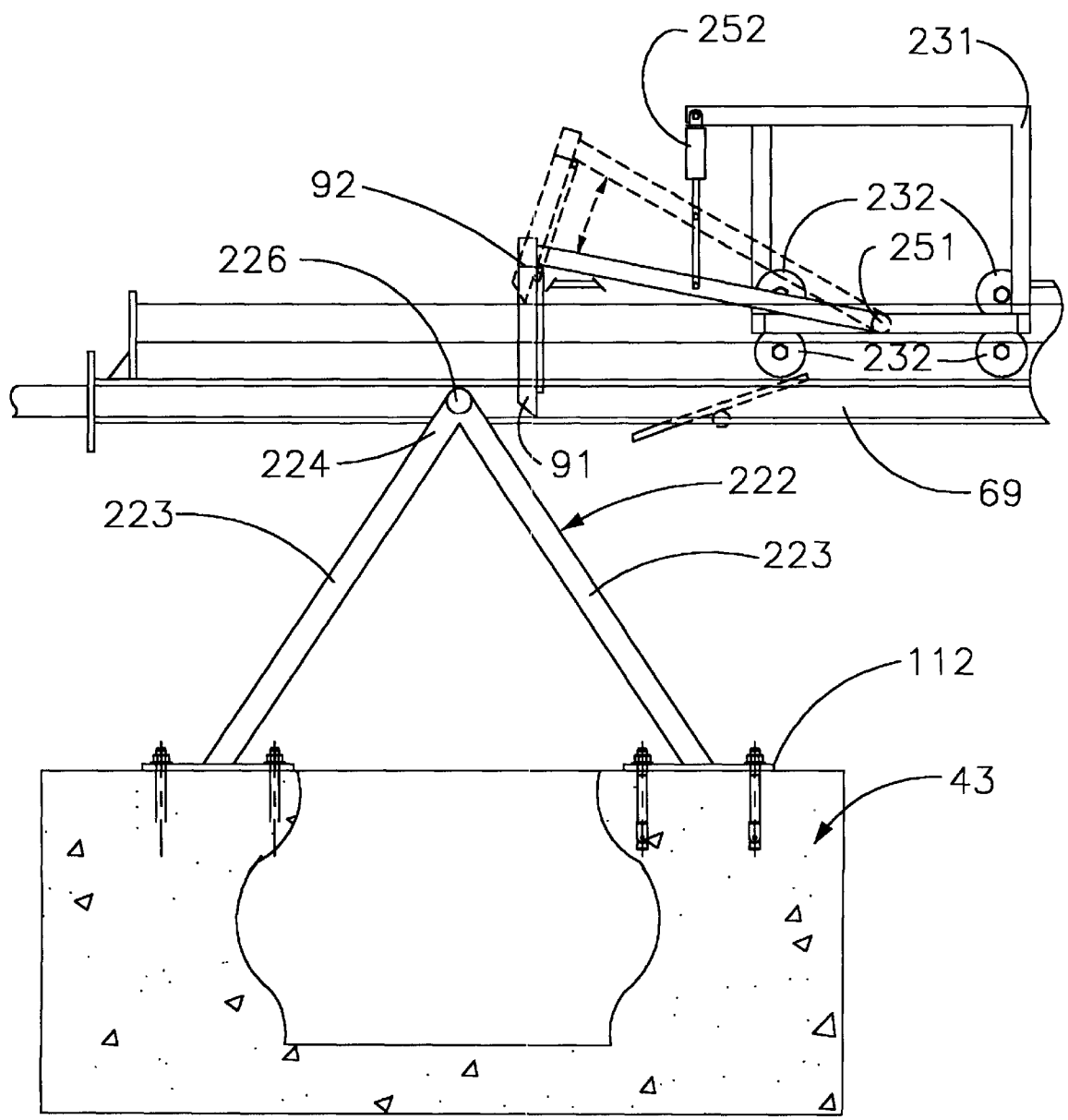

Referring to FIGS. 7, 9, 23A and 23B to consider such structure, the drive 82 is carried by the frame 69 shown in FIGS. 9 and 23A. The frame 69 is mounted on the top 112 of the channel 43. In one version of the bar screen cleaner 40, the frame 69 may be mounted directly on a base 221 that is bolted to the top 112. If it is desired to move the structure of the bar screen cleaner 40 to permit examination of the screen 74 or the rake 67, for example, or to perform maintenance, the frame 69 may be mounted as shown in FIGS. 23A and 23B on a pivotal support 222 that is mounted on the top 112. The pivotal support 222 is shown in FIG. 23A as having legs 223 that are bolted to the top 112, and that carry a journal 224 that rotatably supports a shaft 226. The frame 69 is secured to the shaft 226 to permit the frame 69 to rotate on a horizontal axis that is transverse to the longitudinal axis 51 and spaced above the channel 43. Rotation of the frame 69 on the shaft 226 allows the structure of the bar screen cleaner 40 that has been in the flow 44 within the channel 43 to be removed from the channel 43 for examination and maintenance. Thus, the screen 74 and the baffles 106 which are in the channel 43 may be moved with the other structure of the cleaner 40 into the horizontal position shown in FIG. 23B.

The frame 69 is shown in FIGS. 7–9 and 23A extending above the channel 43 to support a guide 228 which is formed from spaced cylindrical rods 229. The rods 229 are mounted parallel to each other, and in FIG. 8 are shown held by the frame 69 over the opposite walls 77. The rods 229 support a carriage 231 that is mounted on four pairs of opposed concave rollers 232. Each pair of rollers 232 straddles a rod 229, so that the rollers 232 of the pair ride along the rod 229. The rollers 232 are mounted for rotation on opposite sides 234 (FIG. 8) of the carriage 231. With the frame 69 vertical as shown in FIGS. 7–9 and 23A, or nearly vertical (e.g., one to thirty degrees off vertical), the rollers 232 guide the carriage 231 toward and away from the channel 43 along a path that is generally parallel to the various screens 74 that are mounted in the channel 43.

The screen support 114 (FIG. 39B) extends from the frame 69 into the channel 43 on both sides of the screen 74. The screen support 114 positions the screen 74 sealed to the walls 77 and to the bottom 113 at the desired station along the longitudinal axis 51.

The carriage 231 may be driven along the rods 229 by one of many types of reciprocating mechanisms 236. One such mechanism 236 is described as a shared reel drive 237 and is disclosed in co-applicant C. L. Meurer's co-pending application Ser. No. 08/443,819, filed May 18, 1995 for Sludge Collector Method and Drive With Shared Reel For taking Up and Paying Out cables, which is incorporated herein by reference. In the shared reel drive 237, two cables 238 and 239 are attached to respective ends 241 and 242 of the carriage 231 and pull the carriage 231 to one end 243 (FIG. 9) of the rods 229 (e.g., upper) or the other end 244 of the rods 229 (e.g., lower). The cables 238 and 239 are wound in opposite directions onto the same surface of a reel 246 (FIG. 40A) so that as one cable 238 pays out from the reel 246 the other cable 239 is taken up onto the reel 246. The paying out and taking up is from the same axial location along the reel 246. This is achieved by winding one cable 238 completely onto the reel 246, securing the other cable onto the reel 246, and then paying out the cable 238 while the cable 239 is taken up on the reel 246 at the same axial location on the surface of the reel 246 from which the first cable 238 was payed out. When the first cable 238 is completely payed out, the motor 83 that drives the reel 246 reverses and the paying out and taking up reverses. The carriage 231 is thus reciprocated on the guide rods 229.

The carriage 231 carries at least one of the arms 141 to support one of the rake heads 143. For example, in the first embodiment 40-1, one arm 141 is provided and has two sections 141A and 141B shown in FIGS. 1 and 2 connected to the rake 67-1. A similar arm arrangement is provided for embodiments 40-2 through 40-7. As to embodiment 40-8, two arms 141-8 are mounted on the carriage 231, one supporting the rake 67-8C and the other supporting the rake 67-8F (FIG. 17B). The arms 141 are pivotally mounted on the carriage 231. Such mounting is shown in FIGS. 7–9, 23A and 23B, where a pivot shaft 251 secured to the carriage 231 allows the proximal end 144 of the arm 141 to rotate on the carriage 231. The distal end 142 of the arms 141, or of the sections 141A and 141B, is secured to the rake heads 143, which may be any of the types described above. Upon rotation of the proximal end 144 on the pivot shaft 251, the distal end 142 is moved to different positions extending away from the carriage 231. Since the position of the arm 141 controls the position of the rake 67 and the tines 68 relative to the screen 74, the engagement of the rake 67 with the screen 74 varies as the arm 141 is moved.

The position of the arm 141 relative to the carriage 231 is controlled separately from that of the reciprocation of the carriage 231 on the rods 229. An actuator 252 is mounted with one end 253 on the carriage 231 and the other end 254 secured to the arm 141 to rotate the arm 141 into controllable positions. For example, when the actuator 252 moves the arm 141 out, to the "out" position, the tines 68 are away from the screen 74 and thus do not engage the screen 74 for raking. When the actuator 252 moves the arm 141 in, to the "in" position, the tines 68 are moved toward the vertical axis 55 for raking. When the arm 141 is positioned between the "in" and "out" positions, the rake 67 may be engaged with one of the pans 173 or with the doctor blade 200, for example, after completing a traverse of the screen 74.

The movements of the tines 68 of the rakes 67 described above as being in the direction of the longitudinal axis 51, or upstream or downstream, are achieved by the actuator 252 pivoting the arm 141 relative to the carriage 231. The movements of the tines 68 of the rakes 67 described above as being upward or downward relative to the screens 74 or to the pans 173 or to the chutes 174, are achieved by the reciprocating mechanism 236, such as the shared reel drive 237, moving the carriage 231 in one way or the opposite way (e.g., up or down) on the rods 229, with the carriage 231 carrying the arm 141, the rake 67 and the various sets of tines 68.

Controller 220

The drive 82 also includes the controller 220 for controlling the above-referenced structure by controlling how far and when the carriage 231 is to move on the rods 229, and for controlling how far and when the arm 141 is to move relative to the carriage 231 in the bar screen cleaning cycles. The controller 220 is described in connection with one basic operational cycle involving a complete series of motions of the arm 141, the rake 67, and the tines 68. Referring to FIG. 3B which shows an operational cycle of the first embodiment 40-1, and to FIG. 27, data used by the controller 220 is generated by sensors 261 shown in FIGS. 23A and 27 mounted at various locations on the frame 69 and on the carriage 231. Particular ones of the sensors 261 are identified below by the reference number 261 followed by a "-letter", e.g., "-A". The sensors 261 generate signals 262. Particular ones of the signals 262 are identified by the reference number 262 followed by a dash and one or more letters, e.g., "-A". The signals 262 are sent to the computer 87 of the controller 220.

One sensor 261 is a first metal proximity detector 261-A, such as that sold under the trade name "Turk", also referred to as a top sensor. The top sensor 261-A is mounted on the frame 69 to detect the carriage 231 when the carriage 231 is located on the rods 229 at the upper end 243 of the traverse of the carriage 231. The top sensor 261-A sends a carriage-up signal 262-A to the controller 220, indicating that the rake 67 is at the station 3.5 (FIG. 3B) on the vertical reference line 56 (having completed movement relative to the chute 174 to engage the doctor blade 200 at the end of an operational cycle).

A second metal proximity sensor 261-B adjacent to the other end 243 of the rods 229 may be referred to as a bottom sensor. The bottom sensor 261-B detects the carriage 231 on the rods 229 at the bottom end of the traverse, wherein the rake 67 is at vertical station 1 on the vertical reference line 56, and sends a carriage-down signal 262-B to the controller 220. In response to the respective signals 262-A and 262-B, the controller 220 causes the reel drive motor 83 to stop. The carriage 231 thus stops with the rake 67 at respective stations 3.5 or 1.

Other vertical station sensors 261-VS are mounted at spaced locations along the frame 69 between the upper end 243 and the lower end 244. These sensors 261-VS detect where the carriage 231 is along the traverse between the opposite ends 243 and 244, and are used, for example, in cases of jamming of the debris 41 in the screen 74. The sensors 261-VS generate a vertical station signal 262-VS, which can indicate the station on the vertical line 56 at which a jam occurs or the station at which the rake 67 is to engage the screen 74.

An arm position sensor 261-C mounted on the carriage 231 detects the position of the arm 141 relative to the carriage 231, and sends an arm-indicator signal 262-C to the controller to indicate whether the arm is "in" or "out". If the controller 220 is programmed to expect a signal 262-C, and no signal 262-C is generated, this indicates that the arm 141 is in between the "in" and "out" positions. The arm position sensor 261-C also detects the completion of the motion of the arm 141 after the tines 68 pass the doctor blade 200 to wipe the tines 68, and when the carriage-up signal 262-A has been generated, generates the arm-indicator signal 262-C to indicate the end of the cycle. In response, the controller 220 stops the cycle.

A pan sensor 261-PB generates a pan-bottom signal 262-PB indicating, for example, that the carriage 231 has positioned the rake 67 at station 2 on the vertical reference line 56 indicating that the rake 67 has reached the bottom end 181 of the pan 173. In response to the pan-bottom signal 262-PB, the controller 220 may cause the actuator 252 in the cycle of the first embodiment 40-1 to move the arm 141 out to keep the tines 68 of the rake 67 engaged with the pan 173, for example.

A chute sensor 261-D generates a chute signal 262-D indicating, for example, that the carriage 231 has positioned the rake 67 at station 3 on the vertical reference line 56 indicating that the rake 67 has reached the chute 174.

As an alternative to the use of the sensors 261, the drive motor 83 may be provided with a rotational encoder that outputs signals indicating the amount of rotation of the motor, and thus the location of the carriage 231 along the rods 229. Such signals may be used in the same manner as the various signals 262 as described above.

Other horizontal station sensors 261-HS are mounted at evenly spaced locations along the channel 43 between positions near the upstream end 48 and the downstream end 49. These sensors 261-HS detect the orientation of the housing 171 on the channels 43. The sensors 261-HS generate a station signal 262-HS, which indicates whether the housing 171 has the rake 67 reversed for front raking (FIG. 1) or back raking (FIG. 2).

Basic Bar Screen Cleaning Cycles

The terms "basic bar screen cleaning cycle", "basic operational cycle", and "basic cycle", identify a bar screen cleaning cycle in which no jamming of debris 41 is experienced. The basic cycle is generally described in FIG. 24, and is applicable to all of the embodiments 40-1 through 40-8, with variations for the amount of arm movement used, for example, in embodiments 40-3, 40-4, and 40-5, for example. For ease of description, the basic cycle is described in respect to the first embodiment 40-1, and then variations for the other embodiments are noted.

Basic Cycle

First (Reversible Rake/Fixed Screen) Embodiment 40-1

Figure 28A:
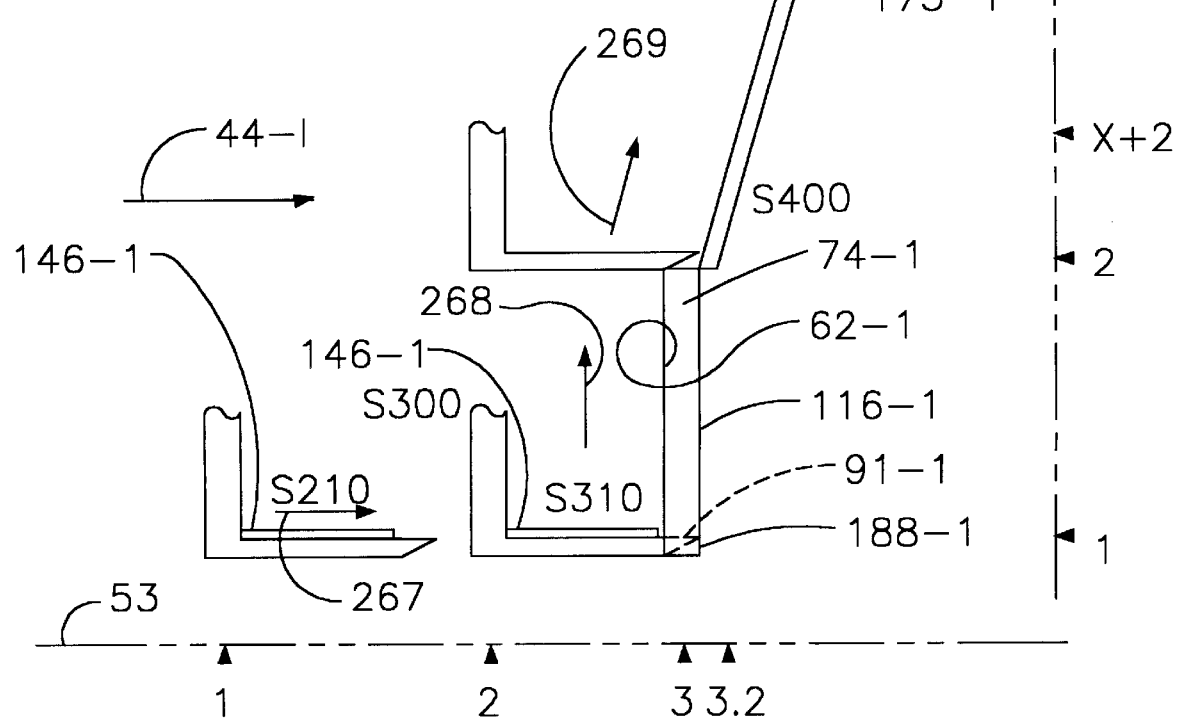

The drive 82 moves the rake 67-1 in either of the rake positions (FIG. 1 or FIG. 2) through the basic debris removal cycle. The motion of the rake 67-1 when the housing 171-1 is in the front raking orientation (FIG. 1) and the pan 173-1 is in the front raking position is shown in FIG. 3B. The rake 67-1 (shown in dashed lines) is upstream and above the channel 43-1 in the vertical station 4, and the arm 141-1 is out. The flap 146-1 has been moved to the down position (FIG. 3A) for front raking. The cycle starts with the controller 220-1 receiving a cycle-start signal 262-S which may be output by a cycle timer 263-1, for example, which periodically outputs the cycle-start signal 262-S. The carriage-up signal 262-A and arm-out signal 262-C have been generated, so in response to the cycle-start signal 262-S, in S100 (FIGS. 24 and 28A) the controller 220 starts the drive motor 83-1 to move the carriage 231-1 downwardly on the rods 229-1. The carriage 231-1 moves the arm 141-1 and the rake 67-1 downwardly in the vertical path (see arrow 266) to vertical station 1 spaced upstream from the lower end 88-1 of the screen 74-1. The carriage-down signal 262-B is generated, so the controller 220 stops the drive motor 83. The rake 67-1 is at axial station 1, so the arm-out signal 262-C is generated. In response to the signals 262-B and 262-C, in S200 (FIGS. 24 and 28A) the controller 220 causes the actuator 252-1 to move the arm 141-1 in, which moves the rake 67-1 in the direction (see arrow 267) of the flow toward the front face 62-1 of the screen 74-1. When the housing 171-1 was oriented for front raking, the flap 146-1 was put down, so the motion (arrow 267) of the rake 67-1 stops in the front raking position (first rake position 71-1 at axial station 2) with only the distal ends 91-1 of the tines 68-1 between the bars 116-1 of the screen 74-1. When the rake stops at axial station 2, the arm-in signal 262-C is generated. In response to the carriage-down signal 262-B and the arm-in signal 262-C, the controller 220 performs S300 and causes the drive motor 83 to start and move the carriage 231 up (see arrow 268) to move the tines 68-1 of the rake 67-1 along the bars 116-1 of the screen 74-1 and scrape the sides 120-1 and the front face 62-1 of the screen 74-1 to remove the debris 41 therefrom. At vertical station 2, the rake 67-1 has just moved past the screen 74-1, so the pan bottom signal 262-PB is generated. In response, the controller 220 causes the arm 141-1 to move further "in", which movement is axially from station 2 toward station 3 and upwardly, so that the path (see arrow 269) of the distal ends 91-1 of the tines 68-1 matches the angle 281 of the pan 173-1, which is in the front raking position of the pan 173-1. The distal ends 91-1 thus stay engaged with the pan 173-1. The drive 82 continues to cause the rake 67-1 to be moved along the pan 173-1, to vertical station 3, and past the chute 174-1. The tines 68-1 engage the chute 174-1 and rotate the chute 174-1 clockwise out of the path (beyond arrow 269) until the rake 67-1 passes the chute 174-1 and is in vertical station 3.2. The carriage-up signal 262-A is generated. The chute 174-1 returns to the original position (solid lines). In response to the carriage-up signal 262-A and the arm-in (to axial station 2.7) signal 262-C, the controller 220 performs S500 and causes the actuator 252-1 to move the arm 141-1 out (to the left in FIG. 3B-see arrow 270). The arm 141-1 moves the tines 68-1 past the doctor blade 200-1 to remove the debris 41 from the tines 68-1, and the chute 174-1 directs the falling debris 41 to the right into the container 186. In S600 the arm 141 stops at axial station 1. With the screen 74-1 cleaned and the debris 41 removed from the rake 67-1, the cycle ends with the actuator 252 having moved the arm 141-1 to move the rake 67-1 back to vertical location 4 and axial station 1. The arm-out signal 262-C is generated. In response, the controller 220 causes the actuator 252-1 to stop, ending the cycle.

Referring to FIG. 4B, the drive 82-1 also moves the rake 67-1 in the second rake position 72-1 through a back raking debris removal cycle. The cycle is the same as that described above for the front raking cycle of FIG. 3B, except that at vertical station 2, the controller 220 does not respond to the pan bottom signal 262-PB by causing the actuator 252-1 to move the rake 67-1 to move further "in" since there is no need to move the rake 67-1 axially from station 4 toward station 3 as the rake 67-1 moves upwardly toward vertical station 3. Rather, the controller 220 responds to the pan bottom signal 262-PB by causing the actuator 252-1 to remain stopped so the arm 141-1 does not move in or out, and the rake 67-1 stays in the same "in" position at axial station 4 with the distal ends 91-1 of the tines 68-1 engaged with the pan 173-1.

Basic Cycle

Third Embodiment 40-3

As a preface to the cycle of the third embodiment 40-3, reference is made to FIGS. 18A–18C, where it is seen that the carriage 231-3 is designed to allow the actuator 252-3 to move the arm 141-3 into two "out" positions and two "in" positions. One "out" position is shown in FIG. 18B to the left of the parallel screen 74-3 (transverse station 1) and is followed by the "in" position at station 2. The other "out" position is shown in FIG. 18C to the right of the parallel screen 74-3 (station 5) and is followed by the "in" position at station 4. Also, the pan 173-3 is moved between station 3 for front raking (FIG. 18B), and station 2 for back raking. Finally, the rake 67-3 is rotated from the position in FG. 40B to the position 40A according to the type of raking to be performed.

The basic debris removal cycles of the third embodiment 40-3 are substantially the same as those of the first embodiment 40-1 as described with respect to FIG. 4B in which the pan 173-1 is vertical, which is the position of the pan 173-3. The primary difference in the cycles is that for embodiment 40-3, the controller 220-3 and the arm position sensors 261-C respectively respond to and sense both of the out positions and both of the in positions of the arm 141-3. Also, the operation of the cycle timer 263-3 is coordinated with the desired type of raking (front or back) so that the rake head 143-3 is either (i) manually rotated to the proper position and the flap 246-3 put up or down as required, or (ii) in response to the cycle start signal 262-S, the controller 220 causes a first rotary actuator 282-3 (FIGS. 40A–40C) to rotate the rod 159 and the rake head 143-3 to the proper position and a second rotary actuator 283-3 (FIG. 40C) to rotate the flap 246-3 up or down as required.

Basic Cycle

Fourth Embodiment 40-4

As a preface to the cycles of the fourth embodiment 40-4, reference is made to FIGS. 19B and 20B, where the respective two pairs 207-F of paths U and D (for front raking) and two pairs 207-B of paths U and D (for back raking) are shown. The carriage 231-4, the actuator 252-4, and the arm 141-4 are designed to allow the actuator 252-4 to move the arm 141-4 into two "out-" positions and two "in" positions in each of FIGS. 19B and 20B. For front raking, the "out" positions are shown in FIG. 19B at stations 3 and 4. For back raking, the "out" positions are shown in FIG. 20B at stations 1 and 6. For front raking, the "in" positions are shown in FIG. 19B at stations 2 and 5. For back raking, the "in" positions are shown in FIG. 20B at stations 2 and 5. To sense these many in and out positions of the arm 141-4, there are many arm position sensors 261-4C, each generating a respective arm "in" or "out" signal 262-C.

The controller 220 is designed in view of the four possible pairs 207 of paths U and D by responding to the cycle-start signal 262-S output by the cycle timer 263-4. In response, the controller 220 selects the sequence of a series of cycles, such as back raking first (e.g., left pair 207-BL, then right pair 207-BR), then front raking (e.g., left pair 207-FL, then right pair 207-FR). Having selected the sequence of pairs 207 of paths, the controller 220 selects the appropriate arm position sensors 262-C to respond to for each particular cycle.

The basic debris removal cycles of the fourth embodiment 40-4 are substantially the same as those of the third embodiment 40-3 as described with respect to FIG. 18B. The primary differences in the cycles are that for embodiment 40-4, the controller 220-4:

(a) has selected the particular arm position sensors 261-C for the pair 207 of paths;

(b) (in the absence of manual positioning), causes the first rotary actuator 282-4 to rotate the rake head 143-4 to the proper position (FIG. 19B, position of rake 67-5L for front raking for example);

(c) causes the second rotary actuator 283-4 to put the flap 246-4 up (for back raking) or down (for front raking); and (d) the pans 173-4L and 173-4R are moved to the respective stations 1 and 6 (front raking, FIG. 19B), and stations 3.2 and 3.8 (back raking, FIG. 20B).

Once set up with items (a) through (d) for a cycle in one of the pairs 207 of paths, the controller 220 controls each cycle as described with respect to the first embodiment 40-1, except that the controller 220 does not respond to the pan bottom signal 262-PB because the pan 173-4 is vertical and the arm 141-4 does not have to be move axially to stay engaged with the pan 173-4.

Basic Cycle

Fifth Embodiment 40-5

As a preface to the cycles of the fifth embodiment 40-5, reference is made to FIGS. 21B and 22B, where the respective two pairs 207-F of paths U and D (for front raking) and two pairs 207-B of paths U and D (for back raking) are shown. The carriage 231-5, the actuator 252-5, and the arm 141-5 are designed to allow the actuator 252-5 to move the arm 141-5 into two "out" positions and two "in" positions in each of FIGS. 21B and 22B. For front raking, the "out" positions are shown in FIG. 22B at stations 1 and 6. For back raking, the "out" positions are shown in FIG. 21B at stations 3 and 4. For front raking, the "in" positions are shown in FIG. 22B at stations 2 and 5. For back raking, the "in" positions are shown in FIG. 21B at stations 2 and 5. To sense these many "in" and "out" positions of the arm 141-5, there are many arm position sensors 261-5C, each generating a respective arm "in" or "out" signal 262-C.

As in the fourth embodiment 40-4, the controller 220 is designed in view of the four possible pairs 207 of paths U and D by responding to the cycle-start signal 262-S output by the cycle timer 263-4. In response, the controller 220 selects the sequence of a series of cycles, such as back raking first (e.g., left pair 207-BL, then right pair 207-BR), then front raking (e.g., left pair 207-FL, then right pair 207-FR). Having selected the sequence of pairs 207 of paths, the controller 220 selects the appropriate arm position sensors 262-5C to respond to for each particular cycle.

The basic debris removal cycles of the fifth embodiment 40-5 are substantially the same as those of the fourth embodiment 40-4 as described with respect to FIGS. 19B and 20B. The primary difference in the cycles is that for embodiment 40-5, the pans 173-5L and 173-5R are moved to the respective stations 3 and 4 (front raking, FIG. 22B), and stations 0.5 and 6.5 (back raking, FIG. 21B).

Once set up with items (a) through (c) as described for the fourth embodiment, and with the pans 173-5 set, all for a cycle in one of the pairs 207 of paths, the controller 220 controls each cycle as described with respect to the fourth embodiment 40-4.

Basic Cycle

Sixth Embodiment 40-6

Referring to FIGS. 16A and 16B, the controller 220 controls the drive 82-6 to move the two-way rake 67-6 along either of the two pairs 207-F or 207-B of paths U and D through the basic debris removal cycle. The pair 207-B of paths U and D is shown in FIG. 16B for back raking and is downstream of the screen 74-6 with the downstream pan 173-6D having been moved to axial station 5.6 out of the way of the rake 67-6, and the upstream pan 173-6U having been moved to station 3.5 to be engaged by the two-way rake 67-6 during back raking. The pair 207-F of paths U and D is shown in FIG. 16A for front raking and is initially upstream of the screen 74-6, the lower end 181 of the downstream pan 173-6D having been moved to axial station 4 to engage the top of the bars 116-6 of the screen 74-6, and the upstream pan 173-6U having been moved to station 1 out of the way of the rake 67-6 during front raking. No initial positioning a flap 146 is necessary since the rake 67-6 is the two-way rake 67-6 having the two sets 93 of tines 68-6.

With this initial set up for the cycles, and with the arm 141-6 arranged on the carriage 231 to move into either of the pairs 207-F and 207-B of the paths U and D, the controller 220 controls the basic back raking cycle in substantially the same way as described for the control of the back raking cycle of embodiment 40-1 shown in FIG. 4B. Then, after adjustment of the upstream and downstream pans 173-6U and 173-6D to the positions shown in solid lines in FIG. 16A, the controller 220 controls the basic front raking cycle in substantially the same way as described for the control of the front raking cycle of embodiment 40-1 shown in FIG. 3B.

Basic Cycle

Seventh Embodiment 40-7

Referring to FIG. 17A, the controller 220 controls the drive 82-7 to move the two-way rake 67-7 along either of the two pairs 207-L or 207-R of paths U and D through the basic debris removal cycle. The pair 207-L of paths U and D is shown in FIG. 17A for back raking and is immediately downstream of the upstream screen 74-7U. The upstream pan 173-7U is at axial station 1 to be engaged by the tines 68-7C during back raking. The pair 207-R of paths U and D is shown in FIG. 17A for front raking and is immediately upstream of the downstream screen 74-7D. The downstream pan 173-7D is at axial station 4.2 to be engaged by the tines 68-7 during front raking. No initial positioning of a flap 146 is necessary since the rake 67-7 is the two-way type of rake 67 having the two sets of tines 68-7.

With this initial set up for the cycles, and with the arm 141-7 arranged on the carriage 231-7 to move into the two pairs 207-L and 207-R of paths U and D, the controller 220 controls the basic back raking cycle in substantially the same way as described for the control of the back raking cycle of embodiment 40-6 shown in FIG. 16B. Then, without any adjustment of the upstream and downstream pans 173-7U and 173-7D, the controller 220 controls the basic front raking cycle in substantially the same way as for the control of the back raking cycle of embodiment 40-7.

Basic Cycle

Eighth Embodiment 40-8

Referring to FIG. 17B, the controller 220 controls the drive 82-8 to move the carriage 231 and independently move the two arms 141-8 so that the arms 141-8 simultaneously move along the respective pairs 207-B and 207-F of paths U and D through the basic debris removal cycle to simultaneously perform the back and front raking. The pair 207-B of paths U and D is shown in FIG. 17B for back raking and is immediately downstream of the upstream screen 74-8U. The upstream pan 173-8U is at axial station 1 to be engaged by the tines 68-8 of the upstream rake 67-8U during the back raking. The pair 207-F of paths U and D is shown in FIG. 17B for front raking and is immediately upstream of the downstream screen 74-8D. The downstream pan 173-8D is at axial station 7 to be engaged by the tines 68-8 of the downstream rake 67-8F during front raking. No initial positioning of a flap 146 is necessary since the rakes 67-8 are only used for the specific back or front raking.

With this initial set up for the cycles, and with the arms 141-8 arranged on the carriage 231-8 to separately and simultaneously move along the respective pairs 207-B and 207-F of paths U and D, the controller 220 controls the basic back raking cycle in substantially the same way as described for the control of the raking cycles of embodiment 40-7 shown in FIG. 17A. The only difference is that the carriage 231 has a separate arm position sensor 261-C for each of the two arms 141-8, such that the controller 220 responds to both arm position signals 262-C.

Programmed Cycles: Rake Control For Jammed Rake 67

The embodiments 40-1 through 40-8 of the present invention generally operate using the basic cycles most of the time. However, because it is likely that the debris 41 will tend to become lodged or "jammed" in the screen 74 during some operational cycles, the programmed drive 82 has the above-described feature of controlling the operating cycles of embodiments 40-1 through 40-8 in that situation. When the debris 41 becomes lodged or "jammed" in the screen 74 (FIG. 15), the rake 67 is also said to be "jammed" because the rake 67 is not able to move the jammed debris 41 up from the station (the "jammed station") at which the debris 41 is jammed. During a down stroke of the rake 67, if the debris 41 remains jammed in the screen 74, the rake 67 is also said to be "jammed" because the rake 67 is not able to move the jammed debris 41 down from the jammed station.

The program 86 of the controller 220 is designed to respond to the sensed jam (i.e., current 84 in excess of the limit 85, FIG. 27), and cause the rake 67 to be positively disengaged from the appropriate face 62 or 63 of the screen 74. As described below, further movement of the rake 67 is controlled according to the nature of the problem which caused the jammed rake 67 (i.e., which caused the jamming of the debris 41 in the screen 74, FIG. 15). The following description relates to debris 41 jammed in one face 62 or 63 of one screen 74 with which the rake 67 is engaged, or is to be engaged. It is to be understood, however, that this description is applicable to debris 41 jammed in any face 62 or 63 of any of the screens 74 of any of the embodiments 40-1 through 40-8.

The program 86 and the computer 87 are used by the controller 220 to control operation of the drive 82. As noted above, steps of the program 86 are referred to as "S" plus a number. The "S#" steps appear on FIGS. 25A through 25F, and FIG. 27 shows the computer 87. The computer 87 is provided with registers 301 for storing data for use in controlling the operational cycles. A rake-engage station register 301-RES stores data indicating which of the vertical stations (e.g., station 1 or 1.2) is the next vertical station at which the rake 67 is to engage the screen 74. Table 1 shows examples of how the vertical stations may relate to the steps and the operational cycles. For a first cycle, the rake-engage station is normally station 1. If there has been a jam in the first cycle, for example at station 1.4, to by-pass the jammed station 1.4 the next rake-engage station could be station 1.6, for example. If there have been repeated jams adjacent to the bottom 88 of the screen 74, the next rake-engage station may be set to vertical station 1.1 or 1.2, for example, in the same manner as the next rake-engage station 1.6 is set.

TABLE 1

Rake-Engage Station Register 301-RES

| Step | Cycle | Vertical Station |
|---|---|---|
| S110 | first | 1 |
| S110 | next (2nd, jam) | 1 |
| S112/S360 | next (3rd–5th)* | 1.6 (jam at 1.4) |
| S113 | next (6th) | 1 |
| S114 | any | 1 |

*(max. count = 3)

A current jam register 301-CJR stores data indicating which of the vertical stations is the location of a jam currently experienced by the screen 74. In the above example, the jam occurred during the second cycle at station 1.4. Table 2 relates such vertical stations to the steps and the operational cycles in the example described in which a jam has occurred in the second cycle.

TABLE 2

Current Jam Register 301-CJR

| Step | Cycle | Vertical Station |
|---|---|---|
| S110 | current (1st cycle) | none |
| S325 | current (2nd cycle) | 1.4 |
| S340 | current (end of 2nd cycle) | none |
| S310 | 3rd cycle, after failed attempt to clear jam) | 1.4 |
| S335 | end of 3rd cycle | none |

A jam history register 301-JH stores data indicating which of the vertical stations is the location of jams which have been experienced by the screen 74 during prior cycles. Table 3 relates such vertical stations to the steps and the operational cycles in the example described. The exemplary data in jam history register 301-JH indicates that the jam in the above example occurred at a given vertical station, station 1.4, and the cycle (e.g., the second) in which the jam occurred, or at a given time of day.

TABLE 3

Jam History Register 301-JH

| Step | Cycle | Vertical Station |
|---|---|---|
| S110 | prior to first | none |
| S340 | first | none |
| S340 | second | 1.4 |
| S349 | clear jam | down 1.4 |
| S355 | clear jam | none |
| S335 | third | 1.4 |

The computer 87 is also provided with counters 302 for storing data indicating how many cycles have been performed after a certain event has occurred. For example, a by-pass counter 302-BP counts the number of times the rake 67 moves along the screen 74 in less than a "full raking stroke", i.e., in a cycle that, due to a sensed jammed screen 74, started engaging the screen 74 above the bottom 88 of the screen 74 (e.g., at station 1.6).

Programmed Operational Cycles

Figure 25A:
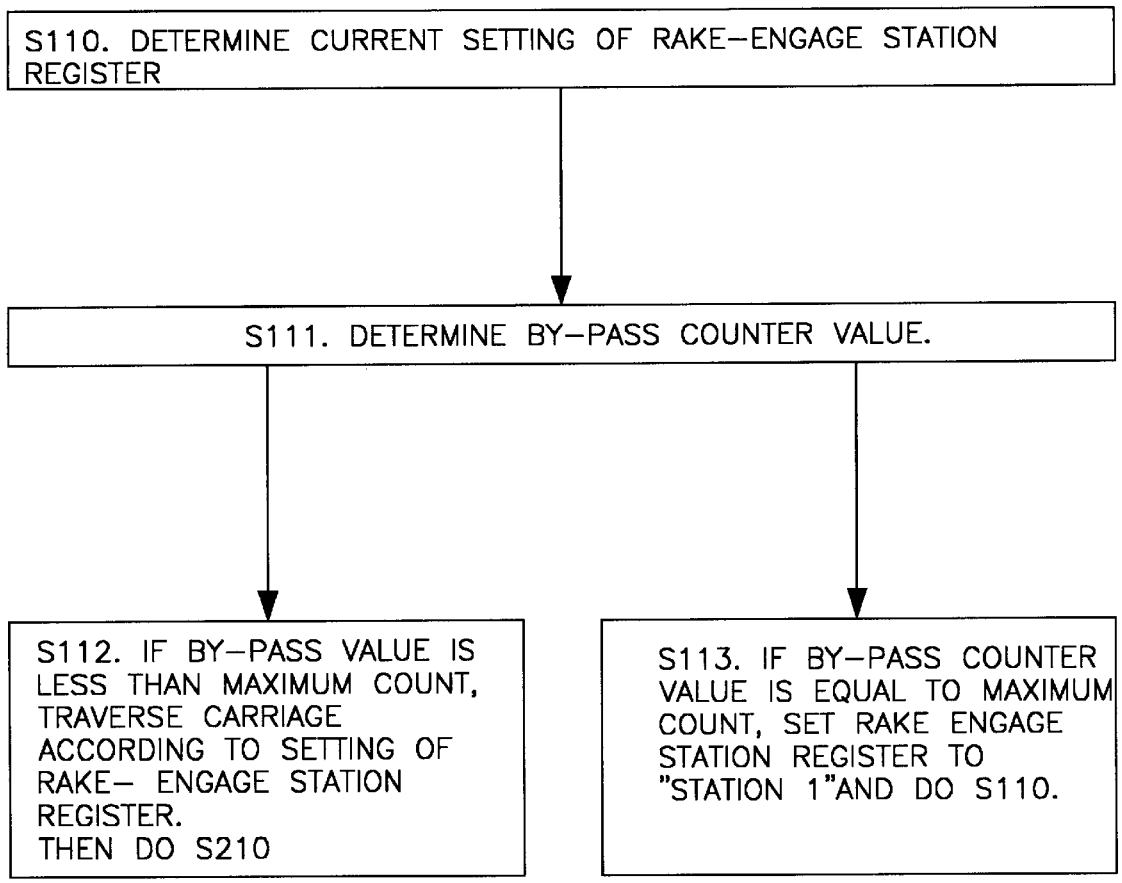

Referring now to FIG. 25A, the program 86 is shown including steps which determine whether a basic cycle or a programmed cycle will be performed. Following the cycle start signal 262-S, in S110, the controller 220 determines what is the current setting of the rake-engage station register 301-RE. Table 1 above indicates that for the example described, station 1 was the current setting of the rake-engage station register 301-RE for a first cycle. In Sill, the controller determines the value of the by-pass counter 302-BP. The plant operator, for example, will have selected a "maximum count" for the by-pass counter 302-BP. The maximum value indicates, or is selected to provide, that if there is a jam, the controller 220 will cause the rake 67 to by-pass the jam up to the selected maximum number of times, whereupon the controller 220 will attempt to cause a basic cycle to be performed. In the example of Table 1, the maximum count is shown as 3 cycles.

The program 86 branches according to the value of the count of the by-pass counter 302-BP. In S112 (see also FIG. 28A), if the by-pass counter value is less than the maximum count (e.g., 3), a sensor 261-VS that is at the next rake-engage station is conditioned to signal, and generates a signal 262-VS when the carriage 231 has advanced the rake 67 to the next rake-engage station which is stored in the rake-engage register 301-RE (station 1.6 for the by-pass in the example). The program 86 goes to S210.

Figure 26:
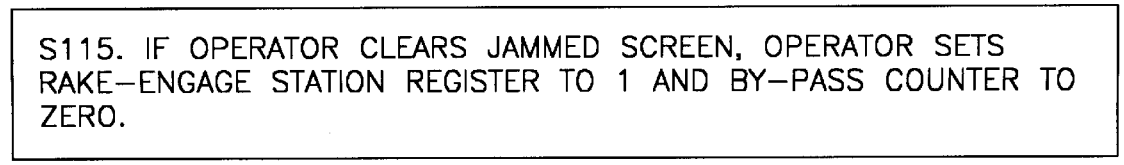
FIG. 26 is a diagram showing a step in which a plant operator changes a register setting and the count of a by-pass counter upon clearing of a jammed screen.
Figure 25:
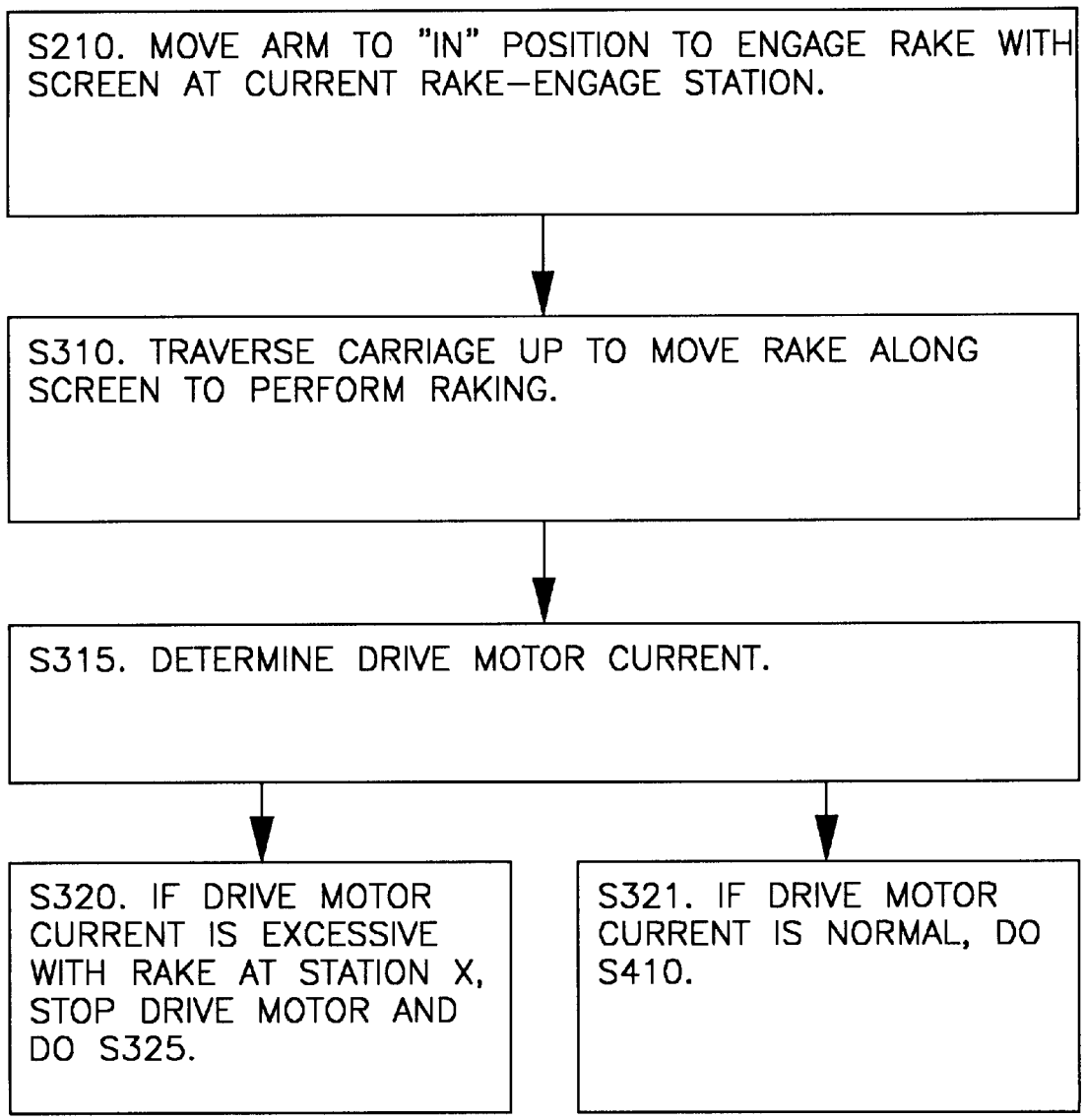
Figure 25:
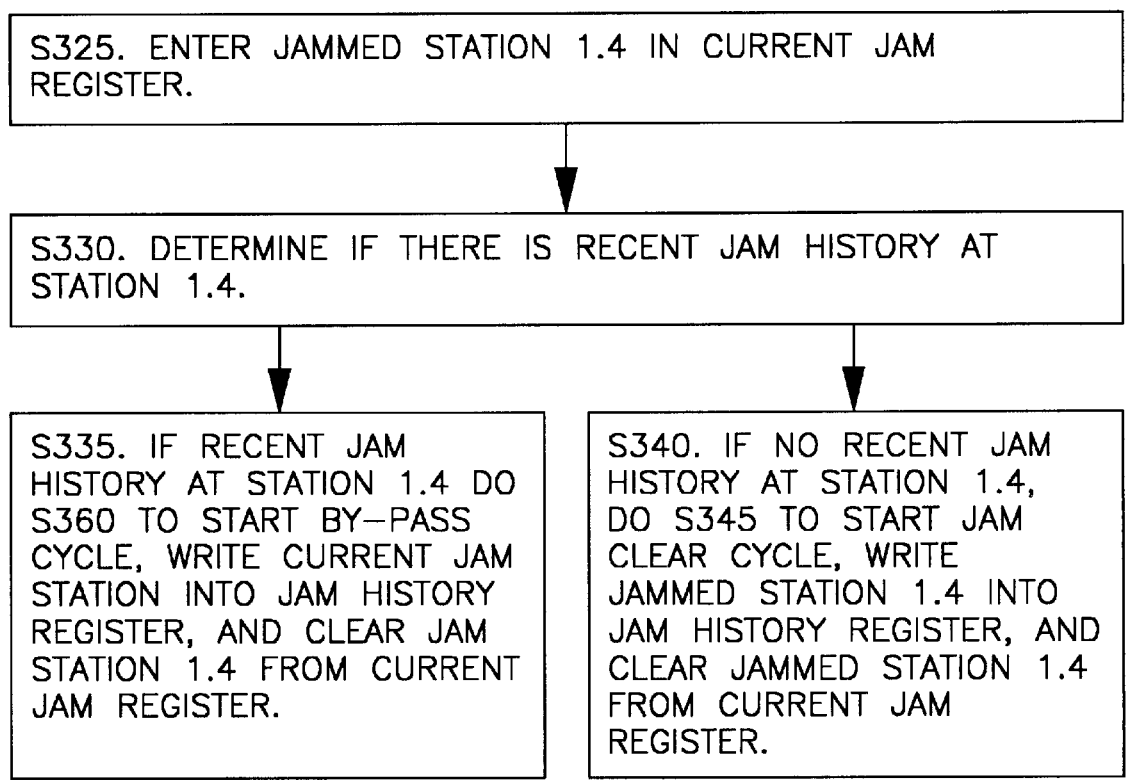
Figure 25:
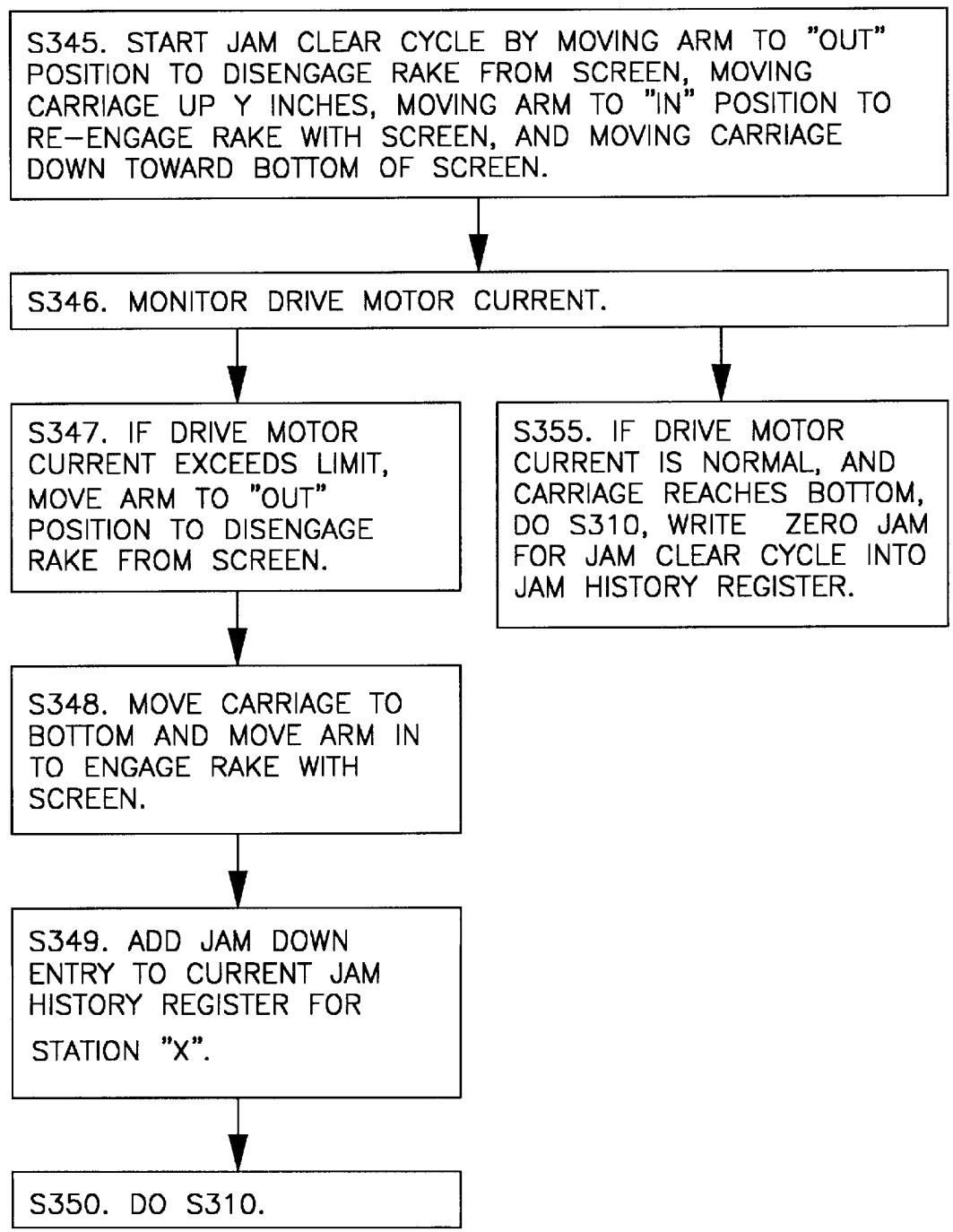

However, in S113, if the by-pass counter value is equal to the maximum count (e.g., 3), the station stored in the rake-engage station register 301-RE is set to vertical "station 1" for the next (e.g., sixth) cycle, which is at the bottom 88 of the screen 74, and the program 86 goes to S110. By doing S110 next, and having set the rake engage station register 301-RE to vertical station 1, there will be an attempt to perform the basic cycle, to see if the jam has been cleared spontaneously. Also, in FIG. 26, S115 indicates that the plant operator may have cleared the jam, in which case the operator will have set the rake engage station register 301-RE to vertical station 1, and the by-pass counter 302-BP to zero. This is said to be "overriding" any previously instruction to by-pass (indicated by the appropriate setting of the rake-engage register 301-RE).

Referring to FIG. 25B, in S210 the arm 141 is moved to the "in" position to engage the rake 67 with the screen 74 at the current vertical rake-engage station, e.g., station 1 for the first cycle or station 1 or 1.6 for the by-pass cycle in the example. S310 (FIGS. 25B and 28C) then causes traverse of the carriage 231 "up", e.g. to move the rake 67 from station 1.6 along the screen 74 to perform raking. During the raking, S315 determines the value of the drive motor current 84 (FIG. 27) relative to the limit 85. The program 86 branches according to the value of the drive motor current 84. In S320 if the drive motor current 84 is excessive (indicating a jammed rake 67, e.g., in the second cycle), the controller 220 stops the drive motor 83, and S325 is done. If the drive motor current 84 is normal, as it was in the first cycle (Table 3, S110 "none") the program does S410 (FIG. 28C).

Referring to FIG. 25C, the example is that the drive motor current 84 was excessive in the second cycle. Therefore in the second cycle S325 is done by entering the jammed station (e.g., station 1.4) in the current jam register, which has been done for the second cycle in the example shown in Table 2. S330 determines if there is a recent jam history at station 1.4. For purposes of this example, Table 3 has no entry for cycles prior to the second cycle, indicating "no" recent jam history at station 1.4. This satisfies S340, so S345 is done (FIGS. 25D and 28B), the jammed station 1.4 occurring in the second cycle is written into the jam history register 301-JH, and the current jammed station 1.4 is erased from the current jam register 301-CJR (see S340 in Table 2). If in the example there had been a recent jam history at station 1.4, S335 would have been satisfied, S360 would have been done, the jammed station x occurring in the first cycle would have been written into the jam history register 301-JH, and the current jammed station x would have been erased from the current jam register 301-CJR.

Figure 28B:
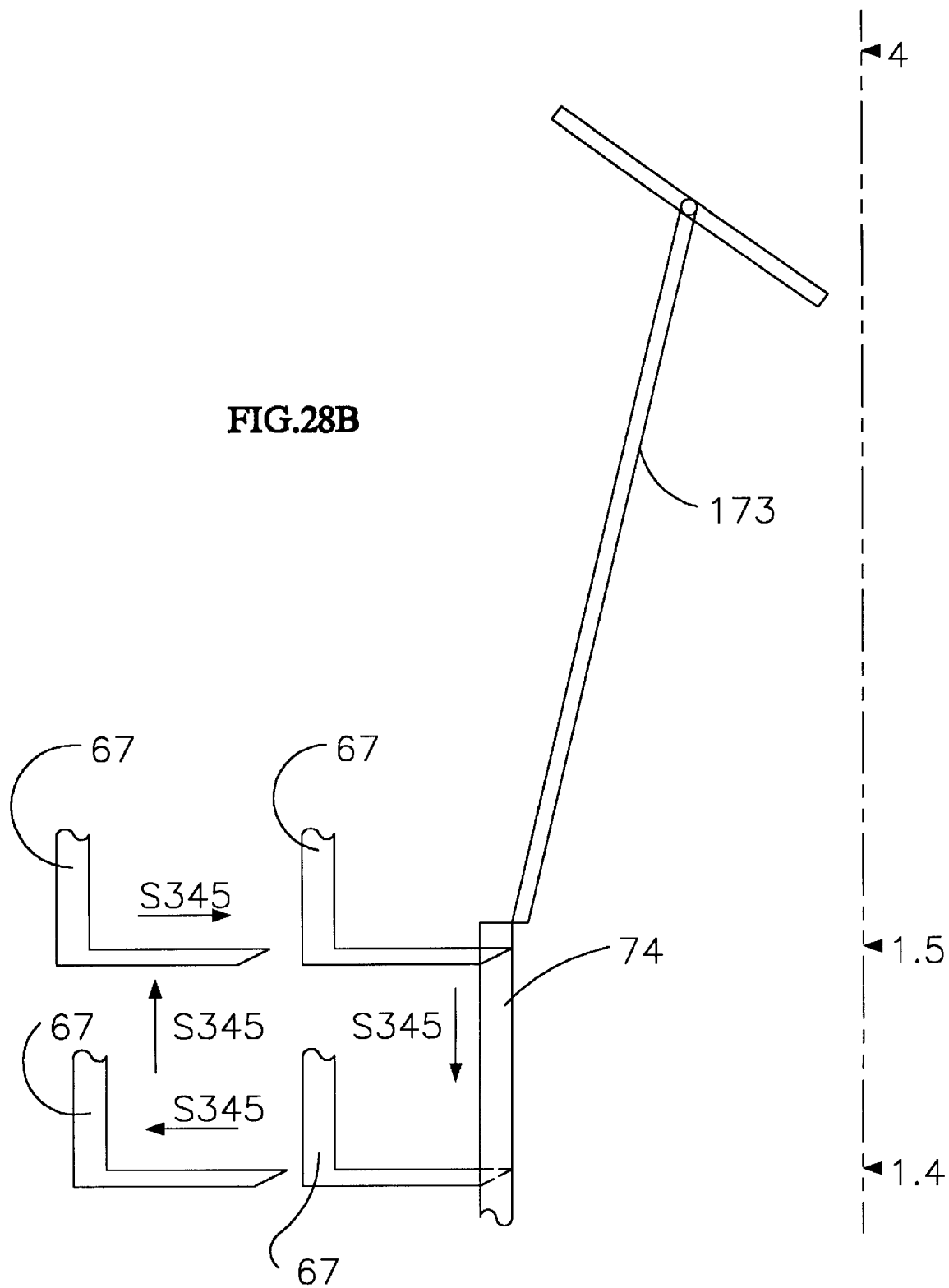

For the current example with a jam in the second cycle and no jam history, reference is made to FIGS. 25D and 28B in which the program 86 for clearing the jam is described. S345 causes the arm 141 to move to the "out" position to disengage the rake 67 from the screen 74. This enables the rake 67 to be moved to a next station above the jammed station 1.4, which next station may be 2 inches, for example, above the jammed station 1.4, regardless of the next rake-engage station set in register 301-RES. This next (jam clear) station is station 1.5 in the example shown in FIG. 28B. With the carriage 231 moved to position the rake 67 at the next station 1.5, S345 causes the drive 82 to move the rake to the "in" position to engage the screen 74 at by-pass station 1.5. S345 then causes the drive to move the rake 67 "down", toward the bottom 88 of the screen 74 in an attempt to clear the jammed debris 41 from the screen 74. In S346, the drive motor current 84 is monitored. When the rake 67 is moving through the 2 inch space from station 1.5 to the jammed station 1.4, the drive motor current 84 should be normal.

The program branches according to the value of the drive motor current 84. If the jam cannot be removed from station 1.4 during the down stroke of the rake 67, the drive motor current 84 will exceed the limit 85 and in S347 the arm 141 is moved "out" to disengage the rake 67 from the screen 74. In S348 the carriage 231 is moved to the bottom 88 of the screen 74 and then the rake 67 is moved to the "in" position to engage the screen 74 for the next up movement. In S349 the inability of the rake 67 to clear the jammed debris 41 during the down motion is recorded in the jam history register 301-JH (see S349, Table 3) as "down 1.4", whereafter S350 calls S310.

If the jam can be removed from station 1.4 during the down stroke of the rake 67, the drive motor current 84 does not exceed the limit 85 and in S355 the jam history register 301-JH is set to record clearing of the jam ("none"), and the program calls S310.

Thus, in either event of clearing the jam or not clearing the jam, S310 (FIGS. 25B and 28C) is done, the carriage 231 is caused to start to traverse up toward the upper end 61 of the screen 74, and the drive motor current 84 is monitored in S315. The program 86 branches according to the value of the drive motor current 84. In S320, in the example described with the jam remaining at station 1.4, the drive motor current 84 would be excessive, indicating the continued existence of the jammed rake 67. The controller 220 stops the drive motor 83, and S325 is done. If the drive motor current 84 is normal, the program does S410.

In the example, referring again to FIGS. 25C and 28C, because the drive motor current 84 was excessive during the third cycle, S325 is done by entering the jammed station (e.g., station 1.4) in the current jam register 301-CJR. This has been done for the third cycle in the example shown in Table 2. S330 determines if there is a recent jam history at station 1.4. Because of the jam at station 1.4 prior to the third cycle, Table 3 has an entry for the second cycle and for the attempt to clear the jam, indicating recent jam history at station 1.4. This does not satisfy S340, but satisfies S335, so S335 is done (FIG. 25C). The current jammed station 1.4 occurring in the third cycle is written into the jam history register 301-JH, and the current (third cycle) jammed station 1.4 is erased from the current jam register 301-CJR (see S335 in Table 2).

In view of the recent jam history at station 1.4, S360 is done. Referring to FIGS. 25E and 28C, the identity of the new rake-engage station, which is the by-pass station 1.6, is entered into the rake-engage register 301-RES as shown in Table 1 (see S112/S360). S365 then causes the rake 67 to be disengaged from the screen 74. In S370 the by-pass cycle starts by calling S110 (FIG. 25A). In S110 the by-pass cycle starts by determining that the by-pass station 1.6 is the next rake-engage station. This is the fourth cycle in the example, so according to Table 1, the number of by-pass cycles is less than the maximum count, causing S112 to cause the carriage 231 to move the rake 67 to by-pass station 1.6 and S210 to be performed. Assuming no further jam is encountered from station 1.6 to the upper end 61 of the screen 74 (vertical station 2), the fourth cycle continues via S321 and via the steps in FIG. 25F. This includes S410, S610 and S710 (which, for the by-pass cycle, increments the by-pass counter 302-BP at the end of the by-pass cycle).

Further by-pass cycles are performed in response to the cycle-start signal 262-S, and S110 is performed, followed by S111. When the controller 220 determines (S113) that the value of the by-pass counter 302-BP is 3 in this example (i.e., equal to the maximum count of 3), the setting of the rake-engage register 301-RES is changed to station 1 so that the controller 220 will cause the rake 67 to attempt to perform a basic cycle. The results of the attempt to perform the basic cycle will depend on whether the jammed debris 41 has been cleared, and the operational cycles will be controlled by the controller 220 as described above.

It is to be understood that the scope of the present invention is to be defined by the appended claims, and not limited by the foregoing description, which describes presently preferred ways in which the present invention may be devised and still come within the scope of the present invention.

What is claimed is:

1. Apparatus for removing debris from a flow path in which it is desired to permit only liquid and solids, and not the debris, to be guided to a liquid treatment basin, said apparatus comprising:

a housing adapted to be mounted over the flow path;

a screen extending across the flow path at a given location, said screen having a front face facing the flow path and a back face facing the liquid and solids flowing to the basin, said screen having an upper end and being formed from vertically extending spaced bars;

a rake mounted on said housing, said rake having tines provided with distal ends which are at least receivable between said bars of the screen, and which are receivable between and extendable past said bars;

a controller for determining the effective depth by which said distal ends of said tines extend between but not past the bars, or extend both between and past said bars by a given distance; and a pan mounted on said housing and having a lower end;

said housing being movable into either of two orientations relative to said flow path for mounting said rake and said pan in a selectable one of two positions relative to said screen, said housing mounting said rake for movement along said bars toward the upper end with said tines received between said bars and not past said bars, or received between said bars and extending past said bars by said given distance, said housing mounting said rake for the movement along said bars and then along said pan;

said pan being mounted by said housing in either of two pan positions;
  in a first of said pan positions said lower end of said pan being adjacent to the upper end of said bars;
  in a second of said pan positions corresponding to said tines extending past said bars by said given distance said lower end of said pan being spaced from said upper end of said bars by said given distance;

wherein regardless of whether or not said tines extend past said bars, after said tines move past said bars and toward said pan said distal ends of said tines engage said pan to retain the debris removed from said bars on said tines.

2. Apparatus according to claim 1, further comprising:

said pan having an upper end pivotally mounted on said housing for rotation on an horizontal axis located above and vertically aligned with said upper end of said screen;

in the first of said pan positions said pan being at an angle relative to vertical to position said lower end of said pan adjacent to the upper end of said bars;

in the second of said pan positions corresponding to said tines extending past said bars by said given distance said upper end and said lower end of said pan being vertically aligned to space said lower end of said pan from said upper end of said bars by about said given distance to permit said tines extending past said bars by about said given distance to move upwardly along said screen and past said bars and said distal ends of said tines to engage said pan to retain the debris removed from said bars on said tines.

3. Apparatus according to claim 1, further comprising:

said controller being a plate mounted for movement relative to said rake into a position overlapping said tines, said plate having a width less than said given distance so that in said overlapping position a selected length of said tines adjacent to said distal ends extends past said plate, the selected distance being less than the given distance, said plate being movable into another position away from said tines with said tines extending past said plate by a distance greater than the given distance to permit said tines to extend both between and past said bars by said given distance.

4. Apparatus according to claim 1, further comprising:

said pan having an upper end;

in both of the two orientations of said housing relative to the flow path said housing mounting said rake for movement in a debris removal path upwardly past said upper end of said pan;

a debris guide mounted on said housing for movement into and out of the debris removal path, said debris guide being biased into the debris path;

said rake moving in the debris removal path upwardly past said upper end of said pan and past said debris guide being effective to move said debris guide out of the debris removal path with said debris guide holding the debris on said tines until said rake passes said debris guide and said bias returns said debris guide to the debris removal path; and a doctor blade for directing the debris from the tines onto said debris guide to complete the removal of the debris from said screen.

5. Apparatus for both front raking and back raking to clean debris from the face of a screen positioned in a channel and having a plurality of members to block the flow of the debris past the channel to a liquid treatment basin, the members being separated by spaces to allow the liquid but not the debris to flow past the screen to the basin, said apparatus comprising:

a rake having a cleaning head provided with a plurality of fingers extending therefrom;

a housing for reversibly mounting said rake relative to the screen with said fingers pointing either in the direction of the flow or into the flow;

said fingers being adapted to engage said members of said screen when pointing in the direction of the flow and being adapted to engage said members of said screen and extend through the spaces between the members and past the members when pointing into the flow; and a limiter movably mounted on said head into a first position to permit said fingers to extend through the spaces between the members and past the members for back raking when pointing into the flow, said limiter being movable on said head into a second position to permit said fingers to extend into the spaces between the members but not past the members for front raking.

6. An apparatus according to claim 5, wherein the members are parallel to each other and extend across the channel in a first direction and are spaced from each other in a second direction, said apparatus further comprising:

said limiter having an edge extending in said second direction across said head, in the second position of said limiter said edge and adjacent ones of said fingers forming short pockets, each of said short pockets receiving one of said members but said fingers not extending past the members so that said head is spaced from said screen to provide a first area defined by said limiter between said head and said short pockets for holding the material removed from the screen in front raking, in the first position of said limiter said edge being away from said adjacent fingers so that said fingers are free to extend past said members and adjacent ones of said fingers and said head form long pockets, each of said long pockets receiving one of said members to form a second area between the screen and said ends of said fingers for holding the material removed from the screen in back raking.

7. Apparatus according to claim 5, said apparatus further comprising:

said head and said fingers being joined at a junction;

said limiter being pivotally mounted on said head along said junction of said head and said fingers to move into a position overlapping said fingers, said limiter having an edge opposite to said junction and spaced from said head by a distance selected so that in said overlapping position said edge forms a first pocket with each adjacent pair of said fingers, said first pocket having a depth no more than the thickness of said fingers in the direction of flow of the liquid.

8. Apparatus for removing debris from liquid, solids, and the debris flowing from an upstream end of a channel to a liquid treatment basin at a downstream end of the channel, the channel having first and second walls and a liquid depth defining a flow area through which the liquid, the solids, and the debris flow; said apparatus comprising:

a frame positioned between the upstream end and the downstream end of the channel, said frame having first and second legs mounted on said first and second respective walls for front raking, said first and second legs being removable from said respective first and second walls and the frame being reversible for mounting said second and first legs on said respective first and second walls for back raking;

a screen mounted on said frame and positionable by the frame in the channel in each of the front raking and back raking positions of the frame said screen extending completely across the flow area to prevent the flow of the debris downstream of the screen, the screen having an upper end, a lower end, a front side facing the upstream flow in the front raking position of the frame and when reversed by the frame the front side facing the downstream flow in the back raking position of the frame;

a rake having tines and being mounted on said frame for movement relative to said screen in each of the front raking and back raking positions of said frame and said screen;

a drive mounted on said frame and connected to said rake to selectively move said rake into a front rake position with said tines engaged with said lower end at said front side when said front side is facing the upstream flow, said drive being selectively effective for front raking to move said tines across said screen to said upper end at said front side to move the debris on said front side toward and past said upper end, said drive being connected to said rake to selectively move said rake into a back rake position with said tines engaged with said lower end at said front side when said front side is reversed with the frame and is facing the downstream flow, said drive being selectively effective to move said tines across said screen to said upper end of said reversed front side to move the debris on said reversed front side toward and past said upper end.

9. A unitary assembly for removing debris from liquid, solids and the debris flowing from an upstream end of a channel to a downstream end of the channel, the channel having a longitudinal axis and a flow area through which the liquid, the solids and the debris flow in the direction of the longitudinal axis; said unitary assembly being readily reversible on the channel for front raking and back raking, said unitary assembly comprising:

means for screening the debris from the channel, said screening means having an upper end and being reversible between two positions oriented one hundred eighty degrees apart, said screening means having a front side oriented in one of the positions to face the flow from the upstream end for front raking, said front side oriented in the other of the positions to face the downstream end for back raking;

means for raking the debris off said screening means, said raking means having tines for engaging said front side of said screening means to move the debris toward and past said upper end of said screening means; and housing means mounted on said channel at a given location in either a first rotational orientation relative to the longitudinal axis for front raking or a second rotational orientation relative to the longitudinal axis for back raking, the first and the second rotational orientations being one hundred eighty degrees apart and at the same location along the longitudinal axis of the channel for selectively supporting said screeing means in said channel in either of said positions of said front side and for selectively supporting said raking means in either of two rake positions relative to said front side of said screening means, in a first of said rake positions for front raking said tines being engagable with said front side of said screening means in said one orientation, in a second of said rake positions for back raking said tines being engagable with said front side of said screening means in said other orientation.

10. A unitary assembly according to claim 9, further comprising:

said screening means comprising a screen mounted on said housing means, said screen extending into the channel at the given location in each of the two positions of said screening means, said screen having a bottom and a top; and means mounted on said housing means for moving said raking means either upstream of said front face of said screen and adjacent to said bottom into the first rake position, or downstream of said front face of said screen and adjacent to said bottom into the second rake position, and then moving said raking means in either of the rake positions toward said front face of said screen to engage said tines with said screen, and then moving said tines from said bottom to said top to clear the debris off the screen.

11. A method of removing debris from a flow channel which carries liquid, solids and debris from an upstream location toward a downstream location; comprising the steps of:

providing a screen adapted to extend across the flow channel to intercept the debris and allow the liquid and the solids to flow past the screen; the screen having a top, a bottom, a front side and a back side;

providing a rake having tines to engage the front side of the screen;

reversibly mounting the rake and the screen as a unit the mounting positioning the screen at a given location in the channel the mounting positioning the screen in one orientation with the front side facing the upstream location or in a reversed orientation with the front side facing the downstream location the mounting positioning the tines to engage the front of the screen whether the front side is facing the upstream location or the downstream location; and in either of the positions of the screen and with the tines engaged with the front side of the screen, moving the rake from the bottom to the top of the screen to remove the debris from the screen;

wherein one of the tine positions is front raking when the front side is facing the upstream location and the other of the tine positions is back raking the screen when the front side is facing the downstream location.

12. Apparatus for cleaning debris from a screen facility positioned in a channel for guiding a flow of liquid, solids, and the debris from an upstream end of the channel, the screen facility being designed to prevent the flow of the debris to a liquid treatment basin downstream of the screen facility, the channel guiding the flow of the liquid and the solids downstream from the screen facility to the basin, said apparatus comprising:

said screen facility having an upper end, an upstream side facing against the flow of the liquid, the solids and the debris incoming from the upstream end, and a downstream side facing with the flow of the liquid and the solids exiting downstream from said screen facility;

a rake facility having tines for engaging said screen facility to move the debris toward and past said upper end of said screen facility to remove the debris from said screen facility;

a frame for supporting said rake facility in either of two rake positions relative to said screen facility, in a first of the rake positions said tines being engagable with said upstream side of said screen facility, in a second of the rake positions said tines being engagable with said downstream side of said screen facility; and a stop movable on said rake facility into first and second stop positions corresponding to the respective first rake position and the second rake position;

in the first stop position said stop being aligned with said tines to prevent said tines from extending from said upstream side of said screen facility completely through said upstream side of said screen facility; and in the second stop position said stop being out of alignment with said tines to permit said tines to extend from said downstream side of said screen facility completely through said upstream side of said screen facility and upstream of said upstream side of said screen facility.

13. Apparatus for cleaning debris from a screen facility positioned in a channel for guiding a flow of liquid, solids, and the debris from an upstream end of the channel, the screen facility being designed to prevent the flow of the debris to a liquid treatment basin downstream of the screen facility, the channel guiding the flow of the liquid and the solids downstream from the screen facility to the basin, said apparatus comprising:

said screen facility having an upper end, an upstream side facing against the flow of the liquid, the solids and the debris incoming from the upstream end, and a downstream side facing with the flow of the liquid and the solids exiting downstream from said screen facility;

a rake facility having tines for engaging said screen facility to move the debris toward and past said upper end of said screen facility to remove the debris from said screen facility, said tines having distal ends;

a frame for supporting said rake facility in either of two rake positions relative to said screen facility, in a first of the rake positions said tines being engagable with said upstream side of said screen facility, in a second of the rake positions said tines being engagable with said downstream side of said screen facility; and a pan movable on said frame according to which rake position said rake facility is positioned in, said pan having a top end and a bottom end;

with said rake facility in said first rake position said bottom end of said pan being located adjacent to said upper end of said screen facility to keep the debris that is moved past said upper end of said screen facility on said rake facility;

with said rake facility in said second rake position said bottom end and said top end of said pan being located upstream from said upper end of said screen facility and aligned with said distal ends of said tines to keep the debris that is moved past said upper end of said screen facility on said rake facility.

14. Apparatus for both front and back raking to clean debris from a screen facility positioned in a channel for guiding liquid and solids and the debris from an upstream location toward a liquid treatment basin, the channel having a longitudinal axis extending in a direction in which the liquid, the debris, and the solids flow, comprising:

the screen facility being designed to prevent the flow of the debris downstream of the screen facility to the basin, the screen facility including a screen having an upper end, a front, and a back;

a rake having tines for engaging and moving relative to the screen facility to move the debris toward and past the upper end of the screen facility to remove the debris from the screen facility, said tines having distal ends;

a frame for selectively supporting said screen at a given location in the channel either in a first screen-facing position with the front facing the upstream flow for front raking or in a second screen-facing position with the front reversed from the first screen-facing position and facing the downstream flow for back raking, said frame selectively supporting said rake in either of two rake positions relative to the screen when the screen is in either of the two screen-facing positions, in a first of said rake positions said tines being engagable with the screen from the front and upstream of the screen for front raking, in a second of said rake positions said tines being engagable with the screen from the reversed front for back raking; and a retainer facility extending above the upper end of the screen and away from the screen for retaining the debris on said tines regardless of which of the two rake positions said rake is supported relative to the channel, said retainer facility comprising a retainer pan movable on said frame into first and second pan stations, said retainer facility being in a first of said pan stations when said rake is in said first rake position, in said first pan station said retainer pan being located above and adjacent to said screen to keep the debris on said tines as the debris is moved from said screen;

in said second pan station said retainer pan being located above and spaced from said upper end of said screen in an upstream direction of the longitudinal axis relative to said screen to be engaged by said distal ends of said rake when said rake is in said second raking position and said rake moves past said upper end of said screen to keep the debris on said tines as the debris is moved from said screen.

15. Apparatus for both front and back raking to clean debris from a screen facility positioned in a channel for guiding liquid and solids and the debris from an upstream location toward a liquid treatment basin, the channel having a longitudinal axis extending in a direction in which the liquid, the debris, and the solids flow, comprising:

the screen facility being designed to prevent the flow of the debris downstream of the screen facility to the basin, the screen facility including a screen having an upper end, a front, and a back;

a rake having tines for engaging and moving relative to the screen facility to move the debris toward and past the one upper end of the screen facility to remove the debris from the screen facility, said tines having distal ends and a length sufficient to extend through the screen facility from a base of said tines to said distal ends;

a plate movably mounted on said rake to reduce the effective value of the length of said tines, said plate being movable to cover a portion of said tines while allowing said distal ends to extend beyond said plate, said plate being movable to uncover all of said tines;

a frame for selectively supporting said screen at a given location in the channel either in a first screen-facing position with the front facing the upstream flow for front raking or in a second screen-facing position with the front reversed from the first screen-facing position and facing the downstream flow for back raking, said frame selectively supporting said rake in either of two rake positions relative to the screen when the screen is in either of the two screen-facing positions, a first of said rake positions being with said tines extending beyond said plate and said tines being engagable with the screen from the front and upstream of the screen and with said distal ends extending into said front side but not extending past said back of said screen for front raking, in a second of said rake positions said plate being moved to uncover all of said tines and said tines being engagable with the screen from the reversed front for back raking and with said tines extending through said front side and through said back side and upstream past said back side; and a retainer facility extending above the upper end of the screen and away from the screen for retaining the debris on said tines regardless of which of the two rake positions said rake is supported relative to the channel, said retainer facility comprising a retainer pan movable on said frame into first and second pan stations, said retainer facility being in a first of said pan stations when said rake is in said first rake position, in said first pan station said retainer pan being located above and adjacent to said screen to keep the debris on said tines as the debris is moved from said screen;

in said second pan station said retainer pan being located above and spaced from said upper end of said screen in an upstream direction of the longitudinal axis relative to said screen to be engaged by said distal ends of said rake when said rake is in said second raking position and moves past said upper end of said screen to keep the debris on said tines as the debris is moved from said screen.

* * * * *